(12) United States Patent
Kim et al.

(10) Patent No.: US 12,105,925 B2
(45) Date of Patent: *Oct. 1, 2024

(54) TOUCH SENSOR AND DISPLAY DEVICE

(71) Applicant: Samsung Display Co., Ltd., Yongin-Si (KR)

(72) Inventors: Jang Hui Kim, Suwon-si (KR); Ga Young Kim, Hwaseong-si (KR); Do Ik Kim, Suwon-si (KR); Sang Chul Lee, Yongin-si (KR); A Ra Jo, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/238,578

(22) Filed: Aug. 28, 2023

(65) Prior Publication Data

US 2023/0409156 A1 Dec. 21, 2023

Related U.S. Application Data

(63) Continuation of application No. 17/546,992, filed on Dec. 9, 2021, now Pat. No. 11,768,571, which is a (Continued)

(30) Foreign Application Priority Data

Apr. 2, 2019 (KR) .......................... 10-2019-0038261

(51) Int. Cl.
*G06F 3/045* (2006.01)

(52) U.S. Cl.
CPC .... *G06F 3/045* (2013.01); *G06F 2203/04105* (2013.01)

(58) Field of Classification Search
CPC ........... G06F 3/045; G06F 2203/04105; G06F 3/0414
See application file for complete search history.

(56) References Cited

U.S. PATENT DOCUMENTS 9,246,486 B2 * 1/2016 Yang ...................... G06F 3/047
9,652,098 B2 * 5/2017 Choi ..................... G06F 3/0443
(Continued)

FOREIGN PATENT DOCUMENTS

| CN | 107621908 | 1/2018 |
| EP | 3407170 | 11/2018 |

(Continued)

OTHER PUBLICATIONS

Extended European Search Report issued on Jul. 1, 2020 to European Patent Application No. 20166693.

(Continued)

*Primary Examiner* — Amy Onyekaba
(74) *Attorney, Agent, or Firm* — Lewis Roca Rothgerber Christie LLP

(57) ABSTRACT

A touch sensor includes first touch electrode members disposed on a base layer and located in a sensing area, each of the first touch electrode members including a plurality of first touch electrodes arranged along a first direction, each of the first touch electrodes including a first opening; second touch electrode members disposed on the base layer and located in a sensing area, each of the second touch electrode members including second touch electrodes arranged along a second direction, each of the second touch electrodes including a second opening; and a first pressure sensor disposed on the base layer and including a first strain gauge. A portion of the first strain gauge is located in the second sensing area, and the first strain gauge includes a portion located in the second sensing area and disposed in the same layer as the first touch electrodes and the second touch electrodes.

16 Claims, 61 Drawing Sheets

Related U.S. Application Data continuation of application No. 16/835,784, filed on Mar. 31, 2020, now Pat. No. 11,231,825.

(56) References Cited

U.S. PATENT DOCUMENTS

| | | | | |
|---|---|---|---|---|
| 10,248,254 | B1* | 4/2019 | Zhang | G06F 3/044 |
| 10,540,030 | B2* | 1/2020 | Kim | G06F 3/04164 |
| 2008/0309633 | A1* | 12/2008 | Hotelling | G06F 3/0412 |
| | | | | 345/173 |
| 2013/0257785 | A1* | 10/2013 | Brown | G06F 3/04182 |
| | | | | 345/174 |
| 2013/0300695 | A1* | 11/2013 | Cho | G06F 3/0443 |
| | | | | 345/173 |
| 2014/0253499 | A1* | 9/2014 | Lee | G06F 3/0448 |
| | | | | 345/174 |
| 2015/0042598 | A1* | 2/2015 | Chae | G06F 3/041 |
| | | | | 345/174 |
| 2015/0138041 | A1* | 5/2015 | Hirakata | G06F 3/1446 |
| 2015/0204739 | A1 | 7/2015 | Fukuzawa et al. | |
| 2016/0195955 | A1* | 7/2016 | Picciotto | G06F 3/04144 |
| | | | | 345/174 |
| 2017/0010703 | A1* | 1/2017 | Chen | G02F 1/133345 |
| 2017/0010704 | A1* | 1/2017 | Chen | G06F 3/0412 |
| 2017/0010719 | A1* | 1/2017 | Chen | G06F 3/0446 |
| 2017/0102282 | A1* | 4/2017 | Ogawa | G01L 5/225 |
| 2017/0242518 | A1* | 8/2017 | Liu | G06F 3/0443 |
| 2017/0261387 | A1* | 9/2017 | Vosgueritchian | G06F 3/04144 |
| 2017/0269756 | A1* | 9/2017 | Wang | G06F 3/0446 |
| 2017/0269763 | A1* | 9/2017 | Yang | G06F 3/0443 |
| 2017/0277296 | A1* | 9/2017 | Reynolds | G06F 3/0412 |
| 2017/0285799 | A1* | 10/2017 | Iuchi | G06F 3/0412 |
| 2017/0285864 | A1* | 10/2017 | Pedder | G06F 3/044 |
| 2017/0299456 | A1 | 10/2017 | Suzuki et al. | |
| 2017/0336899 | A1 | 11/2017 | Szeto | |
| 2017/0357346 | A1* | 12/2017 | Wang | G06F 3/04142 |
| 2017/0371471 | A1* | 12/2017 | Kim | G02F 1/1343 |
| 2018/0018056 | A1* | 1/2018 | Xu | G06F 3/0446 |
| 2018/0039362 | A1* | 2/2018 | Liu | H10K 59/40 |
| 2018/0046300 | A1* | 2/2018 | Dun | G02F 1/1343 |
| 2018/0059839 | A1* | 3/2018 | Kim | G06F 3/0412 |
| 2018/0061899 | A1* | 3/2018 | Oh | H10K 59/8722 |
| 2018/0081476 | A1* | 3/2018 | Ma | G06F 3/0412 |
| 2018/0107300 | A1* | 4/2018 | Lin | G02F 1/133514 |
| 2018/0164931 | A1* | 6/2018 | Na | G06F 3/0412 |
| 2018/0239473 | A1* | 8/2018 | Wang | G06F 3/04144 |
| 2018/0321793 | A1* | 11/2018 | Kim | G06F 3/0446 |
| 2018/0323240 | A1* | 11/2018 | Won | G06F 3/0412 |
| 2018/0329555 | A1* | 11/2018 | Kim | G06F 3/0418 |
| 2019/0012029 | A1* | 1/2019 | Hong | G06F 3/0412 |
| 2019/0056819 | A1* | 2/2019 | Moon | G06F 3/0412 |
| 2019/0121484 | A1* | 4/2019 | Zhang | G06F 3/044 |
| 2019/0354241 | A1 | 11/2019 | Kim et al. | |
| 2019/0376852 | A1* | 12/2019 | Kobayashi | B32B 23/20 |

FOREIGN PATENT DOCUMENTS

| | | |
|---|---|---|
| JP | 2017021004 | 1/2017 |
| KR | 10-2017-0086538 | 7/2017 |
| KR | 20180125672 | 11/2018 |
| KR | 20190006123 | 1/2019 |
| KR | 10-2019-0132600 | 11/2019 |

OTHER PUBLICATIONS

Non-Final Office Action dated Apr. 15, 2021, issued to U.S. Appl. No. 16/835,784.

Notice of Allowance dated Sep. 10, 2021, issued to U.S. Appl. No. 16/835,784.

Notice of Allowance dated May 11, 2023, issued to U.S. Appl. No. 17/546,992.

* cited by examiner

FIG. 16
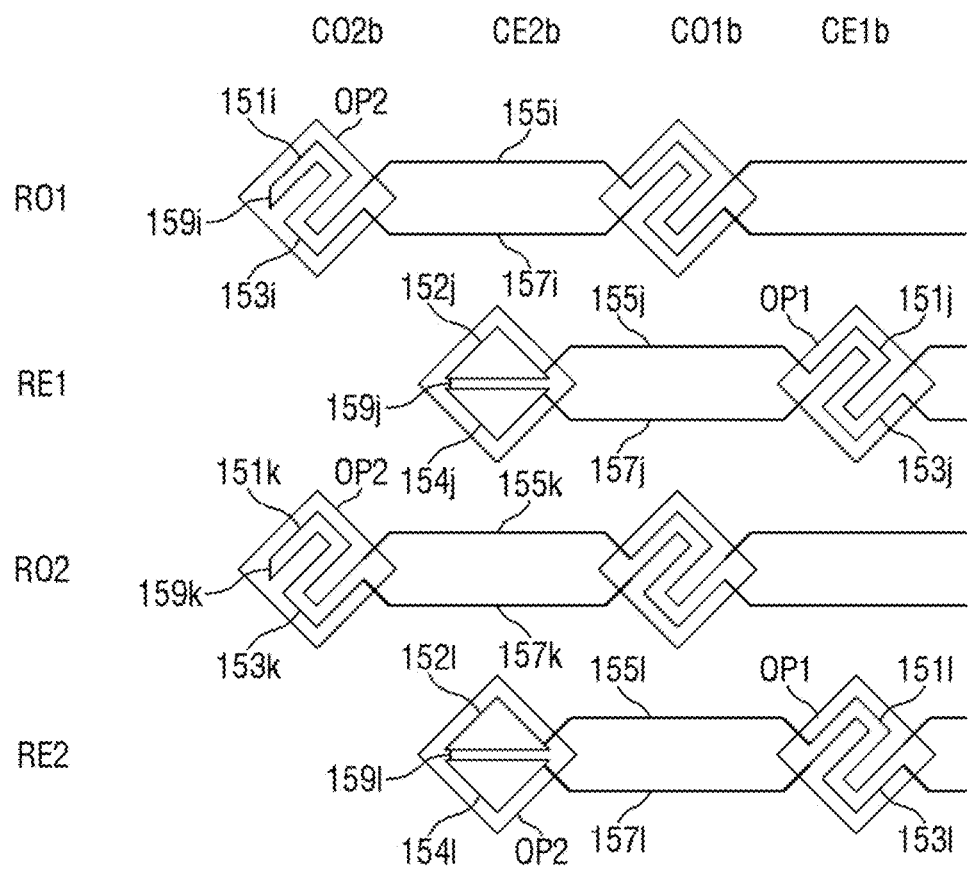
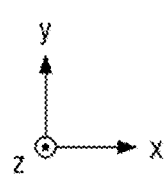
150i: 151i, 153i, 155i, 157i, 159i
150j: 151j, 152j, 153j, 154j, 155j, 157j, 159j
150k: 151k, 153k, 155k, 157k, 159k
150l: 151l, 152l, 153l, 154l, 155l, 157l, 159l
PS3: 150i, 150j, 150k, 150l

FIG. 54
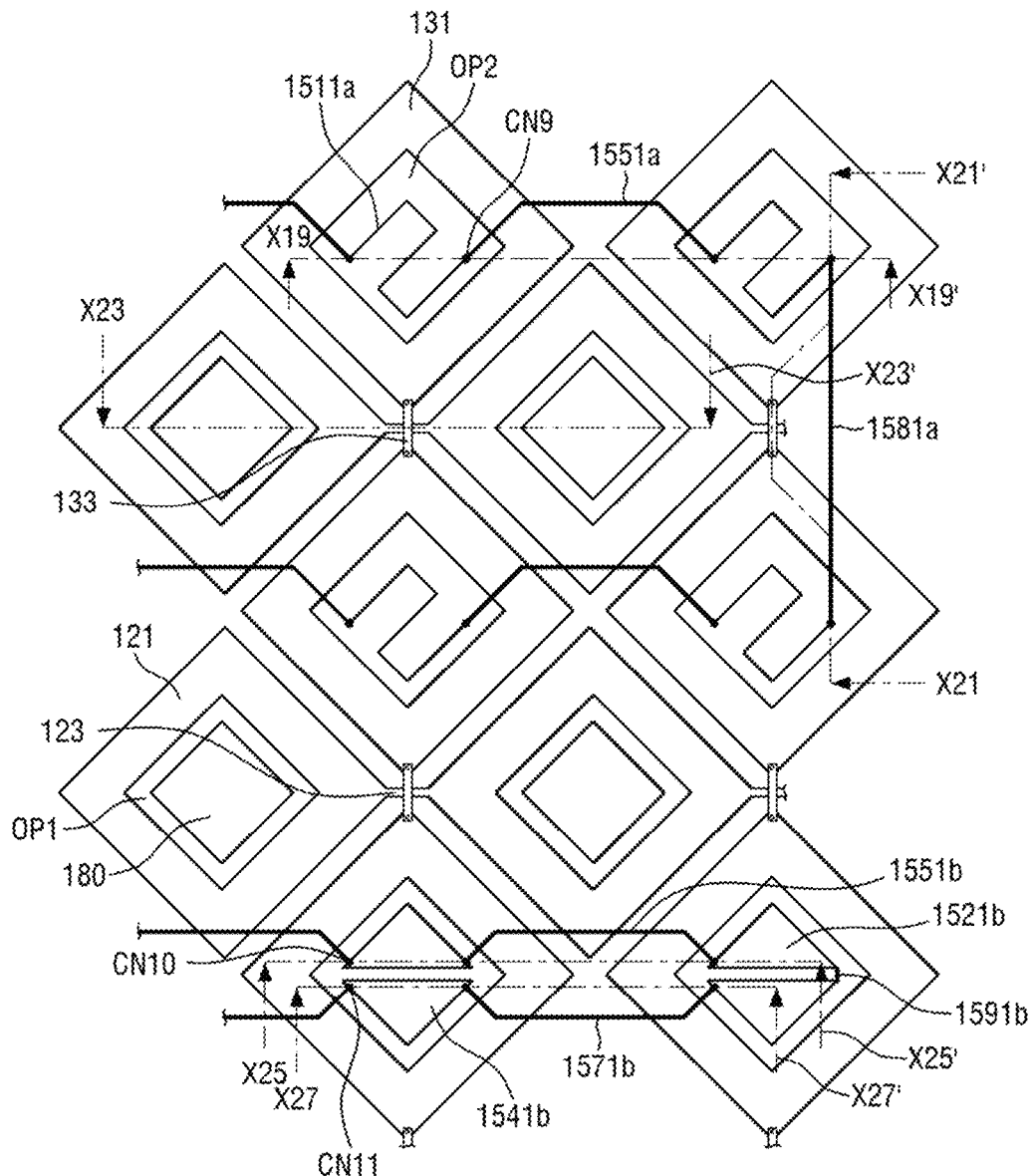
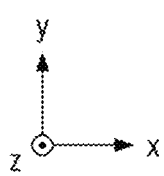
120: 121, 123
130: 131, 133
150a3: 1511a, 1551a, 1581a
150b3: 1521b, 1541b, 1551b, 1571b, 1591b

TOUCH SENSOR AND DISPLAY DEVICE

CROSS REFERENCE TO RELATED APPLICATIONS

This application is a continuation of U.S. patent application Ser. No. 17/546,992, filed on Dec. 9, 2021, which is a continuation of U.S. patent application Ser. No. 16/835,784, filed on Mar. 31, 2020, now U.S. Pat. No. 11,231,825, which issued on Jan. 25, 2022, which claims priority from and the benefit of Korean Patent Application No. 10-2019-0038261, filed on Apr. 2, 2019, each of which is hereby incorporated by reference for all purposes as if fully set forth herein.

BACKGROUND

Field

Example implementations of the invention relate generally to a touch sensor and a display device and, more particularly, to a touch sensor having pressure sensors and a display device including the same.

Discussion of the Background

Electronic devices such as a smartphone, a tablet personal computer (PC), a digital camera, a notebook computer, a navigation system, and a smart television (TV), which provide images to users, include a display device for displaying images. Display devices include a display panel generating and displaying images and various input devices.

Recently, touch sensors capable of recognizing touch input have widely been employed in display devices, particularly, in smartphones or tablet PCs. Due to the convenience of a touch input method, existing physical input devices such as keypads are increasingly being replaced by touch sensors.

The above information disclosed in this Background section is only for understanding of the background of the inventive concepts, and, therefore, it may contain information that does not constitute prior art.

SUMMARY

To replace existing physical buttons in display devices, research has been conducted into ways to apply not only touch sensors for detecting a touch location, but also pressure sensors for detecting the intensity of pressure.

Touch sensor and display devices incorporating same constructed according to the principles and example implementations of the invention provide a touch sensor with pressure sensors that can detect the intensity of pressure without the aid of additional pressure sensors.

Pressure sensors and touch electrode members constructed according to the principles and example implementations of the invention can be formed together, thereby simplifying the fabrication of the touch sensor, and avoiding an increase in the thickness of the touch sensor. Also, since the pressure sensors constructed according to the principles and example implementations of the invention can replace physical input buttons or can be used together with the physical input buttons, various types of user interfaces can be provided.

In addition, since touch sensors constructed according to the principles and example implementations of the invention can offset noise introduced therein from a display panel or the like, the touch sensitivity of the touch sensor can be improved.

Furthermore, since the pressure sensors constructed according to the principles and example implementations of the invention can compensate for resistance variations caused by temperature, the sensitivity of detection of touch pressure can be improved.

Additional features of the inventive concepts will be set forth in the description which follows, and in part will be apparent from the description, or may be learned by practice of the inventive concepts.

According to one aspect of the invention, a touch sensor includes: a base layer including a sensing area including a first sensing area and a second sensing area that extends from one side of the first sensing area and is angled from the first sensing area, and a non-sensing area disposed on the periphery of the sensing area; first touch electrode members disposed on the base layer and located in the sensing area, each of the first touch electrode members including a plurality of first touch electrodes arranged along a first direction, each of the first touch electrodes including a first opening; second touch electrode members disposed on the base layer and located in the sensing area, each of the second touch electrode members including a plurality of second touch electrodes arranged along a second direction that intersects the first direction, each of the second touch electrodes including a second opening; and a first pressure sensor disposed on the base layer and including a first strain gauge, wherein first strain gauge includes a portion located in the second sensing area, and wherein the portion of the first strain gauge is disposed in the same layer as the plurality of first touch electrodes and the plurality of second touch electrodes, and width of the first sensing area in the first direction may be greater than a width of the second sensing area in the first direction, and a width of the first sensing area in the second direction may be greater than a width of the second sensing area in the second direction.

A width of the first sensing area in the first direction may be greater than a width of the second sensing area in the first direction, and A width of the first sensing area in the second direction may be greater than a width of the second sensing area in the second direction.

A plurality of second touch electrode members may be arranged along the first direction, the plurality of second touch electrodes may define rows along the first direction, and the first strain gauge may be disposed in at least one first row, which may be one of the rows defined by the plurality of second touch electrodes.

The first strain gauge may include a plurality of first resistance lines electrically connected along the first direction and a plurality of second resistance lines electrically connected along the first direction, in the first row, one of the first resistance lines and one of the second resistance lines may be disposed in the second opening and spaced apart from each other in the second openings.

The first resistance lines and the second resistance lines may be located in the second sensing area and may be disposed in the same layer as the plurality of first touch electrodes and the plurality of second touch electrodes.

The first strain gauge may include a first conductive pattern electrically connected to the first resistance lines along the first direction in the first row and having a different shape from the first resistance lines, and a second conductive pattern electrically connected to the second resistance lines in the first row and having a different shape from the second resistance lines, and a pair of the first conductive pattern and the second conductive pattern may be disposed in the second opening, where the first conductive pattern and the second conductive pattern may be disposed in the same layer as the plurality of first touch electrodes and the plurality of second touch electrodes.

A pair of the first conductive pattern and the second conductive pattern may be provided in a plural and a plurality of pairs of the first conductive pattern and the second conductive pattern may be arranged along the first direction, and at least one of the plurality of pairs of the first conductive pattern and the second conductive pattern may be located in the first sensing area.

The first pressure sensor may include a first conductor including a first conductive pattern and a second conductive pattern, a plurality of first touch electrode members may be arranged along the second direction, the plurality of first touch electrodes may define electrode rows along the first direction, and the first conductive pattern and the second conductive pattern may be disposed in at least one first electrode row, which may be one of the electrode rows defined by the plurality of first touch electrodes.

The first conductive pattern and the second conductive pattern may be disposed in the first opening, and where the first conductive pattern and the second conductive pattern may be disposed in the same layer as the plurality of first touch electrodes and the plurality of second touch electrodes.

The first electrode row may be disposed between the first row and a second row which may be adjacent to the first row in the second direction.

The first pressure sensor may include a second strain gauge disposed in the second row and may have the same structure as the first strain gauge and a second conductor which may have the same structure as the first conductor, and the second conductor may be disposed on an opposite side of the second row from the first conductor.

The pressure wires may be located in the non-sensing area and may be disposed on an opposite side of the second sensing area from the first sensing area, where the pressure wires may include a first pressure wire connected to a first end of the first strain gauge, a second pressure wire connected to a second end of the first strain gauge and a first end of the first conductor, a third pressure wire connected to a second end of the first conductor and a first end of the second strain gauge, a fourth pressure wire connected to a second end of the second strain gauge and a first end of the second conductor, and a fifth pressure wire connected to a second end of the second conductor.

The first strain gauge, the second strain gauge, the first conductor, and the second conductor may form a Wheatstone bridge.

The first strain gauge may include a plurality of resistance lines in a first row, which may be electrically connected to each other in the first direction, each of the plurality of resistance lines in the first row may be disposed in the second opening in the first row, and a plurality of resistance lines in a second row adjacent to the first row in the second direction, which may be electrically connected to each other in the first direction, each of the plurality of resistance lines in the second row may be disposed in the second opening in the second row, and a connecting line which may connect one of the plurality of resistance lines in the first row and one of the plurality of resistance lines in the second row along the second direction.

The first pressure sensor may include a first conductor that may include a first conductive pattern and a second conductive pattern, a plurality of first touch electrode members arranged along the second direction, the plurality of first touch electrodes may define electrode rows along the first direction, and the first conductive pattern and the second conductive pattern may be disposed in at least one first electrode row, which may be one of the electrode rows defined by the plurality of first touch electrodes, and where the first electrode row may be disposed opposite site of the first row from the second row.

A Wheatstone bridge circuit may include a first fixed resistor and a second fixed resistor, where the first strain gauge and the first conductor may be connected to the Wheatstone bridge circuit, and the first strain gauge, the first conductor, the first fixed resistor, and the second fixed resistor may form a Wheatstone bridge.

A second pressure sensor may be disposed on the first layer and may include a second strain gauge, where a portion of the second strain gauge may be located in the second sensing area.

The second pressure sensor may have the same structure as the first pressure sensor.

A third pressure sensor may be disposed on the first layer and may include a third strain gauge, where the sensing area may further include a third sensing area which may extend from the other side of the first sensing area and may be angled from the first sensing area, and a portion of the third strain gauge may be located in the third sensing area.

A plurality of second touch electrode members may be arranged along the first direction, the plurality of second touch electrodes may define rows along the first direction, and the first strain gauge and the third strain gauge may be disposed in at least first electrode row, which may be one of the rows defined by the plurality of second touch electrodes.

A first pressure wire may be located in the non-sensing area and connected to the first pressure sensor, a second pressure wire may be located in the non-sensing area and connected to the second pressure sensor, and a third pressure wire may be located in the non-sensing area and connected to the third pressure sensor, where the first pressure wire and the second pressure wires may be disposed on an opposite side of the second sensing area from the first sensing area, and the third pressure wire may be disposed on an opposite side of the third sensing area from the first sensing area.

A plurality of second touch electrode members may be arranged along the first direction, the plurality of second touch electrodes may define rows along the first direction, the first strain gauge may be disposed in at least one first row, which may be one of the rows defined by the plurality of second touch electrodes, and the third strain gauge may be disposed in a different row from the first strain gauge.

A first pressure wire may be located in the non-sensing area and connected to the first pressure sensor; a second pressure wire may be located in the non-sensing area and connected to the second pressure sensor; and a third pressure wire may be located in the non-sensing area and connected to the third pressure sensor, where the first pressure wire, the second pressure wire and the third pressure wire may be disposed on an opposite side of the second sensing area from the first sensing area.

A plurality of noise sensing electrodes may be located in the first sensing area and electrically connected along the first direction, each of the plurality of noise sensing electrodes may be disposed in the first opening and may be spaced apart from the plurality of first touch electrodes.

The touch sensor may further include a touch controller to offset noise in signals detected by the first touch electrode members based on noise signals detected by the plurality of noise sensing electrodes.

According to another aspect of the invention, a display device includes: a display panel including a first display area and a second display area which extends, and is angled from the first display area from one side of the first display area; and a touch sensor layer disposed on the display panel, where the touch sensor layer includes a first pressure sensor, a plurality of touch electrodes which overlap with the second display area and include one or more openings, and a first strain gauge which overlaps with the second display area, and the first strain gauge includes a first resistance line and a second resistance line which are disposed in at least one opening of the openings of the touch electrodes.

The first pressure sensor may further include a first conductor which overlaps the second display area and may have a different shape from the first strain gauge, and the first conductor may include a first conductive pattern and a second conductive pattern which may be disposed in a second opening, which may be another one of the openings of the touch electrodes and may be different from the first opening.

The first pressure sensor may further include a second strain gauge which may overlap the second display area and a second conductor which may overlap the second display area and may have a different shape from the second strain gauge, the second strain gauge may include a third resistance line and a fourth resistance line which may be disposed in a third opening, which may be still another one of the openings of the touch electrodes and may be different from the first and second openings, and the second conductor may include a third conductive pattern and the fourth conductive pattern which may be disposed in a fourth opening, which may be still another one of the openings of the touch electrodes and may be different from the first, second, and third openings.

The first strain gauge, the second strain gauge, the first conductor, and the second conductor may form a Wheatstone bridge.

The touch sensor layer may further include a second pressure sensor and a third pressure sensor, the display panel may further include a third display area which may extend from the other side of the first display area and may be angled from the first display area, the second pressure sensor may overlap the second display area, and the third pressure sensor may overlap the third display area.

Each of the second pressure sensor and the third pressure sensor may include a strain gauge.

The display panel may include a base substrate, self-luminous element disposed on the base substrate, and a thin-film encapsulation layer may be disposed on the self-luminous element, and the touch electrodes and the first strain gauge may be disposed on the thin-film encapsulation layer.

It is to be understood that both the foregoing general description and the following detailed description are example and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate example embodiments of the invention, and together with the description serve to explain the inventive concepts.

FIG. 16 is a plan view illustrating an example embodiment of the planar structure of a third pressure sensor of FIGS. 10 and 11;

FIG. 54 is an enlarged plan view illustrating the first pressure sensor of FIGS. 46 and 47 and the surroundings of the first pressure sensor;

FIG. 61 is a Wheatstone bridge circuit connected to the first pressure sensor of FIG. 60, FIG. 62 is a Wheatstone bridge circuit connected to the second pressure sensor of FIG. 60, and FIG. 63 is a Wheatstone bridge circuit connected to the third pressure sensor of FIG. 60.

DETAILED DESCRIPTION

Figure 1:
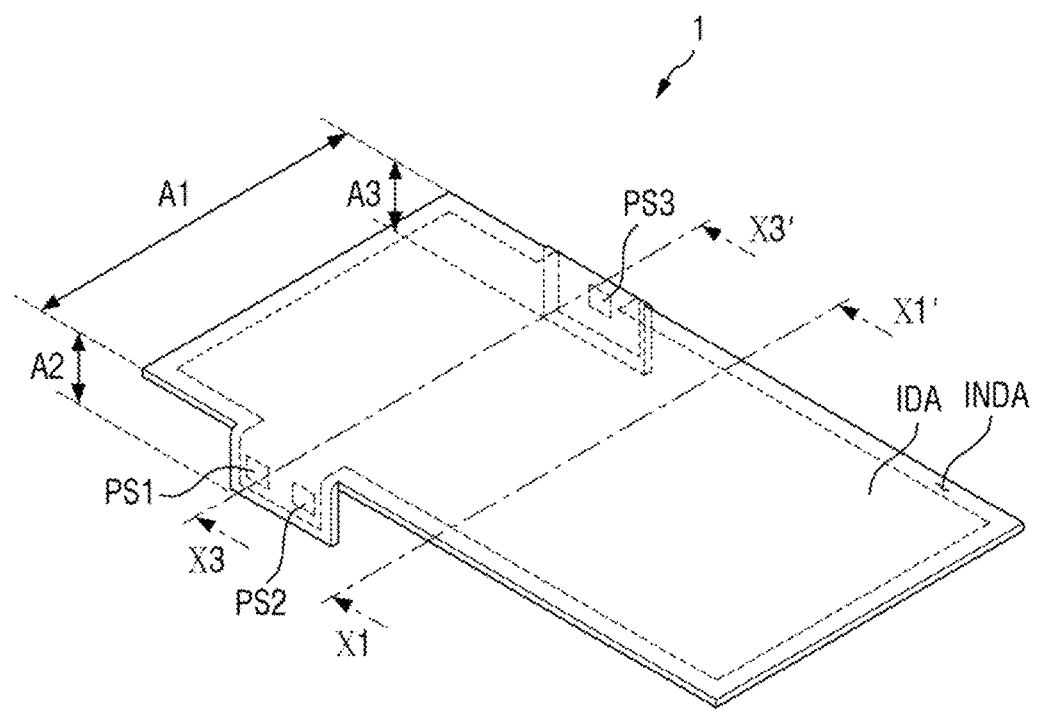
FIG. 1 is a perspective view of an example embodiment of a display device constructed according to the principles of the invention.

In the following description, for the purposes of explanation, numerous specific details are set forth in order to provide a thorough understanding of various example embodiments or implementations of the invention. As used herein "embodiments" and "implementations" are interchangeable words that are non-limiting examples of devices or methods employing one or more of the inventive concepts disclosed herein. It is apparent, however, that various example embodiments may be practiced without these specific details or with one or more equivalent arrangements. In other instances, well-known structures and devices are shown in block diagram form in order to avoid unnecessarily obscuring various example embodiments. Further, various example embodiments may be different, but do not have to be exclusive. For example, specific shapes, configurations, and characteristics of an example embodiment may be used or implemented in another example embodiment without departing from the inventive concepts.

Unless otherwise specified, the illustrated example embodiments are to be understood as providing example features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an example embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/of" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the example term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various example embodiments are described herein with reference to sectional and/or exploded illustrations that are schematic illustrations of idealized example embodiments and/or intermediate structures. As such, variations from the shapes of the illustrations as a result, for example, of manufacturing techniques and/or tolerances, are to be expected. Thus, example embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a perspective view of an example embodiment of a display device constructed according to the principles of the invention.

Referring to FIG. 1, a display device 1 may be applied to a mobile terminal. Examples of the mobile terminal include a tablet personal computer (PC), a smartphone, a personal digital assistant (PDA), a portable multimedia player (PMP), a gaming console, a wristwatch-type electronic device, and the like. However, the type of the display device 1 is not particularly limited. For example, the display device 1 may be used not only in a large-size electronic device such as a television (TV) or an external billboard, but also in a small- or medium-size electronic device such as a PC, a notebook computer, a car navigation device, or a camera.

With reference to the drawings, the terms "on", "above", "upper", "top", and "top surface", as used herein, refer to a third direction z, which intersects first and second directions x and y, and the terms "below", "lower", "bottom", and "bottom surface", as used herein, refer to the opposite direction of the third direction z, although different orientations may be encompassed, as discussed above.

The display device 1 may include first, second, and third areas A1, A2, and A3 which are disposed on different planes. The first area A1 may include a pair of short sides extending in the first direction x and a pair of long sides extending in the second direction y. The corners at which the long sides and the short sides of the first area A1 meet may be rounded. However, the planar shape of the first area A1 is not particularly limited. Alternatively, the first area A1 may have a generally circular shape or another shape. The first area A1 may be placed on a first plane. In some embodiments, the first area A1 may be used as a main display surface of the display device 1.

The second area A2 is disposed on one side of one of the long sides of the first area A1 and is connected to, but angled, curved or bent from, the first area A1. The second area A2 may be placed on a second plane which has a predetermined intersecting angle with the first plane or may be curved. In some embodiments, the second area A2 may be angled, curved or bent from the first area A1 in a downward direction from the first area A1.

The third area A3 is disposed on one side of the other long side of the first area A1 and is connected to, but angle, curved or bent from, the first area A1. That is, the second and third areas A2 and A3 may be on opposite sides of the first area A1. The third area A3 may be placed on a third plane which has a predetermined intersecting angle with the first plane or may be curved. In some embodiments, the third area A3 may be angled, curved or bent from the first area A1 in the downward direction from the first area A1.

In the description that follows, it is assumed that the first, second, and third areas A1, A2, and A3 are a substantially flat portion, a first side portion, and a second side portion, respectively, of the display device 1, but the example embodiments are not limited thereto.

The display device 1 may be divided, depending on whether images can be displayed, into a display area IDA in which images are displayed and a peripheral area INDA which is adjacent to the display area IDA. The display area IDA may be an area where images are displayed, and the peripheral area INDA may be an area where images are not substantively displayed.

In some embodiments, the display area IDA may be disposed in and across the first, second, and third areas A1, A2, and A3, and the peripheral area INDA may surround the display area IDA. In some embodiments, portions of the display area IDA in the first and second areas A1 and A2 are separated, but continuous, and portions of the display area IDA in the second and third areas A2 and A3 are also not separated, but continuous.

In some embodiments, the display device 1 may include pressure sensors. The pressure sensors may be used as an input device of the display device 1 and may replace physical buttons. For example, the pressure sensors may function as a volume button, a power button, and/or a menu button of the display device 1.

FIG. 1 illustrates that the display device 1 includes, for example, first, second, and third pressure sensors PS1, PS2, and PS3. In some embodiments, the first and second pressure sensors PS1 and PS2 may be disposed in the second area A2, particularly, in part of the display area IDA in the second area A2. The third pressure sensor PS3 may be disposed in the third area A3, particularly, in the display area IDA in the third area A3. In the description that follows, it is assumed that the display device 1 includes the first, second, and third pressure sensors PS1, PS2, and PS3, but the example embodiments are not limited thereto. Alternatively, at least one of the first, second, and third pressure sensors PS1, PS2, and PS3 may not be provided. Still alternatively, one or more pressure sensors may be further provided in addition to the first, second, and third pressure sensors PS1, PS2, and PS3.

In some embodiments, the first, second, and third pressure sensors PS1, PS2, and PS3 may include strain gauges. In other embodiments, the first, second, and third pressure sensors PS1, PS2, and PS3 may include transducers such as variable capacitors or variable inductors. In the description that follows, it is assumed that the first, second, and third pressure sensors PS1, PS2, and PS3 include, for example, strain gauges.

Figure 2:
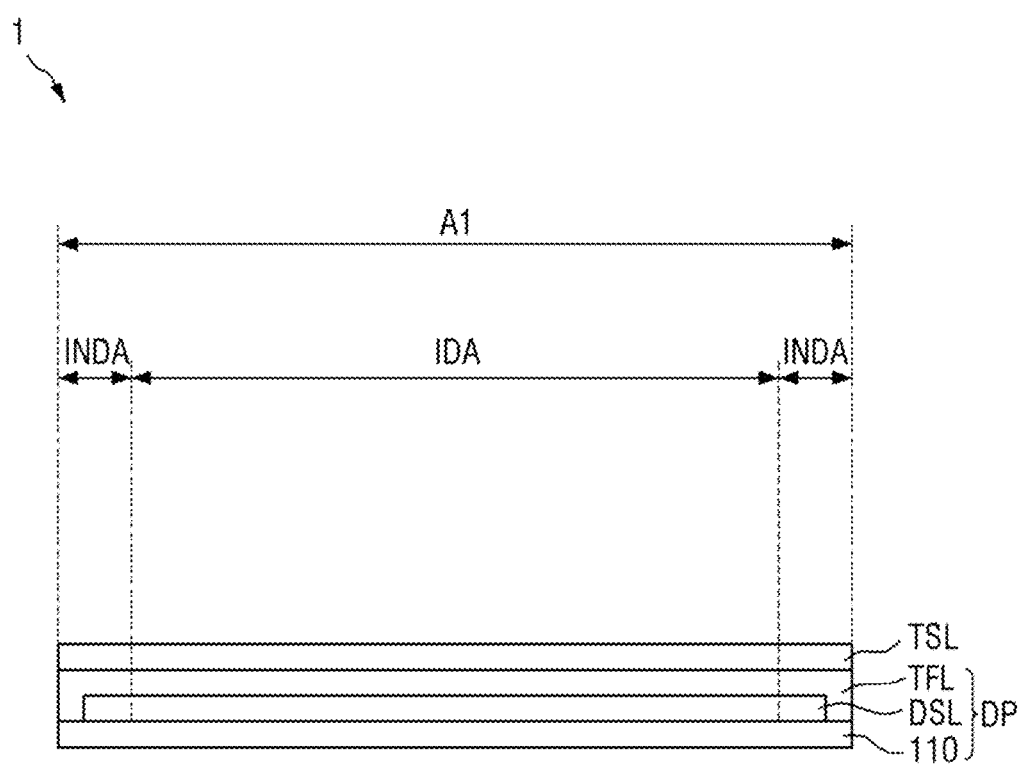
FIG. 2 is a cross-sectional view taken along line X1-X1' of FIG. 1.
Figure 3:
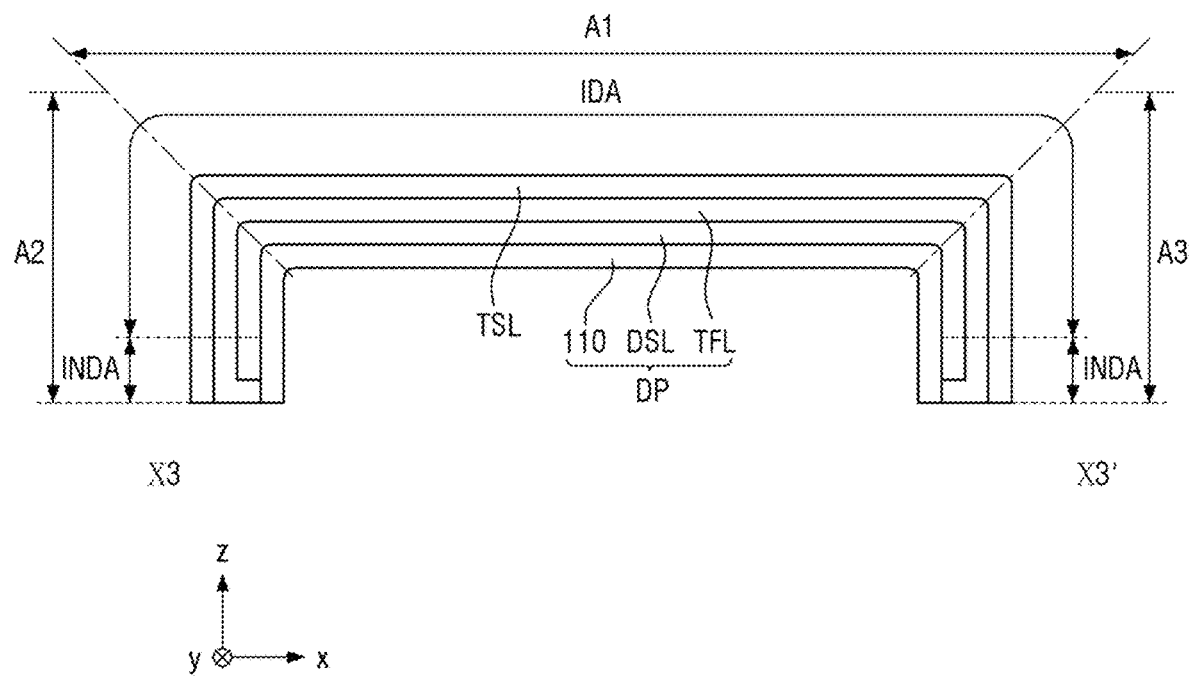
FIG. 3 is a cross-sectional view taken along line X3-X3' of FIG. 1.
Figure 4:
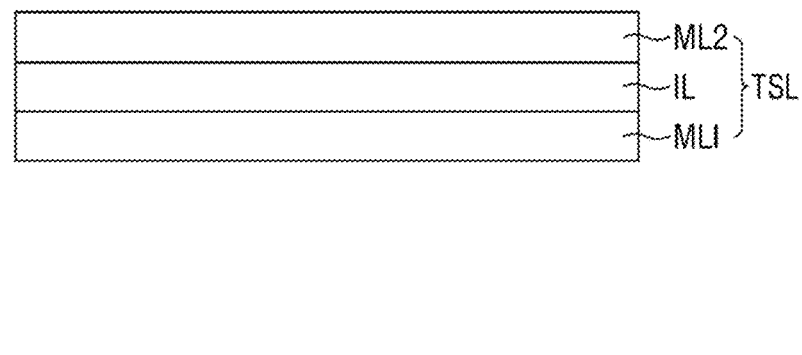
FIG. 4 is an enlarged cross-sectional view illustrating the touch sensor layer of FIGS. 2 and 3.
Figure 5:
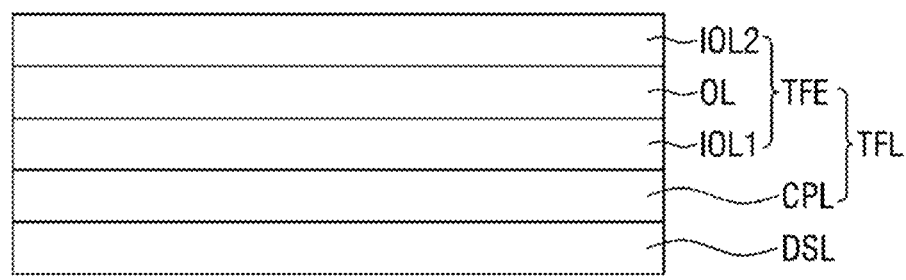
FIG. 5 is an enlarged cross-sectional view illustrating the upper insulating layer of FIGS. 2 and 3.

FIG. 2 is a cross-sectional view taken along line X1-X1' of FIG. 1, FIG. 3 is a cross-sectional view taken along line X3-X3' of FIG. 1, FIG. 4 is an enlarged cross-sectional view illustrating a touch sensor layer of FIGS. 2 and 3, and FIG. 5 is an enlarged cross-sectional view illustrating an upper insulating layer of FIGS. 2 and 3.

Referring to FIGS. 2 through 5, the display device 1 includes a display panel DP and a touch sensor. The touch sensor may include a touch sensor layer TSL which is disposed on the display panel DP. The display panel DP generates an image, and the touch sensor acquires coordinate information of external input (such as a touch event). The display device 1 may further include a protection member that is disposed on a lower side of the display panel DP, an antireflection member, and/or a window member, and the antireflection member and the window member may be disposed on an upper side of the touch sensor layer TSL.

In some embodiments, the display panel DP may include self-luminous elements. For example, the self-luminous elements may be organic light-emitting diodes (OLEDs), quantum-dot light-emitting diodes (QLEDs), inorganic-based micro-light-emitting diodes (mLEDs), and/or inorganic-based nano-light-emitting diodes (nanoLEDs). In the description that follows, it is assumed that the self-luminous elements are, for example, OLEDs.

The display panel DP may include a base substrate 110, an element layer DSL which is disposed on the base substrate 110, and an upper insulating layer TFL which is disposed on the element layer DSL.

The base substrate 110 is a substrate that supports the element layer DSL. In some embodiments, the base substrate 110 may include an insulating material. In some embodiments, the base substrate 110 may include an insulating material. In some embodiments, the base substrate 110 may be a flexible substrate and may include an insulating material such as a polymer resin. Examples of the polymer resin include polyethersulphone (PES), polyacrylate (PA), polyarylate (PAR), polyetherimide (PEI), polyethylene naphthalate (PEN), polyethylene terephthalate (PET), polyphenylene sulfide (PPS), polyallylate, polyimide (PI), polycarbonate (PC), cellulose triacetate (CAT), cellulose propionate (CAP), and a combination thereof.

The element layer DSL is disposed on the base substrate 110. In some embodiments, the element layer DSL may include a plurality of pixels and a plurality of display signal lines which are disposed on the base substrate 110. Each of the pixels may include a thin-film transistor (TFT), a capacitor, and a light-emitting element. The display signal lines may include scan lines which transmit scan signals to the pixels and data lines which transmit data lines to the pixels.

In some embodiments, the pixels of the element layer DSL may be disposed in the display area IDA.

The element layer DSL may further include elements and wires which are disposed on the base substrate 110 and are disposed in the peripheral area INDA. The elements and the wires may generate or transmit various signals to be applied to the pixels.

The upper insulating layer TFL may be disposed on the element layer DSL. The upper insulating layer TFL may protect the element layer DSL.

As illustrated in FIG. 5, the upper insulating layer TFL may include a thin-film encapsulation layer TFE, and may further include a capping layer CPL.

The thin-film encapsulation layer TFE may include a first inorganic layer IOL1, an organic layer OL, and a second inorganic layer IOL2.

The capping layer CPL may be disposed on the element layer DSL. In some embodiments, the capping layer CPL may be disposed on a cathode electrode of the element layer DSL. In some embodiments, the capping layer CPL may be in contact with the cathode electrode. The capping layer CPL may include an organic material.

The thin-film encapsulation layer TFE may include the first inorganic layer IOL1, the organic layer OL, and the second inorganic layer IOL2.

The first inorganic layer IOL1 is disposed on, and in contact with, the capping layer CPL. The organic layer OL is disposed on, and in contact with, the first inorganic layer IOL1. The second inorganic layer IOL2 is disposed on, and in contact with, the organic layer OL.

The capping layer CPL protects the cathode electrode from a subsequent process such as, for example, a sputtering process and improves the emission efficiency of the self-luminous elements. The capping layer CPL may have a greater refractive index than the first inorganic layer IOL1.

The first and second inorganic layers IOL1 and IOL2 protect the element layer DSL from moisture and/or oxygen, and the organic layer OL protects the element layer DSL from foreign materials such as dust particles. The first and second inorganic layers IOL1 and IOL2 may be silicon nitride layers, silicon oxynitride layers, or silicon oxide layers. For example, the first and second inorganic layers IOL1 and IOL2 may include titanium oxide layers or aluminum oxide layers, and the organic layer OL may include an acrylic organic layer. However, the example embodiments are not limited to this example.

An inorganic layer such as, for example, a lithium fluoride (LiF) layer, may be further disposed between the capping layer CPL and the first inorganic layer IOL1. The LiF layer can improve the emission efficiency of the self-luminous elements.

The touch sensor layer TSL may be disposed on the upper insulating layer TFL. In some embodiments, the touch sensor layer TSL may be disposed on the thin-film encapsulation layer TFE, and no separate bonding layer (e.g., an adhesive layer) may be disposed between the thin-film encapsulation layer TFE and the touch sensor layer TSL. For example, at least one of a touch electrode portion, touch wiring, and pressure wiring included in the touch sensor layer TSL may be disposed directly on the thin-film encapsulation layer TFE. Alternatively, in a case where a separate buffer or insulating layer is disposed between the touch sensor layer TSL and the thin-film encapsulation layer TFE, at least one of the touch electrode portion, the touch wiring, and the pressure wiring of the touch sensor layer TSL may be disposed directly on the buffer or insulating layer on the thin-film encapsulation layer TFE. That is, a base layer that provides a base surface to the touch sensor layer TSL may be the thin-film encapsulation layer TFE or may include the thin-film encapsulation layer TFE.

The touch sensor including the touch sensor layer TSL may acquire the coordinates of touch input in a capacitive manner. The capacitive manner may be a self-capacitance manner or a mutual capacitance manner. In the description that follows, it is assumed that the touch sensor layer TSL is configured to have, for example, a mutual capacitance structure, but the example embodiments are not limited thereto.

In some embodiments, a portion of the touch sensor layer TSL in the display area IDA may include the touch electrode portion, and a portion of the touch sensor layer TSL in the peripheral area INDA may include touch signal lines (not illustrated) transmitting signals to, and/or receiving signals from, the touch electrode portion.

In some embodiments, the touch sensor layer TSL may include the first, second, and third pressure sensors PS1, PS2, and PS3 of FIG. 1.

In some embodiments, as illustrated in FIG. 4, the touch sensor layer TSL may include a first conductive layer ML1, an insulating layer IL, and a second conductive layer ML2.

The first conductive layer ML1 may include an opaque conductive material. In some embodiments, the first conductive layer ML1 may include a metal such as gold (Au), silver (Ag), aluminum (Al), molybdenum (Mo), chromium (Cr), titanium (Ti), nickel (Ni), neodymium (Nd), copper (Cu), platinum (Pt), or an alloy thereof. In some embodiments, the first conductive layer ML1 may have a single-layer structure or a multilayer structure. For example, the first conductive layer ML1 may have a triple layer structure of Ti/Al/Ti.

The insulating layer IL may be disposed on the first conductive layer ML1. The insulating layer IL may be disposed between the first and second conductive layers ML1 and ML2. In some embodiments, the insulating layer IL may include an insulating material. In some embodiments, the insulating material may be an inorganic insulating material or an organic insulating material. The inorganic insulating material may include at least one of aluminum oxide, titanium oxide, silicon oxide, silicon oxynitride, zirconium oxide, and hafnium oxide. The organic insulating material may include at least one of an acrylic resin, a methacrylic resin, polyisoprene, a vinyl resin, an epoxy resin, a urethane resin, a cellulose resin, a siloxane resin, a polyimide (PI) resin, a polyamide resin, and a perylene resin.

The second conductive layer ML2 may be disposed on the insulating layer IL. In some embodiments, the second conductive layer ML2 may include a conductive material with optical transparency. For example, the conductive material may be silver nanowire (Ag-NW), indium tin oxide (ITO), indium zinc oxide (IZO), aluminum-doped zinc oxide (AZO), indium tin zinc oxide (ITZO), zinc oxide (ZnO), tin oxide ($SnO_2$), carbon nanotube, graphene, or a conductive polymer e.g., poly(3,4-ethylenedioxythiophene (PEDOT). Alternatively, if optical transparency is ensured, the second conductive layer ML2 may include a conductive material such as a metal or an alloy thereof. Examples of the metal include Au, Ag, Al, Mo, Cr, Ti, Ni, Nd, Cu, and Pt. In some embodiments, in a case where the second conductive layer ML2 is formed of a metal or an alloy thereof, the second conductive layer ML2 may have a mesh structure to be invisible to a user. In the description that follows, it is assumed that the second conductive layer ML2 has, for example, a mesh structure.

Figure 6:
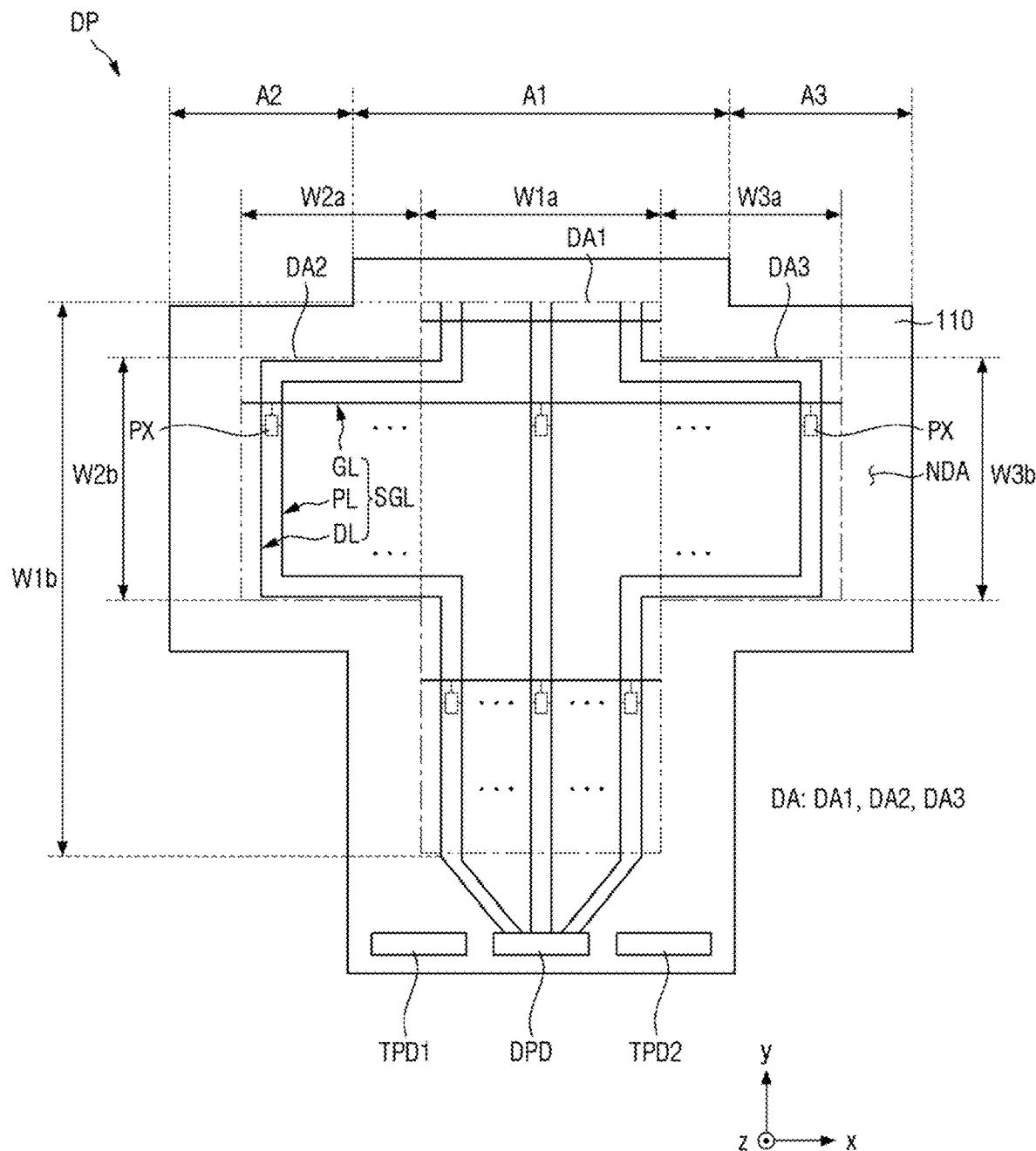
FIG. 6 is a plan view illustrating the display panel of FIGS. 2 and 3 in its unfolded state.
Figure 7:
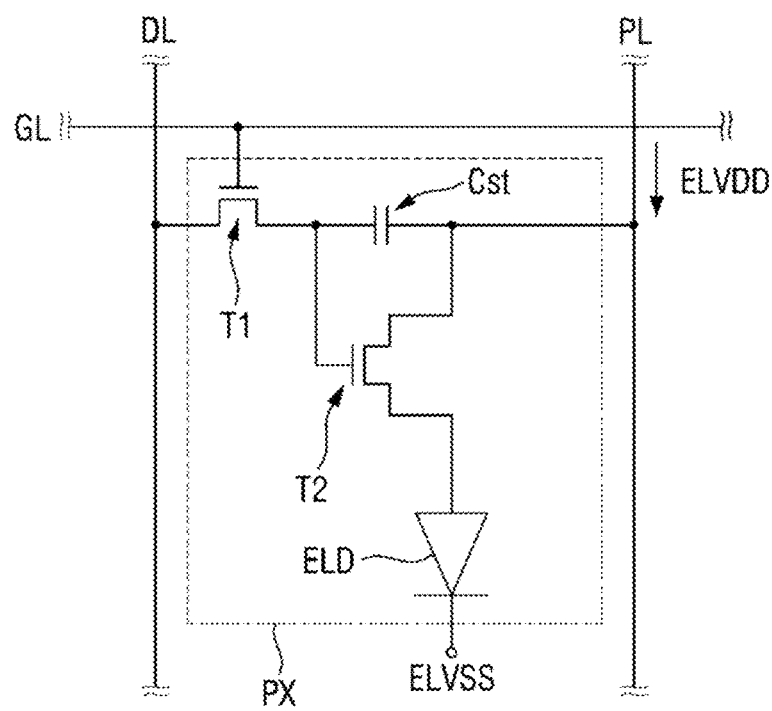
FIG. 7 is an equivalent circuit diagram of a representative pixel illustrated in FIG. 6.
Figure 8:
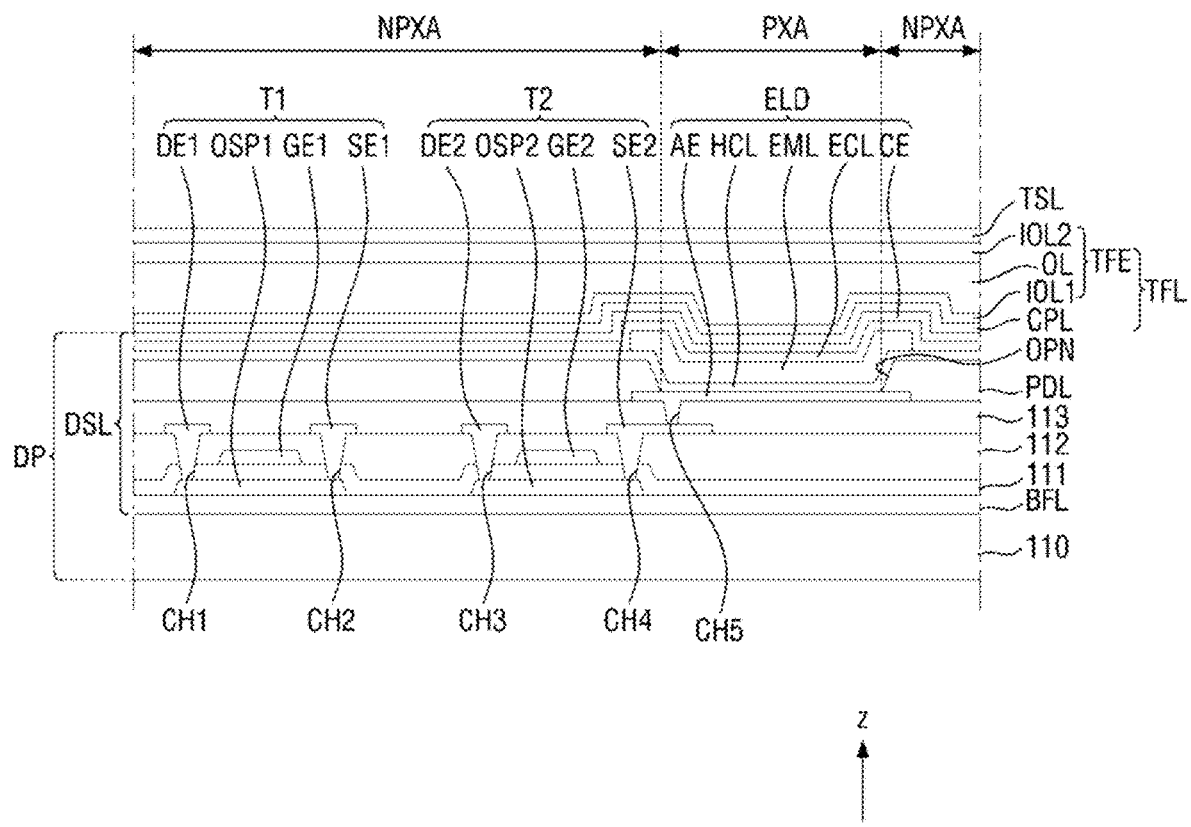
FIG. 8 is an example cross-sectional view of the pixel of FIG. 7.

FIG. 6 is a plan view illustrating the display panel of FIGS. 2 and 3, FIG. 7 is an equivalent circuit diagram of a representative pixel illustrated in FIG. 6, and FIG. 8 is an example cross-sectional view illustrating the pixel of FIG. 7.

Referring to FIGS. 6 through 8, a display area DA and a non-display area NDA corresponding to the display area IDA and the peripheral area INDA, respectively, of the display device 1 may be defined on the display panel DP or the base substrate 110. The expression "one area corresponding to another area", as used herein, denotes that the two areas overlap with each other, but do not necessarily have the same size.

The display area DA may include a first display area DA1 which is located in the first area A1, a second display area DA2 at least a portion of which is located in the first and second areas A1 and A2, and a third display area DA3 at least a portion of which is located in the first and third areas A1 and A3.

In some embodiments, a first width W1$a$, in the first direction x, of the first display area DA1 may be greater than a first width W2$a$, in the first direction x, of the second display area DA2 and a first width W3$a$, in the first direction x, of the third display area DA3. Also, a second width W1$b$, in the second direction y, of the first display area DA1 may be greater than a second width W2$b$, in the second direction y, of the second display area DA2 and a second width W3$b$, in the second direction y, of the third display area DA3.

In some embodiments, the maximum width, in the first direction x, of the display area DA may be substantially the same as the sum of the first widths W1$a$, W2$a$, and W3$a$ of the first, second, and third display areas DA1, DA2, and DA3. Also, in some embodiments, the maximum width, in the second direction y, of the display area DA may be substantially the same as the second width W1b of the first display area DAL.

In the display area DA, a plurality of signal lines SGL and a plurality of pixels PX may be disposed on the base substrate 110. In the non-display area NDA, a signal pad portion DPD may be disposed on the base substrate 110, and touch wiring and a touch pad portion (TPD1 and TPD2), which are included in the touch sensor layer TSL, may be further disposed on the base substrate 110.

The signal lines SGL, the pixels PX, the signal pad portion DPD may be included in the element layer DSL. In some embodiments, the touch pad portion (TPD1 and TPD2) may be further included in the element layer DSL.

The signal lines SGL may include scan lines GL, data lines DL, and power lines PL.

The scan lines GL are connected to the pixels PX and transmit scan signals to the pixels PX.

The data lines DL are connected to the pixels PX and transmit data signals to the pixels PX.

The power lines PL are connected to the pixels PX and transmit driving voltages to the pixels PX.

The signal pad portion DPD may be disposed in the non-display area NDA and may be connected to the signal lines SGL, particularly, to the data lines DL. The signal pad portion DPD may receive data signals from the outside.

In some embodiments, the scan lines GL may extend in the first direction x, and the data lines DL may extend in the second direction y. In some embodiments, the power lines PL may extend in the same direction as the data lines DL, i.e., in the second direction y, but the example embodiments are not limited thereto.

FIG. 7 illustrates a scan line GL, a data line DL, a power line PL, and a pixel PX connected to the scan line GL, the data line DL, and the power line PL. The structure of the pixel PX is not limited to that illustrated in FIG. 7, but may vary.

Referring to FIG. 7, the pixel PX includes a self-luminous element ELD and a first transistor (or switching transistor) T1, a second transistor (or driving transistor) T2, and a capacitor Cst which are for driving the self-luminous element ELD. A first power supply voltage ELVDD is provided to the second transistor T2, a second power supply voltage ELVSS is provided to the self-luminous element ELD. The second power supply voltage ELVSS may be lower than the first power supply voltage ELVDD.

The first transistor T1 outputs a data signal applied to the data line DL in response to a scan signal applied to the scan line GL. The capacitor Cst charges a voltage corresponding to the data signal received from the first transistor T1. The second transistor T2 is connected to the self-luminous element ELD. The second transistor T2 controls a driving current flowing in the self-luminous element ELD in accordance with the amount of charge stored in the capacitor Cst.

The equivalent circuit of the pixel PX is example and is not limited to that illustrated in FIG. 7. The pixel PX may further include multiple transistors and may include more than one capacitor. The self-luminous element ELD may be connected between the power line PL and the second transistor T2.

In some embodiments, the self-luminous element ELD may be an OLED, but the example embodiments are not limited thereto. Alternatively, the self-luminous element ELD may be a QLED, an inorganic-based light-emitting diode (LED), an inorganic-based mLED, or an inorganic-based nanoLED, for example.

FIG. 8 is a partial cross-sectional view illustrating part of the display panel DP corresponding to the equivalent circuit of FIG. 7 and also illustrating the touch sensor layer TSL.

The lamination structure of the display panel DP will hereinafter be described in detail.

A buffer layer BFL may be disposed on the base substrate 110.

A semiconductor pattern OSP1 (hereinafter, the first semiconductor pattern OSP1) of the first transistor T1 and a semiconductor pattern OSP2 (hereinafter, the second semiconductor pattern OSP2) of the second transistor T2 may be disposed on the buffer layer BFL. The first and second semiconductor patterns OSP1 and OSP2 may be formed of a material selected from among amorphous silicon, polysilicon, and a metal oxide semiconductor. In some embodiments, one of the first and second semiconductor patterns OSP1 and OSP2 may be formed of polysilicon, and the other semiconductor pattern may be formed of a metal oxide semiconductor.

A first insulating layer 111 is disposed on the first and second semiconductor patterns OSP1 and OSP2. A control electrode GE1 (hereinafter, the first control electrode GE1) of the first transistor T1 and a control electrode GE2 (hereinafter, the second control electrode GE2) of the second transistor T2 are disposed on the first insulating layer 111. In a case where the first and second control electrodes GE1 and GE2 are disposed in the same layer, the first and second control electrodes GE1 and GE2 may be fabricated by the same photolithography process as the scan lines GL of FIG. 6, but the example embodiments are not limited thereto. Alternatively, the first and second control electrodes GE1 and GE2 may be disposed in different layers, in which case, only one of the first and second control electrodes GE1 and GE2 may be fabricated by the same photolithography process as the scan lines GL of FIG. 6.

A second insulating layer 112 which covers the first and second control electrodes GE1 and GE2 is disposed on the first insulating layer 111. An input electrode DE1 (hereinafter, the first input electrode DE1) and an output electrode SE1 (hereinafter, the first output electrode SE1) of the first transistor T1 and an input electrode DE2 (hereinafter, the second input electrode DE2) and an output electrode SE2 (hereinafter, the second output electrode SE2) of the second transistor T2 are disposed on the second insulating layer 112.

In some embodiments, the first and second insulating layers 111 and 112 may include an inorganic material or an organic material.

The first input electrode DE1 and the first output electrode SE1 are connected to the first semiconductor pattern OSP1 via first and second through holes CH1 and CH2, respectively, which penetrate the first and second insulating layers 111 and 112. The second input electrode DE2 and the second output electrode SE2 are connected to the second semiconductor pattern OSP2 via third and fourth through holes CH3 and CH4, respectively, which penetrate the first and second insulating layers 111 and 112. In other embodiments, the first and second transistors T1 and T2 may be modified to have a bottom gate structure.

An intermediate organic layer 113 which covers the first input electrode DE1, the second input electrode DE2, the first output electrode SE1, and the second output electrode SE2 is formed on the second insulating layer 112. The intermediate organic layer 113 may provide a flat surface.

A pixel definition layer PDL and the self-luminous element ELD may be disposed on the intermediate organic layer 113. The pixel definition layer PDL may include an organic material. An anode electrode AE is disposed on the intermediate organic layer 113. The anode electrode AE is connected to the second output electrode SE2 via a fifth through hole CH5 which penetrates the intermediate organic layer 113. In the pixel definition layer PDL, an opening OPN which exposes a portion of the anode electrode AE may be defined.

The pixel PX may be disposed in the display area DA. The display area DA may include an emission area PXA and a non-emission area NPXA which is adjacent to the emission area PXA. The non-emission area NPXA may surround the emission area PXA, as discussed in further detail hereinafter with respect to FIG. 23. The emission area PXA is defined to correspond to the portion of the anode electrode AE exposed by the opening OPN.

The emission area PXA may overlap with at least one of the first and second transistors T1 and T2. Accordingly, the opening OPN may become wider, and the anode electrode AE and an emission layer EML that will be described later may also become wider.

A hole control layer HCL may be disposed in common in both the emission area PXA and the non-emission area NPXA. A common layer such as the hole control layer HCL may be formed in common for all the pixels PX of FIG. 6.

The emission layer EML is disposed on the hole control layer HCL. The emission layer EML may generate light of a predetermined color. The emission layer EML may be disposed to correspond to the opening OPN. In some embodiments, the emission layer EML may be formed as separate segments for the respective pixels PX, but the example embodiments are not limited thereto. In other embodiments, a portion of the emission layer EML may be disposed across two or more pixels PX.

In a case where the self-luminous element ELD is an OLED, the emission layer EML may include an organic material. That is, in some embodiments, the emission layer EML may be an organic emission layer.

In a case where the self-luminous element ELD is a QLED, the emission layer EML may include a quantum-dot material. That is, the emission layer EML may be a quantum-dot emission layer.

The quantum-dot material can control the color of light emitted therefrom depending on the particle size thereof and can thus emit light of various colors such as blue, red, and green.

An electron control layer ECL is disposed on the emission layer EML. The electron control layer ECL may be formed in common for all the pixels PX of FIG. 6.

A cathode electrode CE is disposed on the electron control layer ECL. The cathode electrode CE is disposed in common for all the pixels PX.

The upper insulating layer TFL is disposed on the cathode electrode CE, and the touch sensor layer TSL may be disposed on the upper insulating layer TFL or on the thin-film encapsulation layer TFE.

The anode electrode AE, the hole control layer HCL, the emission layer EML, the electron control layer ECL, and the cathode electrode CE, which are disposed in the emission layer PXA, may form the self-luminous element ELD.

That is, the self-luminous element ELD may be defined as a part where the anode electrode AE, the hole control layer HCL, the emission layer EML, the electron control layer ECL, and the cathode electrode CE are all disposed in the emission area PXA.

Figure 9:
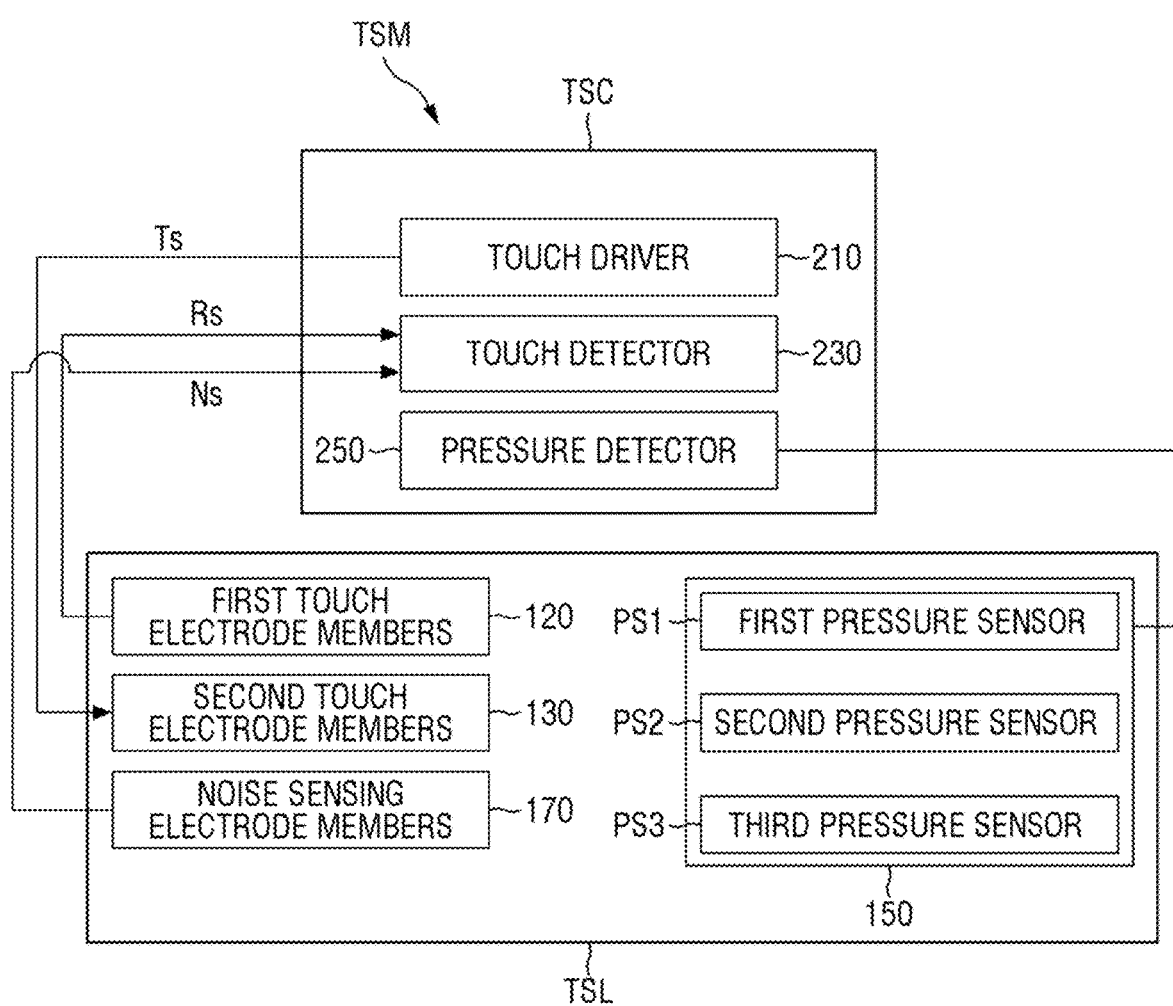
FIG. 9 is a block diagram of an example embodiment a touch sensor constructed according to principles of the invention included in the display device of FIG. 1.

FIG. 9 is a block diagram of an example embodiment of a touch sensor constructed according to principles of the invention included in the display device of FIG. 1.

Referring to FIG. 9, a touch sensor TSM includes the touch sensor layer TSL and a touch controller TSC.

The touch sensor layer TSL may include a plurality of first touch electrode members 120 and a plurality of second touch electrode members 130 which are both for detecting touch input.

The first touch electrode members 120 and the second touch electrode members 130 may be electrically connected to the touch controller TSC. In other words, the first touch electrode members 120 and the second touch electrode members 130 may be electrically coupled to the touch controller TSC.

Hereinafter, the meaning of "electrically connected" is the same as the meaning of "electrically coupled".

In some embodiments, the second touch electrode members 130 may be driving electrode portions which receive, from the touch controller TSC, driving signals Ts for detecting touch input, and the first touch electrode members 120 may be sensing electrode portions which output sensing signals Rs for detecting touch input. In other embodiments, the first touch electrode members 120 may be driving electrode portions which receive the driving signals Ts, and the second touch electrode members 130 may be sensing electrode portions which output the sensing signals Rs. In the description that follows, it is assumed that the first touch electrode members 120 are, for example, sensing electrode portions and the second touch electrode members 130 are, for example, driving electrode portions, but the example embodiments are not limited thereto.

The first touch electrode members 120 and the second touch electrode members 130 may overlap with at least one electrode provided in the display panel DP. For example, in a case where the display panel DP is an OLED display panel, the first touch electrode members 120 and the second touch electrode members 130 may overlap with the cathode electrode CE of the display panel DP of FIG. 8.

The touch sensor layer TSL may further include noise sensing electrode members 170.

The noise sensing electrode members 170 may be electrically connected to the touch controller TSC, particularly, to a touch detector 230 that will be described later. The noise sensing electrode members 170 may detect noise generated in the touch sensor layer TSL and may provide the detected noise to the touch detector 230 as the sensing signals Rs.

The touch sensor layer TSL may further include pressure sensors 150. In some embodiments, the pressure sensors 150 may include the first, second, and third pressure sensors PS1, PS2, and PS3. In some embodiments, the resistance of the pressure sensors 150 may vary depending on a force or pressure applied to the pressure sensors 150 from the outside. The pressure sensors 150 may be electrically connected to a pressure detector 250.

The touch controller TSC may be electrically connected to the touch sensor layer TSL and may detect the location of touch input by providing the driving signals Ts to the touch sensor layer TSL and receiving the sensing signals Rs, which correspond to the driving signals Ts, from the touch sensor layer TSL. Also, the touch controller TSC may be electrically connected to the pressure sensors 150 and may detect touch pressure or a touch force.

In some embodiments, the touch controller TSC may include a touch driver 210, the touch detector 230, and the pressure detector 250.

The touch driver 210 may provide the driving signals Ts, which are for detecting touch input, to the second touch electrode members 130.

The touch detector 230 may detect the presence and/or the location of touch input by receiving the sensing signals Rs, which correspond to the driving signals Ts, from the first touch electrode members 120. In some embodiments, the sensing signals Rs may be variations in the mutual capacitances generated between the first touch electrode members 120 and the second touch electrode members 130. Specifically, in response to touch input being generated, the capacitance at or near the location where the touch input is provided varies. The touch detector 230 may receive variations in the mutual capacitances between the first touch electrode members 120 and the second touch electrode members 130 as the sensing signals Rs and may identify the presence and/or the location of touch input based on the received mutual capacitance variations. Also, the touch detector 230 may receive a noise sensing signal Ns from the noise sensing electrode members 170 and may remove or offset noise included in the sensing signals Rs by using the noise sensing signal Ns.

In some embodiments, the touch detector 230 includes at least one amplifier which amplifies the sensing signals Rs, an analog-to-digital converter which is connected to the output terminal of the amplifier, and a processor. This will be described later with reference to FIG. 28.

The pressure detector 250 may be electrically connected to the pressure sensors 150 and may detect touch pressure or a touch force based on variations in the resistances of the pressure sensors 150. In some embodiments, the pressure detector 250 may include at least one Wheatstone bridge circuit.

In some embodiments, the touch driver 210, the touch detector 230, and the pressure detector 250 may be integrated into a single touch integrated circuit (IC), but the example embodiments are not limited thereto.

In other embodiments, the touch driver 210 and the touch detector 230 may be integrated into a single touch IC, and the pressure detector 250 may be provided outside the touch IC. For example, the pressure detector 250 may be disposed on the display panel DP or on a separate flexible printed circuit board (FPCB).

The touch sensor TSM will hereinafter be described in further detail with reference to FIGS. 10 through 27.

Figure 10:
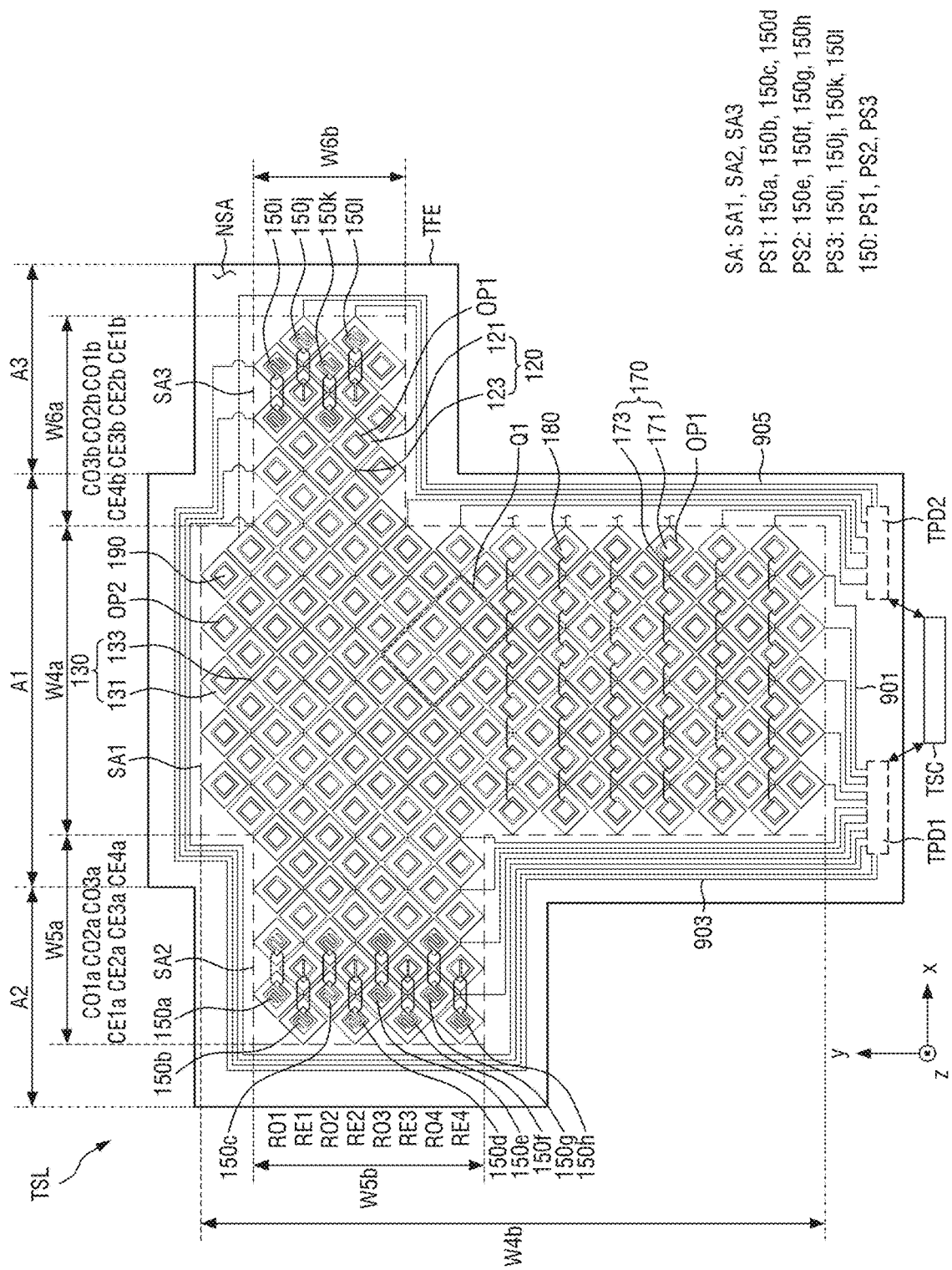
FIGS. 10 and 11 illustrate an example embodiment of the planar structure of a touch sensor layer of the touch sensor of FIG. 9 in its unfolded state and how the touch sensor layer and a touch controller of the touch sensor of FIG. 9 are connected.
Figure 11:
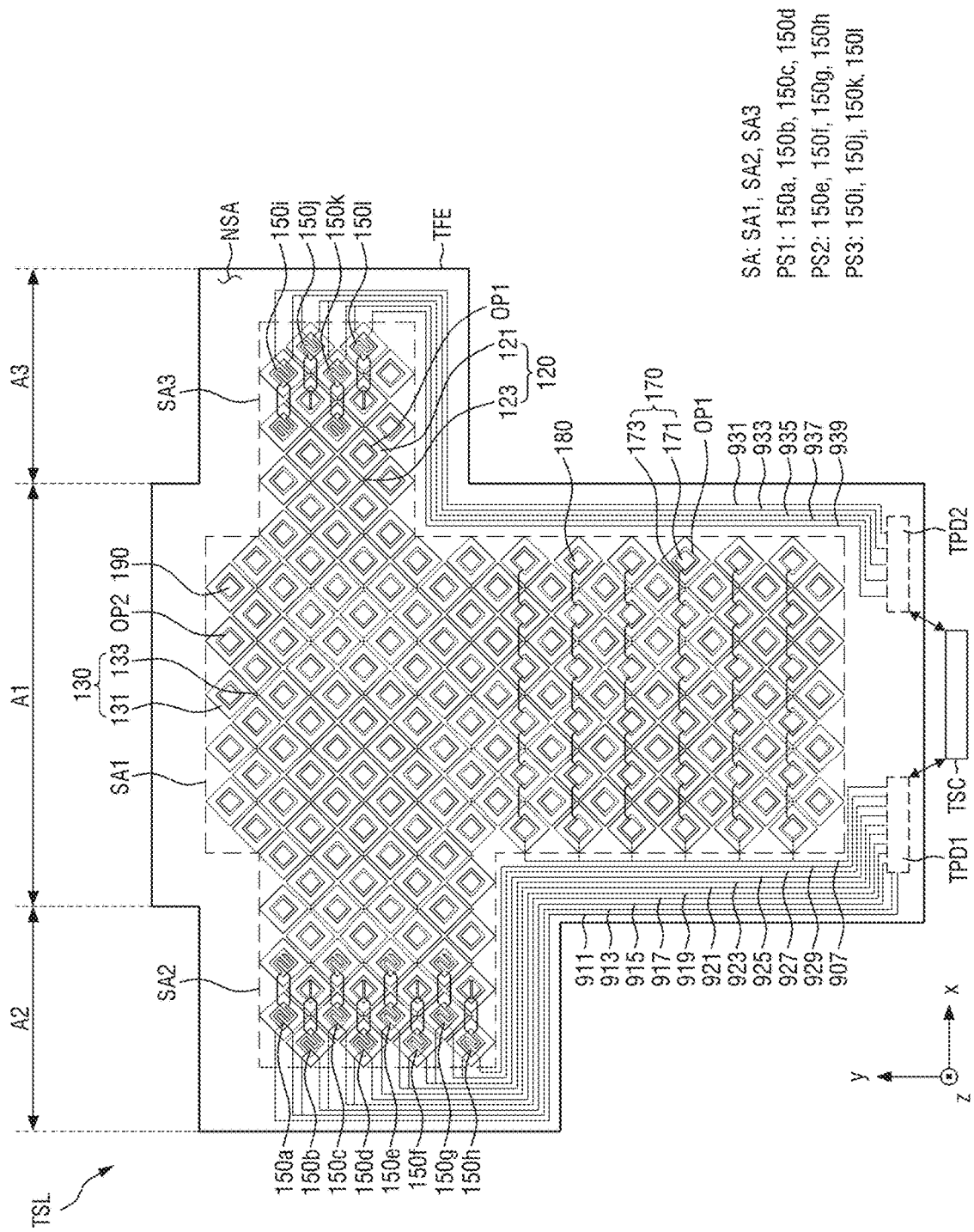
Figure 12:
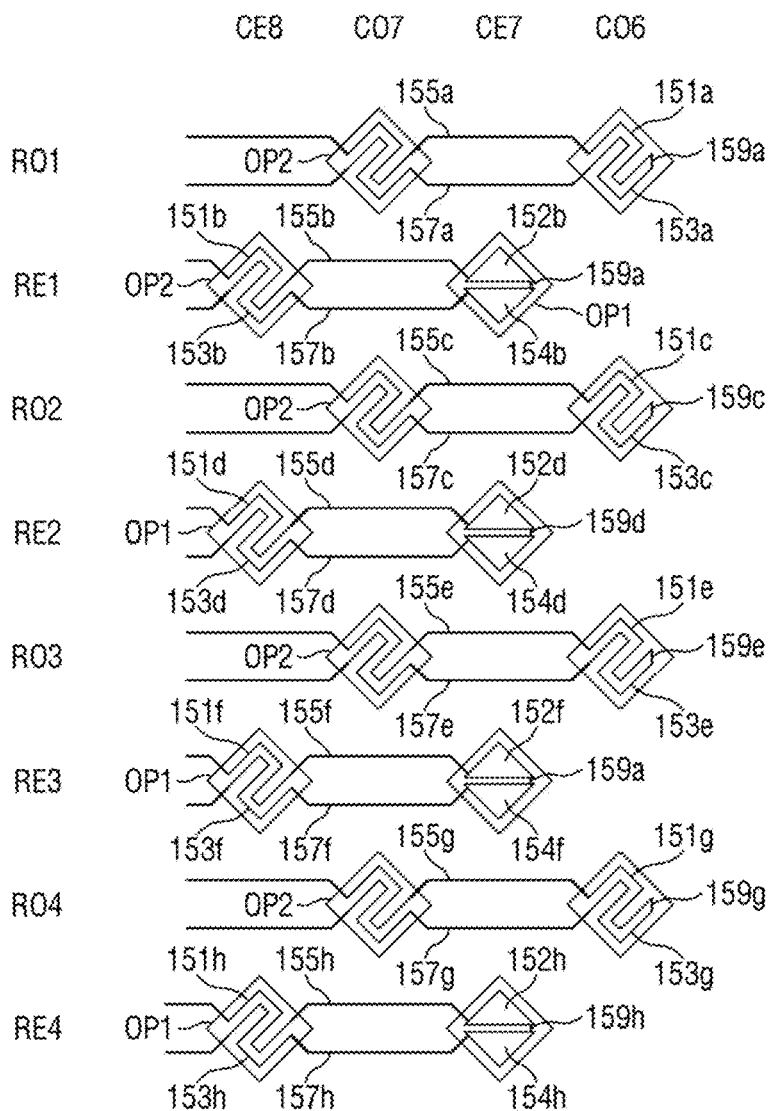
FIG. 12 is a plan view illustrating the planar structures of first and second pressure sensors of FIGS. 10 and 11.
Figure 13:
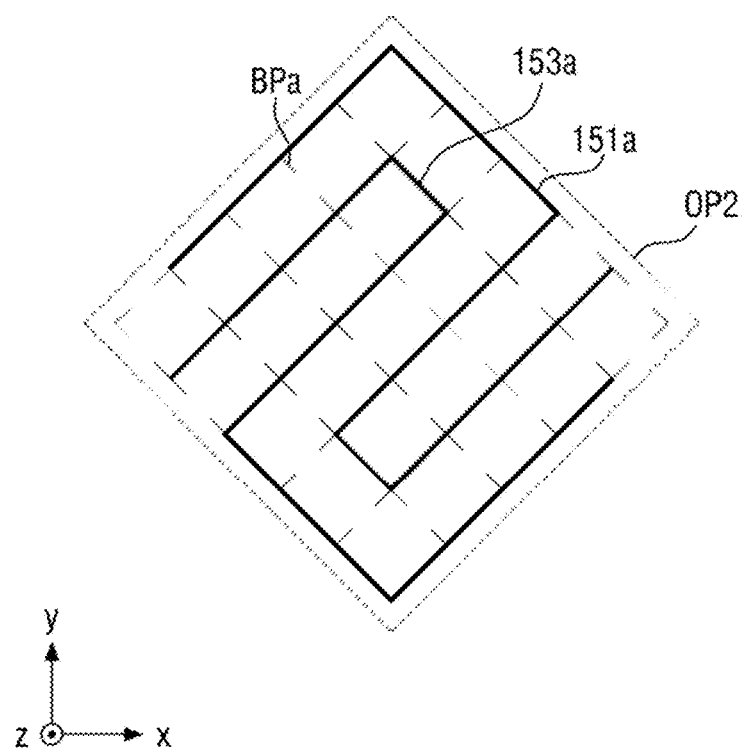
FIG. 13 is an enlarged plan view illustrating an example embodiment of a first strain gauge of FIG. 12, particularly, first and second resistance lines of the first strain gauge.
Figure 14:
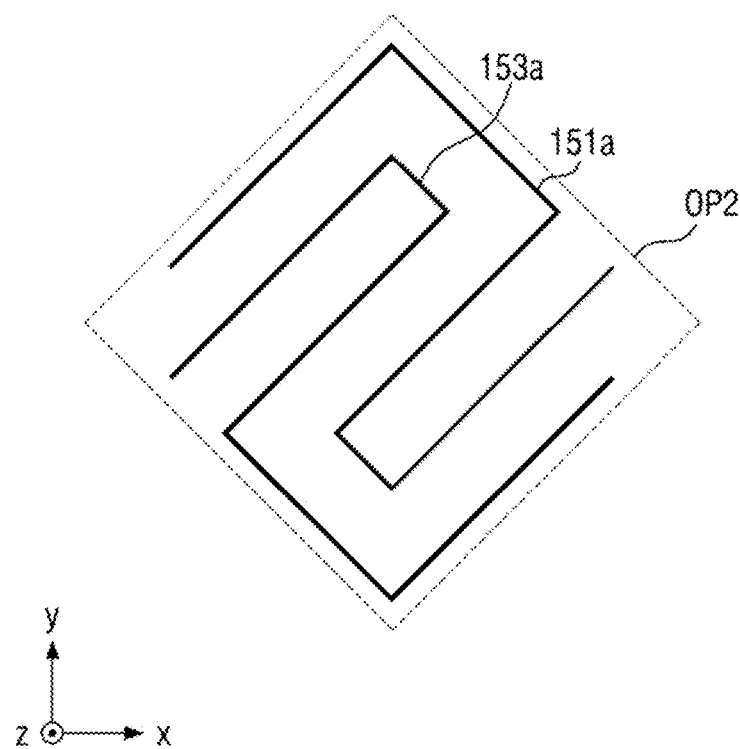
FIG. 14 is an enlarged plan view illustrating another example embodiment of the first strain gauge of FIG. 12.
Figure 15:
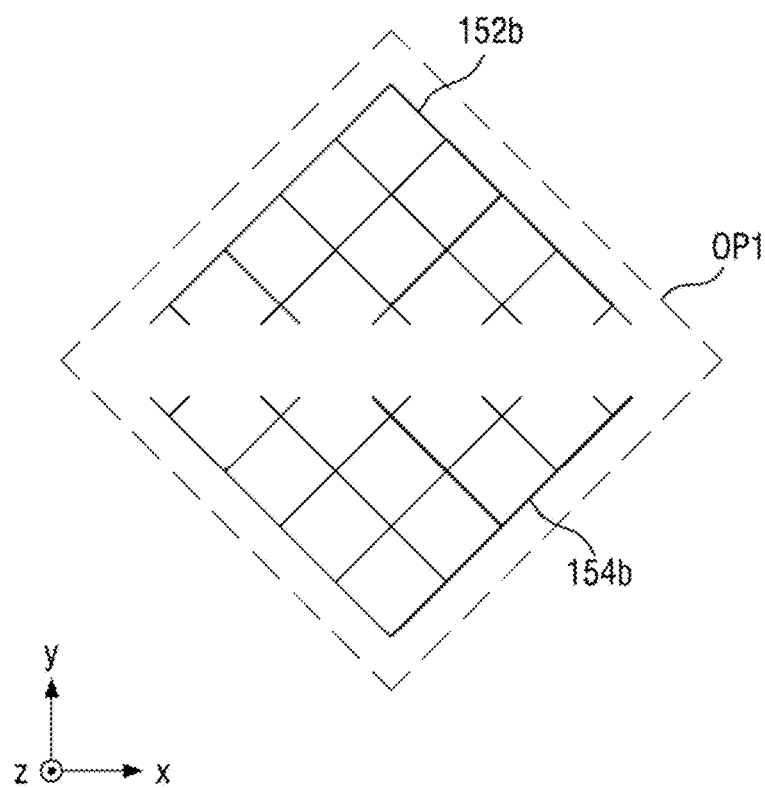
FIG. 15 is an enlarged plan view illustrating an example embodiment of a first conductor of FIG. 12, particularly, first and second conductive patterns of the first conductor.
Figure 17:
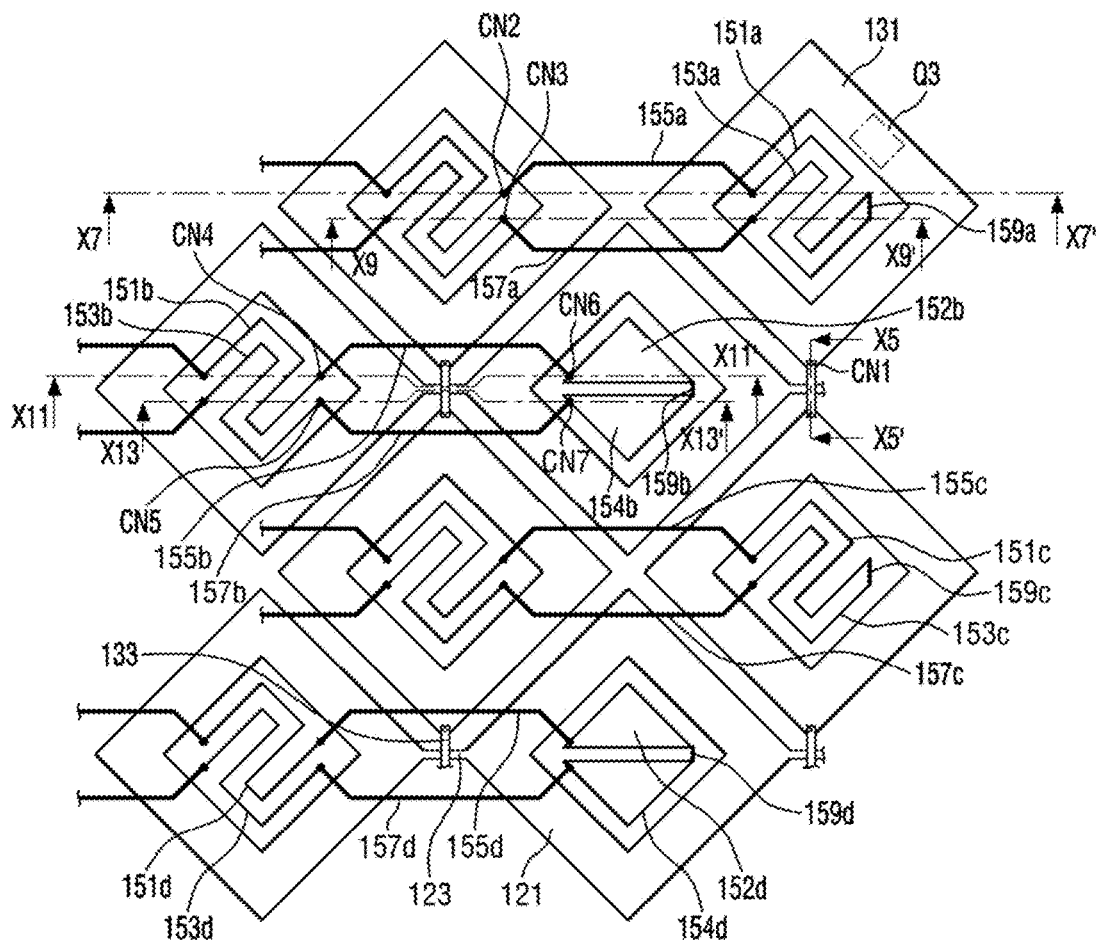
FIG. 17 is an enlarged plan view illustrating an example embodiment of the first pressure sensor of FIGS. 10 and 11 and first touch electrode members and second touch electrode members near the first pressure sensor.
Figure 18:
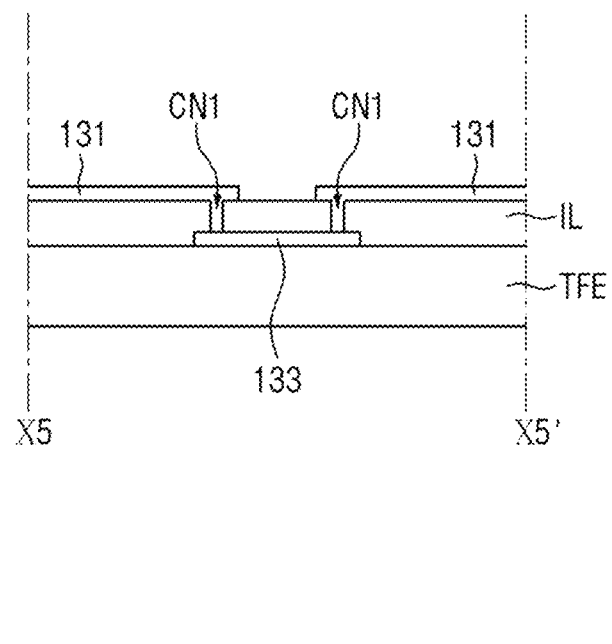
FIG. 18 is a cross-sectional view taken along line X5-X5' of FIG. 17.
Figure 19:
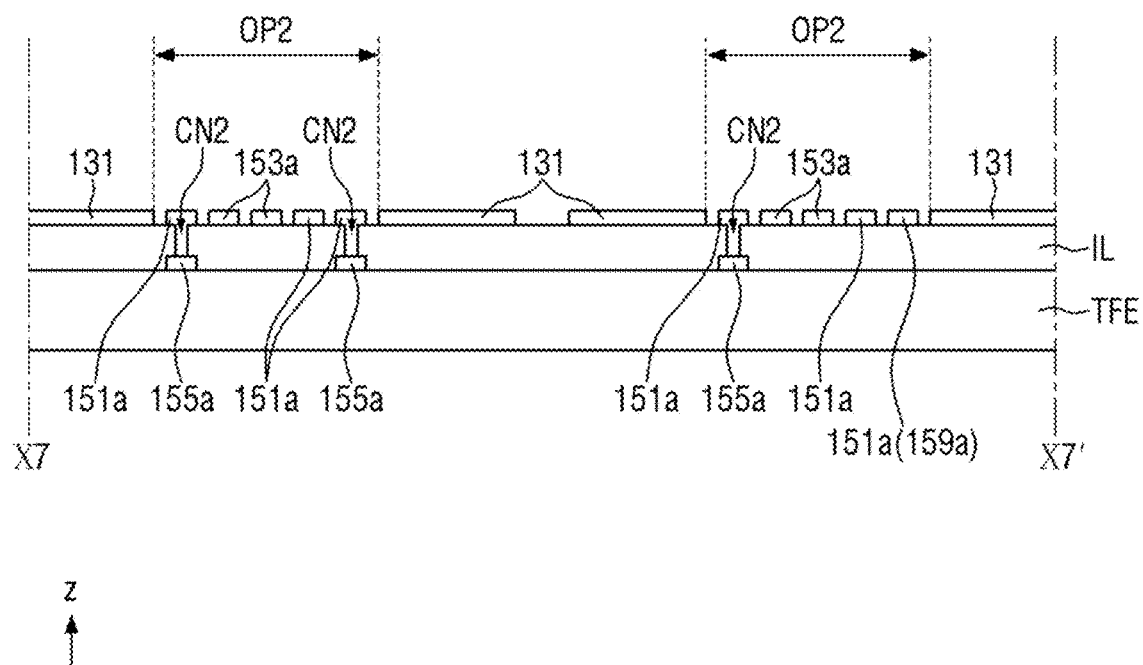
FIG. 19 is a cross-sectional view taken along line X7-X7' of FIG. 17.
Figure 20:
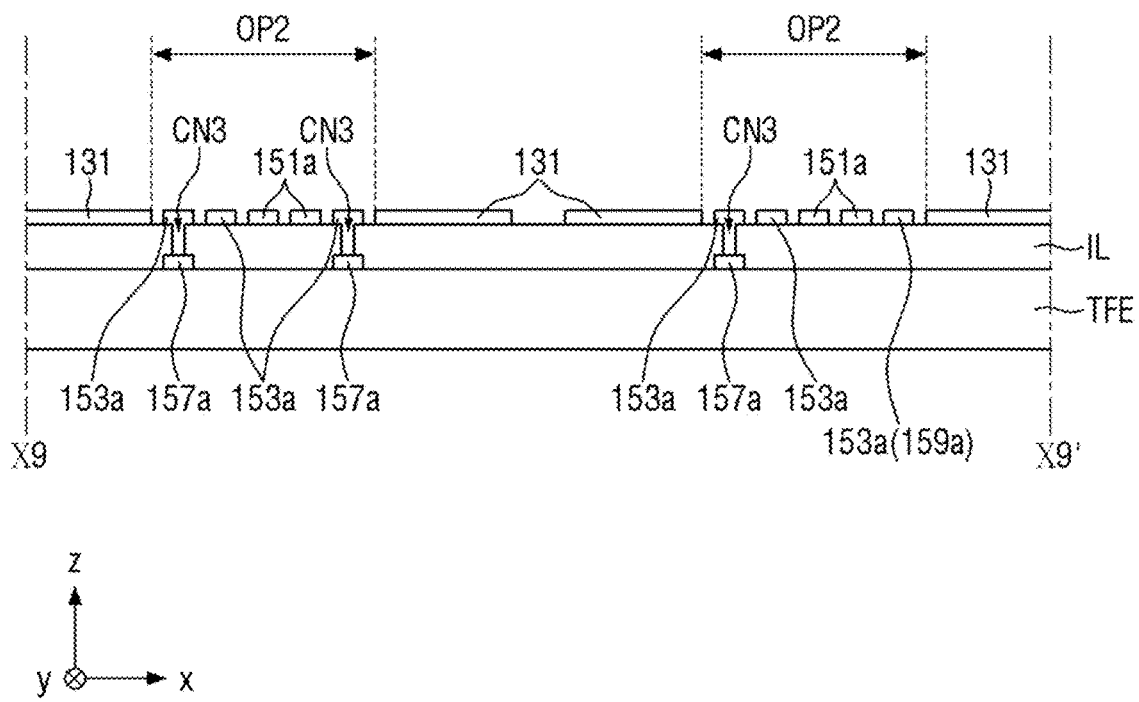
FIG. 20 is a cross-sectional view taken along line X9-X9' of FIG. 17.
Figure 21:
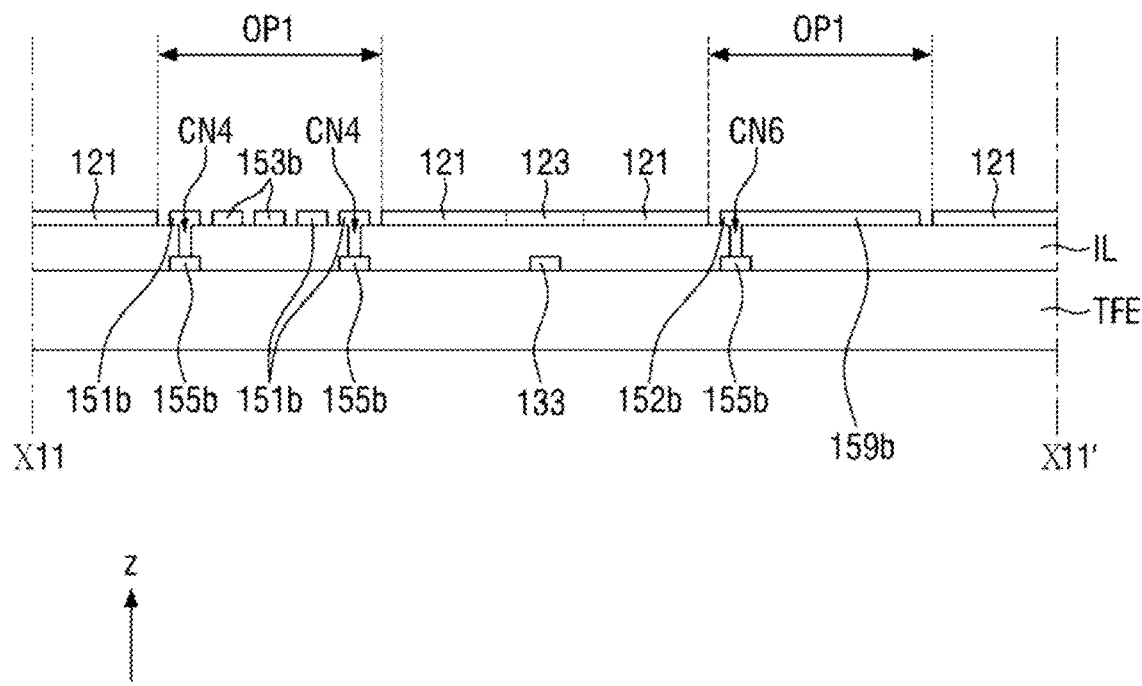
FIG. 21 is a cross-sectional view taken along line X11-X11' of FIG. 17.
Figure 22:
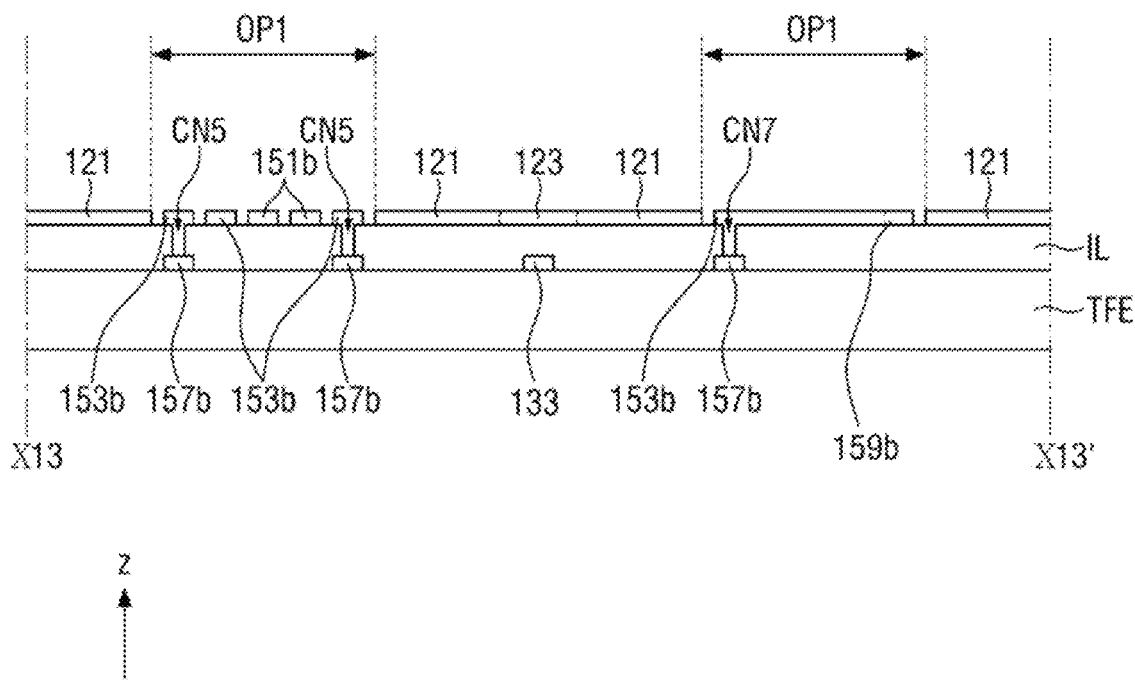
FIG. 22 is a cross-sectional view taken along line X13-X13' of FIG. 17.
Figure 23:
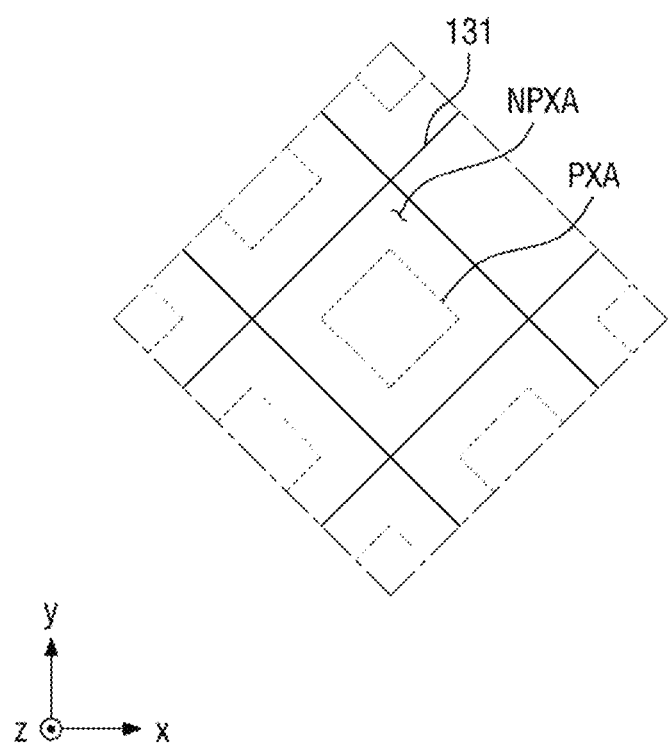
FIG. 23 is an enlarged plan view illustrating an area Q3 of FIG. 17 together with emission areas and non-emission areas.
Figure 24:
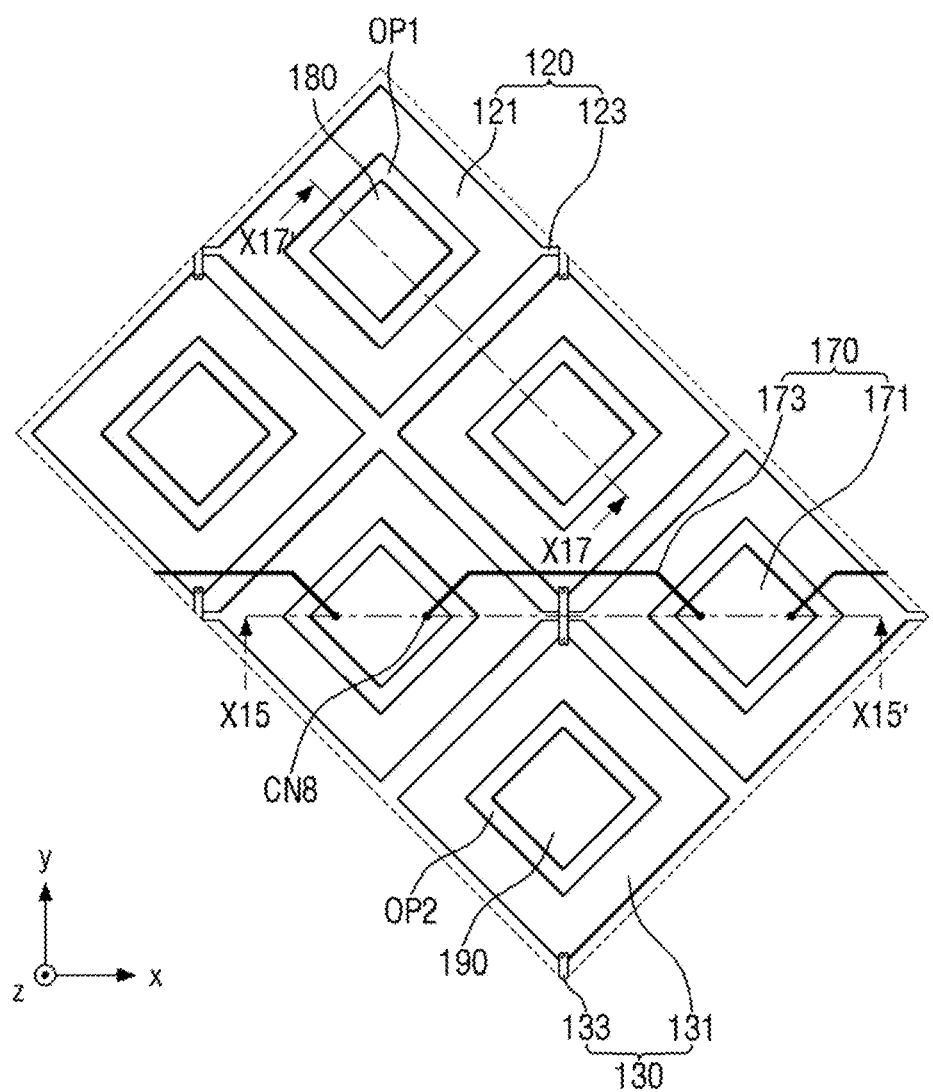
FIG. 24 is an enlarged plan view illustrating an area Q1 of FIG. 10.
Figure 25:
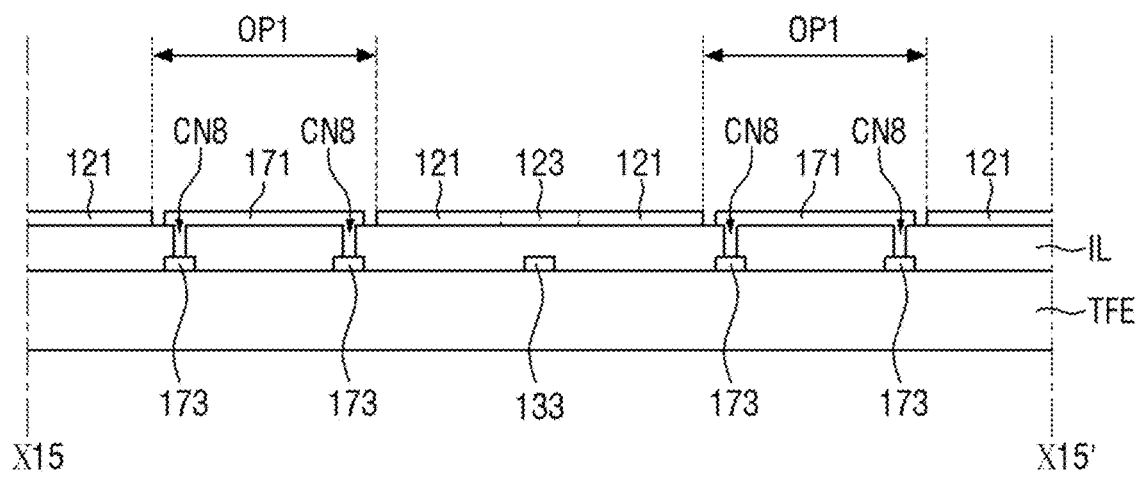
FIG. 25 is a cross-sectional view taken along line X15-X15' of FIG. 24.
Figure 26:
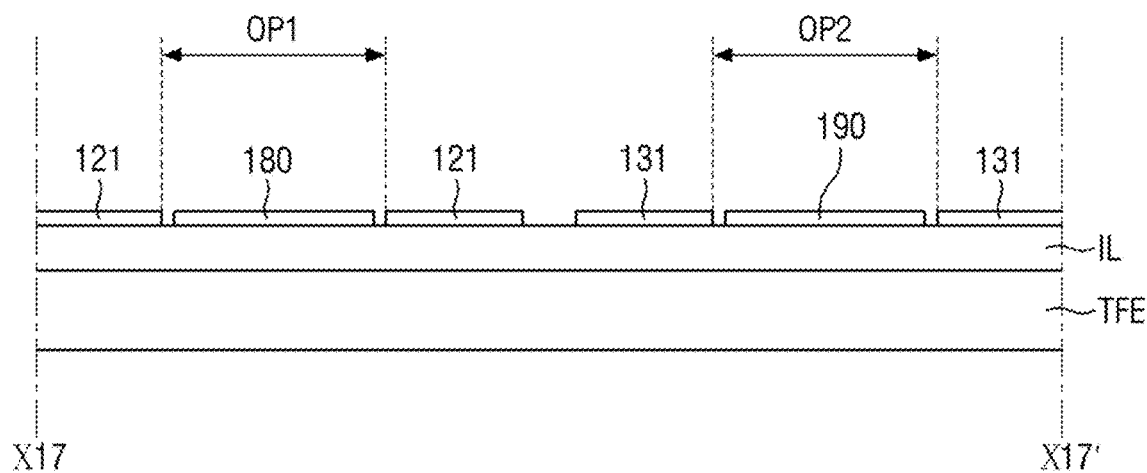
FIG. 26 is a cross-sectional view taken along line X17-X17' of FIG. 24.
Figure 27:
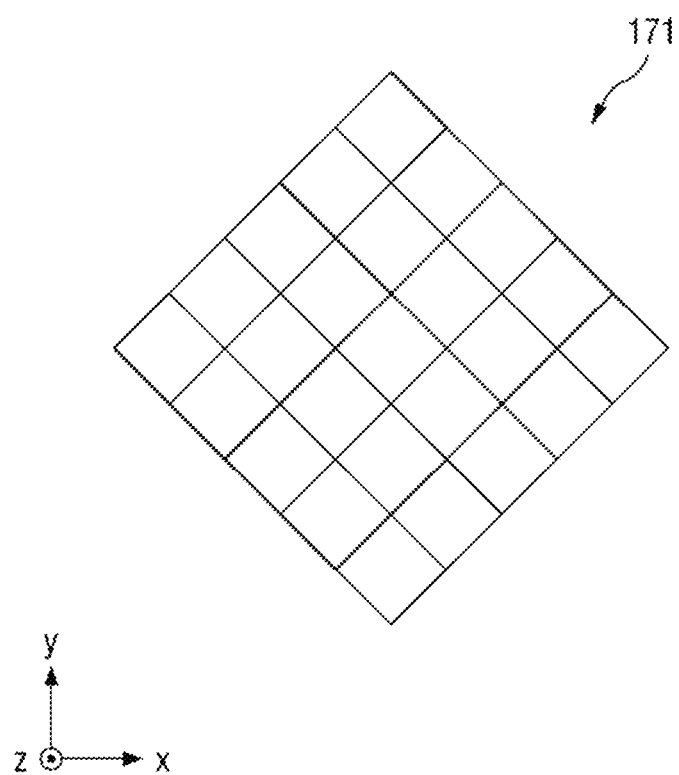
FIG. 27 is an enlarged plan view illustrating an example embodiment of a noise sensing electrode of FIG. 24.

FIGS. 10 and 11 illustrate the touch sensor of FIG. 9, particularly, an example embodiment of planar structure of the touch sensor layer of the touch sensor and how the touch sensor layer and the touch controller of the touch sensor are connected, FIG. 12 is a plan view illustrating the planar structures of the first and second pressure sensors of FIGS. 10 and 11, FIG. 13 is an enlarged plan view illustrating an example embodiment a first strain gauge of FIG. 12, FIG. 14 is a plan view illustrating another example embodiment of the first strain gauge of FIG. 12, FIG. 15 is an enlarged plan view illustrating first and second conductive patterns of an example embodiment of the first conductor of FIG. 12, FIG. 16 is a plan view illustrating an example embodiment the planar structure of the third pressure sensor of FIGS. 10 and 11, FIG. 17 is an enlarged plan view illustrating an example embodiment of the first pressure sensor of FIGS. 10 and 11 and first touch electrode members and second touch electrode members near the first pressure sensor, FIG. 18 is a cross-sectional view taken along line X5-X5' of FIG. 17, FIG. 19 is a cross-sectional view taken along line X7-X7' of FIG. 17, FIG. 20 is a cross-sectional view taken along line X9-X9' of FIG. 17, FIG. 21 is a cross-sectional view taken along line X11-X11' of FIG. 17, FIG. 22 is a cross-sectional view taken along line X13-X13' of FIG. 17, FIG. 23 is an enlarged plan view illustrating an area Q3 of FIG. 17 together with emission areas and non-emission areas, FIG. 24 is an enlarged plan view illustrating an area Q1 of FIG. 10, FIG. 25 is a cross-sectional view taken along line X15-X15' of FIG. 24, FIG. 26 is a cross-sectional view taken along line X17-X17' of FIG. 24, and FIG. 27 is an enlarged plan view illustrating an example embodiment a noise sensing electrode of FIG. 24.

FIG. 10 illustrates how touch wires and touch electrode members are connected, and FIG. 11 illustrates how pressure sensors and pressure wires are connected.

Referring to FIGS. 10 and 11, a sensing area SA and a non-sensing area NSA are defined in the touch sensor layer TSL. The sensing area SA may be an area in which touch input can be detected, and the non-sensing area NSA may be an area in which touch input cannot be detected.

The sensing area SA may correspond to the display area IDA of the display device 1 of FIG. 1 or the display are DA of the display panel DP of FIG. 6. Also, the non-sensing area NSA may correspond to the peripheral area INDA of the display device 1 of FIG. 1 or the non-display area NDA of the display panel DP of FIG. 6. In some embodiments, the sensing area SA may be substantially the same as the display area DA of the display panel DP of FIG. 6, and the non-sensing area NSA may be substantially the same as the non-display area NDA of the display panel DP of FIG. 6.

The sensing area SA will hereinafter be described.

The sensing area SA may include a first sensing area SA1 which is located in the first area A1, a second sensing area SA2 at least a portion of which is located in the first and second areas A1 and A2, and a third sensing area SA3 at least a portion of which is located in the first and third areas A1 and A3. The first sensing area SA1 may correspond to the first display area DA1 of the display panel DP of FIG. 6, the second sensing area SA2 may correspond to the second display area DA2 of the display panel DP of FIG. 6, and the third sensing area SA3 may correspond to the third display area DA3 of the display panel DP of FIG. 6.

In some embodiments, a first width W4a, in the first direction x, of the first sensing area SA1 may be than a first width W5a, in the first direction x, of the second sensing area SA2 and a first width W6a, in the first direction x, of the third sensing area SA3. Also, a second width W4b, in the second direction y, of the first sensing area SA1 may be greater than a second width W5b, in the second direction y, of the second sensing area SA2 and a second width W6b, in the second direction y, of the third sensing area SA3.

In some embodiments, the maximum width, in the first direction x, of the sensing area SA may be substantially the same as the sum of the first widths W4a, W5a, and W6a of the first, second, and third sensing areas SA1, SA2, and SA3. Also, in some embodiments, the maximum width, in the second direction y, of the sensing area SA may be substantially the same as the second width W4b of the first sensing area SA1.

Portion of the second sensing area SA2 may be disposed in the second area A2 of the display device 1, particularly, on the first side portion of the display device 1. Thus, the second sensing area SA2 may be bent or folded in the opposite direction of the third direction z.

Portion of the third sensing area SA3 may be disposed in the third area A3 of the display device 1, particularly, on the second side portion of the display device 1. Thus, the third sensing area SA3 may be angled, bent or folded in the opposite direction of the third direction z.

As described above, part of the display panel DP, particularly, the thin-film encapsulation layer TFE, may be the base layer of the touch sensor layer TSL. In the description that follows, the thin-film encapsulation layer TFE and the base layer may be used interchangeably and may be referred to by the same reference numeral.

The touch sensor layer TSL may include the first touch electrode members 120, the second touch electrode members 130, and the pressure sensors 150, which are disposed in the sensing area SA and are disposed on the base layer TFE. The touch sensor layer TSL may further include the noise sensing electrode members 170, first patterns 180, and second patterns 190. The pressure sensors 150 may include the first, second, and third pressure sensors PS1, PS2, and PS3.

As illustrated in FIGS. 10 and 11, the first touch electrode members 120 may extend in the first direction x and may be spaced apart from one another in the second direction y. The first touch electrode members 120 may form electrode rows. In some embodiments, some of the first touch electrode members 120 may be disposed not only in the first sensing area SA1, but also in the second and third sensing areas SA2 and SA3.

In some embodiments, the number of electrode rows formed in the second sensing area SA2 by the first touch electrode members 120 may be greater than the number of electrode rows formed in the third sensing area SA3 by the first touch electrode members 120. FIGS. 10 and 11 illustrate that there are a total of four electrode rows in the second sensing area SA2 and a total of two electrode rows in the third sensing area SA3. When the electrode rows formed in the second sensing area SA2 by the first touch electrode members 120 are sequentially referred to as first, second, third, and fourth electrode rows RE1, RE2, RE3, and RE4 along the second direction y, the first, second, third, and fourth electrode rows RE1, RE2, RE3, and RE4 may be disposed in the second sensing area SA2, and the first and second electrode rows RE1 and RE2 may be disposed in the third sensing area SA3.

Each of the first touch electrode members 120 may include a plurality of first touch electrodes 121 which are arranged along the first direction x and first connectors 123 which electrically connect pairs of adjacent first touch electrodes 121. The term "connect" or "connection", as used herein, means connecting two elements physically and/or electrically.

In some embodiments, the first touch electrodes 121 may have a generally rhombus shape or a generally square shape, but the example embodiments are not limited thereto. That is, the first touch electrodes 121 may have various other shapes such as a generally triangular shape, a generally rectangular shape other than a generally rhombus or generally square shape, a generally pentagonal shape, a generally circular shape, or a generally bar shape.

The first touch electrodes 121 may include a conductive material. The first touch electrodes 121 may be formed of the second conductive layer ML2 described above with reference to FIG. 4. Examples of the conductive material are as described above with regard to the second conductive layer ML2, and thus, detailed descriptions thereof will be omitted to prevent redundancy.

Since the first touch electrodes 121 are formed of the second conductive layer ML2, the first touch electrodes 121 may be disposed on the insulating layer IL, as illustrated in FIGS. 21 and 22.

In some embodiments, the first touch electrodes 121 may have a mesh structure, as illustrated in FIG. 23, to be invisible to the user. In this case, the first touch electrodes 121 may be disposed not to overlap with the emission areas PXA of the display panel DP. In other words, the first touch electrodes 121 may be disposed to overlap with the non-emission areas NPXA of the display panel DP.

In some embodiments, the first touch electrodes 121, which are spaced apart from one another in the second direction y, may form electrode columns, and some of the electrode columns may be disposed not only in the first sensing area SA1, but also in the second and third sensing areas SA2 and SA3.

FIGS. 10 and 11 illustrate that in the second sensing area SA2, first, second, third, and fourth electrode columns CE1a, CE2a, CE3a, and CE4a are sequentially arranged along the first direction x, and that in the third sensing area SA3, fifth, sixth, seventh, and eighth electrode columns CE1b, CE2b, CE3b, and CE4b are sequentially arranged along the opposite direction of the first direction x.

The first touch electrodes 121 may have or form first openings OP1. For example, each of the first touch electrodes 121 may be opened at least in the middle thereof and may thus expose the underlying layer. For example, as illustrated in FIGS. 21 and 22, the first openings OP1 may expose the insulating layer IL, which is disposed below the first touch electrodes 121.

The first connectors 123 may electrically connect pairs of adjacent first touch electrodes 121 in the first direction x and may be in contact with the first touch electrodes 121.

In some embodiments, the first connectors 123 may be disposed in the same layer as the first touch electrodes 121. In some embodiments, the first connectors 123 may be formed of the same material as the first touch electrodes 121, i.e., the second conductive layer ML2 of FIG. 4.

Since the first connectors 123 are formed of the second conductive layer ML2, the first connectors 123 may be disposed on the insulating layer IL, as illustrated in FIGS. 21 and 22.

FIGS. 10, 11, and 17 illustrate that a first connector 123 is disposed between each pair of adjacent first touch electrodes 121 in the first direction x, but the number of first connectors 123 provided between each pair of adjacent first touch electrodes 121 in the first direction x may vary. For example, two or more first connectors 123 may be provided between each pair of adjacent first touch electrodes 121 in the first direction x.

As illustrated in FIGS. 10 and 11, the second touch electrode members 130 may extend in the second direction y and may be spaced apart from one another in the first direction x. The second touch electrode members 130 may form columns.

The second touch electrode members 130 may be disposed not only in the first sensing area SA1, but also in the second and third sensing areas SA2 and SA3.

FIGS. 10 and 11 illustrate that in the second sensing area SA2, first, second, and third columns CO1a, CO2a, and CO3a are sequentially arranged along the first direction x, and that in the third sensing area SA3, fourth, fifth, and sixth columns CO1b, CO2b, and CO3b are sequentially arranged along the opposite direction of the first direction x.

Each of the second touch electrode members 130 may include a plurality of second touch electrodes 131 which are arranged along the second direction y and second connectors 133 which electrically connect pairs of adjacent second touch electrodes 131.

The second touch electrodes 131 may be electrically connected to one another in the second direction y. The second touch electrodes 131 may be spaced apart from one another in the first direction x.

In some embodiments, the second touch electrodes 131 may have or form rows. FIGS. 10 and 11 illustrate that in the second sensing area SA2, first, second, third, and fourth rows RO1, RO2, RO3, and RO3 are sequentially arranged along the opposite direction of the second direction y, and that in the third sensing area SA3, the first and second rows RO1 and RO2 are arranged.

In some embodiments, the rows formed by the second touch electrodes 131 may be disposed between pairs of electrode rows formed by the first touch electrode members 120. For example, the second row RO2 may be disposed between the first and second electrode rows RE1 and RE2, and the third row RO3 may be disposed between the second and third electrode rows RE2 and RE3. That is, the rows formed by the second touch electrodes 131 and the electrode rows formed by the first touch electrode members 120 may be alternately arranged along the second direction y.

The second touch electrodes 131 may form second openings OP2. For example, each of the second touch electrodes 131 may be opened at least in the middle thereof and may thus expose the underlying layer. For example, as illustrated in FIGS. 19 and 20, the second openings OP2 may expose the insulating layer IL, which is disposed below the second touch electrodes 131.

In some embodiments, the second openings OP2 may have a different area from the first openings OP1. For example, the area of the second openings OP2 may be greater than the area of the first openings OP1.

In some embodiments, the second touch electrodes 131 may have a substantially rhombus shape, but the example embodiments are not limited thereto. That is, the second touch electrodes 131 may have various other shapes such as a substantially triangular shape, a substantially rectangular shape other than a substantially rhombus shape, a substantially pentagonal shape, a substantially circular shape, or a substantially bar shape.

The second touch electrodes 131 may include a conductive material. The second touch electrodes 131 may be formed of the same material as the first touch electrodes 121, i.e., the second conductive layer ML2 of FIG. 4. In some embodiments, the second touch electrodes 131, like the first touch electrodes 121, may have a mesh structure.

The second connectors 133 may electrically connect pairs of adjacent second touch electrodes 131 in the second direction y and may be in contact with the second touch electrodes 131. In some embodiments, the second connectors 133 may be formed as bridge-type connecting patterns. In some embodiments, the second connectors 133 may be formed of a different layer from the first touch electrodes 121 and the second touch electrodes 131. In some embodiments, the second connectors 133 may be formed of the first conductive layer ML1 described above with reference to FIG. 4 and may include one of the above-described example materials of the first conductive layer ML1. Since the second connectors 133 are formed of the first conductive layer ML1, the insulating layer IL may be placed between the second connectors 133 and the second touch electrodes 131. In some embodiments, as illustrated in FIG. 18, the second touch electrodes 131 may be connected to the second connectors 133 via first contact holes CN1 which are formed in the insulating layer IL.

In some embodiments, the second touch electrodes 131 may be driving electrodes receiving the driving signals Ts for detecting the location of touch input, and the first touch electrodes 121 may be sensing electrodes outputting the sensing signals Rs for detecting the location of touch input.

As illustrated in FIGS. 10 and 11, the pressure sensors 150 may include the first, second, and third pressure sensors PS1, PS2, and PS3.

The first and second pressure sensors PS1 and PS2 may be disposed in the second sensing area SA2, and the third pressure sensor PS3 may be disposed in the third sensing area SA3.

The first pressure sensor PS1 may include a first strain gauge 150a, a first conductor 150b, a second strain gauge 150c, and a second conductor 150d.

In some embodiments, the first and second strain gauges 150a and 150c may be disposed in the rows formed by the second touch electrode 131. For example, as illustrated in FIGS. 10 through 12, the first strain gauge 150a may be disposed in the first row RO1, and the second strain gauge 150c may be disposed in the second row RO2.

In some embodiments, the first and second strain gauges 150a and 150c may be disposed in the electrode rows formed by the first touch electrode members 120. For example, as illustrated in FIGS. 10 through 12, the first conductor 150b may be disposed in the first electrode row RE1, and the second conductor 150d may be disposed in the second electrode row RE2. However, the example embodiments are not limited to this. Alternatively, the first and second strain gauges 150a and 150c may be disposed in the electrode rows formed by the first touch electrode members 120, and the first and second conductors 150b and 150d may be disposed in the rows formed by the second touch electrodes 131. Still alternatively, one of the first and second strain gauges 150a and 150c may be disposed in one of the electrode rows formed by the first touch electrode members 120, the other strain gauge may be disposed in one of the rows formed by the second touch electrodes 131, one of the first and second conductors 150b or 150d may be disposed in another one of the electrode rows formed by the first touch electrode members 120, and the other conductor may be disposed in another one of the rows formed by the second touch electrodes 131.

In the description that follows, it is assumed that the first and second strain gauges 150a and 150c are disposed in, for example, the rows formed by the second touch electrodes 131, and that the first and second conductors 150b and 150d are disposed in, for example, the electrode rows formed by the first touch electrode members 120.

As illustrated in FIG. 12, the first strain gauge 150a may include first resistance lines 151a, second resistance lines 153a, a first connecting line 155a, a second connecting line 157a, and a first connecting pattern 159a.

The first resistance lines 151a and the second resistance lines 153a may be disposed in second openings OP2 formed in first touch electrodes 121 in the first row RO1 and may be spaced apart from the second touch electrodes 131, as illustrated in FIG. 17. Also, the first resistance lines 151a and the second resistance lines 153a may be spaced apart in the second openings OP2. In some embodiments, the first resistance lines 151a and the second resistance lines 153a may not overlap in a plan view.

The first resistance lines 151a and the second resistance lines 153a may have a non-linear shape such as a bent or serpentine shape having a predetermined pattern. In response to pressure being applied to the touch sensor layer TSL of the touch sensor TSM, one of the length of the first resistance lines 151a and the length of the second resistance lines 153a may change. As a result, the resistance of the first strain gauge 150a may change, and the intensity of touch pressure may be determined based on the change in the resistance of the first strain gauge 150a.

In some embodiments, as illustrated in FIG. 13, the first resistance lines 151a and the second resistance lines 153a may each include two or more bent portions and extension portions extending in directions that intersect the first and second directions x and y.

The shapes of the first resistance lines 151a and the second resistance lines 153a are not particularly limited, but may vary.

For example, in a case where the first touch electrodes 121 and the second touch electrodes 131 have a mesh structure, the first resistance lines 151a and the second resistance lines 153a may be formed by partially removing the mesh structure. In this case, in some embodiments, a plurality of branch portions BPa which are spaced apart from one another may be further disposed in each of the second openings OP2 to be connected to or formed integrally with a corresponding first or second resistance line 151a or 153a, as illustrated in FIG. 14.

The branch portions BPa may be portions of the mesh structure that remain unremoved. The branch portions BPa may be spaced apart from the second touch electrodes 131 and may be formed of the same layer as, and may include the same material as, the first resistance lines 151a and the second resistance lines 153a.

In some embodiments, the first resistance lines 151a and the second resistance lines 153a may be disposed in the same layer as the first touch electrodes 121 and the second touch electrodes 131. For example, in a case where the first touch electrodes 121 and the second touch electrodes 131 are disposed on the insulating layer IL, the first resistance lines 151a and the second resistance lines 153a may be disposed on the insulating layer IL, as illustrated in FIGS. 19 and 20.

The first resistance lines 151a and the second resistance lines 153a may include a conductive material. In some embodiments, the first resistance lines 151a may include the same material as the first touch electrodes 121 and the second touch electrodes 131 and may be formed of the second conductive layer ML2 of FIG. 4.

The first connecting line 155a may electrically connect, and may be in contact with, the first resistance lines 151a, which are adjacent to each other in the first direction x. Also, the second connecting line 157a may electrically connect, and may be in contact with, the second resistance lines 153a, which are adjacent to each other in the first direction x. The first and second connecting lines 155a and 157a may not be in contact with, but may be spaced apart from, the first touch electrode members 120 and the second touch electrode members 130 and may be spaced apart from each other.

In some embodiments, the first and second connecting lines 155a and 157a may include the same material and may be formed of the first conductive layer ML1 of FIG. 4.

In some embodiments, the insulating layer IL may be disposed between the first resistance lines 151a and the first connecting line 155a and between the second resistance lines 153a and the second connecting line 157a. For example, the first resistance lines 151a and the second resistance lines 153a may be disposed on the insulating layer IL, and the first and second connecting lines 155a and 157a may be disposed below the insulating layer IL.

The first resistance lines 151a may be connected to, and in contact with, the first connecting line 155a via second contact holes CN2 which are formed in the insulating layer IL, as illustrated in FIG. 19. The second resistance lines 153a may be connected to, and in contact with, the second connecting line 157a via third contact holes CN3 which are formed in the insulating layer IL, as illustrated in FIG. 20.

In some embodiments, as illustrated in FIG. 12, the first connecting pattern 159a may be disposed in a second opening OP2 in the first row RO1 and in the second column (CO2a). The first connecting pattern 159a may connect the first resistance lines 151a and the second resistance lines 153a. In some embodiments, the first connecting pattern 159a, like the first touch electrodes 121 and the second touch electrodes 131, may be formed of the second conductive layer ML2 of FIG. 4 and may include the same conductive material as the first touch electrodes 121 and the second touch electrodes 131.

In a plan view, the first strain gauge 150a, which includes the first resistance lines 151a, the first connecting line 155a, the second resistance lines 153a, the second connecting line 157a, and the first connecting pattern 159a, may extend from a first side to a second side of the touch sensor layer TSL along the first direction x and then from the second side to the first side of the touch sensor layer TSL along the opposite direction of the first direction x. Accordingly, both ends of the first strain gauge 150a may be disposed on one side of the sensing area SA, e.g., on the left side of the second sensing area SA2, as illustrated in FIGS. 10 and 11.

The first conductor 150b may be disposed in one of the electrode rows formed by the first touch electrode members 120. For example, the first conductor 150b may be disposed in the first electrode row RE1.

The first conductor 150b may include a first conductive pattern 152b, a second conductive pattern 154b, a third connecting line 155b, a fourth connecting line 157b, and a second connecting pattern 159b and may further include a third resistance line 151b and a fourth resistance line 153b.

The third and fourth resistance lines 151b and 153b may be disposed in the second openings OP2, which are formed in the second touch electrodes 131. In some embodiments, the third and fourth resistance lines 151b and 153b may be disposed in second openings OP2 in the first electrode column CE1a. The third and fourth resistance lines 151b and 153b may be spaced apart from the first touch electrodes 121, as illustrated in FIG. 17, and may be spaced apart from each other in the second openings OP2.

The third and fourth resistance lines 151b and 153b may have a bent shape having a predetermined pattern. In some embodiments, as illustrated in FIG. 13, the third and fourth resistance lines 151b and 153b may each include two or more angled or bent portions and extension portions extending in the directions that intersect the first and second directions x and y.

The shapes of the third and fourth resistance lines 151b and 153b are not particularly limited, but may vary.

In some embodiments, the third and fourth resistance lines 151b and 153b may include the same material as the first touch electrodes 121 and the second touch electrodes 131 and may be formed of the second conductive layer ML2 of FIG. 4.

In some embodiments, the third and fourth resistance lines 151b and 153b may be formed by partially removing the mesh structure formed by the first touch electrodes 121 and the second touch electrodes 131. In this case, in some embodiments, a plurality of branch portions which are spaced apart from one another may be further disposed in each of the second openings OP2 to be connected to a corresponding third or fourth resistance line 151b or 153b, similarly to what is illustrated in FIG. 14.

The first and second conductive patterns 152b and 154b may be disposed in one of the first openings OP1, which are formed in the first touch electrodes 121. In some embodiments, the first and second conductive patterns 152b and 154b may be disposed in a second opening OP2 in the second electrode column CE2a. The first and second conductive patterns 152b and 154b may be spaced apart from the first touch electrodes 121, as illustrated in FIG. 17, and may be spaced apart from each other in the second opening OP2.

The first conductive pattern 152b may have a different generally planar shape than that of the first resistance lines 151a, and the second conductive pattern 154b may have a different generally planar shape than that of the second resistance lines 153b.

In some embodiments, the first and second conductive patterns 152b and 154b may have a mesh structure, as illustrated in FIG. 15.

In some embodiments, as illustrated in FIG. 12, the second connecting pattern 159b may be disposed in a first opening OP1 in the first electrode row RE1 and in the second electrode column CO2a. The second connecting pattern 159b may connect the first and second conductive patterns 152b and 154b.

In some embodiments, the first conductive pattern 152b, the second conductive pattern 154b, and the second connecting pattern 159b may include the same material as the first touch electrodes 121 and the second touch electrodes 131 and may be formed of the second conductive material ML2 of FIG. 4.

The third connecting line 155b may electrically connect the third resistance line 151b and the first conductive pattern 152b, which are adjacent to each other in the first direction x, and the fourth connecting line 157b may electrically connect the fourth resistance line 153b and the second conductive pattern 154b, which are adjacent to each other in the first direction x.

In some embodiments, the third and fourth connecting lines 155b and 157b may include the same material as the second connectors 133 and may be formed of the first conductive layer ML1 of FIG. 4.

As illustrated in FIG. 21, the third resistance line 151b may be connected to the third connecting line 155b via fourth contact holes CN4 which are formed in the insulating layer IL, and the first conductive pattern 152b may be connected to the third connecting line 155b via a sixth contact hole CN6 which is formed in the insulating layer IL. Also, as illustrated in FIG. 22, the fourth resistance line 153b may be connected to the fourth connecting line 157b via fifth contact holes CN5 which are formed in the insulating layer IL, and the second conductive pattern 154b may be connected to the fourth connecting line 157b via a seventh contact hole CN7 which is formed in the insulating layer IL.

In a plan view, the first conductor 150b may extend from the first side to the second side of the touch sensor layer TSL along the first direction x and then from the second side to the first side of the touch sensor layer TSL along the opposite direction of the first direction x. Accordingly, both ends of the first conductor 150b may be disposed on one side of the sensing area SA, e.g., on the left side of the second sensing area SA2, as illustrated in FIGS. 10 and 11.

The second strain gauge 150c may be disposed in one of the rows formed by the second touch electrodes 131. For example, the second strain gauge 150c may be disposed in the second row RO2, as illustrated in FIGS. 10 through 12.

In some embodiments, the second strain gauge 150c may have the same structure as the first strain gauge 150a.

As illustrated in FIG. 12, the second strain gauge 150c may include fifth resistance lines 151c, sixth resistance lines 153c, a fifth connecting line 155c, a sixth connecting line 157c, and a third connecting pattern 159c.

The fifth resistance lines 151c, the sixth resistance lines 153c, and the third connecting pattern 159c may be formed of the second conductive layer ML2 of FIG. 4, and the fifth and sixth connecting lines 155c and 157c may be formed of the first conductive layer ML1 of FIG. 4.

The fifth resistance lines 151c and the fifth connecting line 155c may be connected via contact holes formed in the insulating layer IL, and the sixth resistance lines 153c and the sixth connecting line 157c may be connected via contact holes formed in the insulating layer IL.

Other features and aspects of the fifth resistance lines 151c, the sixth resistance lines 153c, the fifth connecting line 155c, the sixth connecting line 157c, and the third connecting pattern 159c are substantially the same as, or similar to, those of the first resistance lines 151a, the second resistance lines 153a, the first connecting line 155a, the second connecting line 157a, and the first connecting pattern 159a, respectively, and thus, detailed descriptions thereof will be omitted to avoid redundancy.

The second conductor 150d may be disposed in one of the electrode rows formed by the first touch electrode members 120. For example, the second conductor 150d may be disposed in the second electrode row RE2.

In some embodiments, the second conductor 150d may have the same structure as the first conductor 150b, and thus, detailed descriptions thereof will be omitted to avoid redundancy.

The second conductor 150d may include a third conductive pattern 152d, a fourth conductive pattern 154d, a seventh connecting line 155d, an eighth connecting line 157d, and a fourth connecting pattern 159d and may further include a seventh resistance line 151d and an eighth resistance line 153d.

The third conductive pattern 152d and the seventh resistance line 151d may be connected to the seventh connecting line 155d via contact holes formed in the insulating layer TL. Also, the fourth conductive pattern 154d and the eighth resistance line 153d may be connected to the eighth connecting line 157d via contact holes formed in the insulating layer TL.

Other features and aspects of the third conductive pattern 152d, the fourth conductive pattern 154d, the seventh connecting line 155d, the eighth connecting line 157d, the fourth connecting pattern 159d, the seventh resistance line 151d, and the eighth resistance line 153d are substantially the same as, or similar to, those of the first conductive pattern 152b, the second conductive pattern 154b, the third connecting line 155b, the fourth connecting line 157b, the second connecting pattern 159b, the third resistance line 151b, and the fourth resistance line 153b, respectively, and thus, detailed descriptions thereof will be omitted to avoid redundancy.

In some embodiments, in a case where the same pressure is applied to the first conductive pattern 152b and the first resistance lines 151a, a variation in the length or the cross-sectional area of the first conductive pattern 152b may be smaller than a variation in the length or the cross-sectional area of the first resistance lines 151a. That is, for each given pressure, a variation in the resistance of the first conductive pattern 152b may be smaller than a variation in the resistance of the first resistance lines 151b.

Similarly, for each given pressure, a variation in the resistance of the second conductive pattern 154b may be smaller than a variation in the resistance of the second resistance lines 153b, a variation in the resistance of the third conductive pattern 152d may be smaller than a variation in the resistance of the fifth resistance lines 151c, and a variation in the resistance of the fourth conductive pattern 154d may be smaller than a variation in the resistance of the sixth resistance lines 153c.

In a case where touch input from the user is applied to the second sensing area SA2 or to the first pressure sensor PS1, the resistance of at least one of the first and second strain gauges 150a and 150c may change depending on the intensity of the touch input. Also, the resistance of at least one of the first and second strain gauges 150a and 150c may change in accordance with a temperature variation caused by the body temperature of the user. That is, a variation in the resistance of the first strain gauge 150a may include both a component (hereinafter, the "pressure resistance component") that changes in response to the first strain gauge 150a being deformed by touch pressure and a component (hereinafter, the "temperature resistance component") that changes in response to the first strain gauge 150a being deformed in accordance with temperature variations. The temperature resistance component is irrelevant to the intensity of touch pressure and may thus serve as noise when detecting pressure.

The first pressure sensor PS1 includes the first and second conductors 150b and 150d. The first conductor 150b includes the first and second conductive patterns 152b and 154b, which are disposed in the second sensing area SA2, and the second conductor 150d includes the third and fourth conductive patterns 152d and 154d, which are disposed in the second sensing area SA2. Thus, in a case where touch input from the user is generated in the second sensing area SA2, the resistances (or the pressure resistance components) of the first and second conductive patterns 152b and 154b hardly change or change only slightly in accordance with the intensity of the touch pressure, and variations in the resistances of the first and second conductive patterns 152b and 154b occur in response to temperature variations.

Accordingly, the temperature resistance components of the first and second strain gauges 150a and 150c can be compensated for or offset with the temperature resistance components of the first and second conductors 150b and 150d, and as a result, the sensitivity of pressure detection can be improved.

The second pressure sensor PS2 may include a third strain gauge 150e, a third conductor 150f, a fourth strain gauge 150g, and a fourth conductor 150h, which are disposed in the second sensing area SA2.

The third strain gauge 150e may be disposed in one of the rows formed by the second touch electrodes 131. For example, the third strain gauge 150e may be disposed in the third row RO3, as illustrated in FIGS. 10 through 12.

In some embodiments, the third strain gauge 150e may have the same structure as the first strain gauge 150a, and thus, detailed descriptions thereof will be omitted to avoid redundancy.

As illustrated in FIG. 12, the third strain gauge 150e may include ninth resistance lines 151e, tenth resistance lines 153e, a ninth connecting line 155e, a tenth connecting line 157e, and a fifth connecting pattern 159e.

The third conductor 150f may be disposed in one of the electrode rows formed by the first touch electrode members 120, e.g., in the third electrode row RE3.

In some embodiments, the third conductor 150f may have the same structure as the first conductor 150b, and thus, detailed descriptions thereof will be omitted to avoid redundancy.

The third conductor 150f may include a fifth conductive pattern 152f, a sixth conductive pattern 154f, an eleventh connecting line 155f, a twelfth connecting line 157f, and a sixth connecting pattern 159f and may further include an eleventh resistance line 151f and a twelfth resistance line 153f.

The fourth strain gauge 150g may be disposed in one of the rows formed by the second touch electrodes 131, e.g., in the fourth row RO4.

In some embodiments, the fourth strain gauge 150g may have the same structure as the first strain gauge 150a, and thus, detailed descriptions thereof will be omitted to avoid redundancy.

As illustrated in FIG. 12, the fourth strain gauge 150g may include thirteenth resistance lines 151g, fourteenth resistance lines 153g, a thirteenth connecting line 155g, a fourteenth connecting line 157g, and a seventh connecting pattern 159g.

The fourth conductor 150h may be disposed in one of the electrode rows formed by the first touch electrode members 120, e.g., in the fourth electrode row RE4.

In some embodiments, the fourth conductor 150h may have the same structure as the first conductor 150b, and thus, detailed descriptions thereof will be omitted to avoid redundancy.

The fourth conductor 150h may include a seventh conductive pattern 152h, an eighth conductive pattern 154h, a fifteenth connecting line 155h, a sixteenth connecting line 157h, and an eighth connecting pattern 159h and may further include a fifteenth resistance line 151h and a sixteenth resistance line 153h.

Other features and aspects of the third and fourth strain gauges 150e and 150g are substantially the same as, or similar to, those of the first strain gauge 150a, and thus, detailed descriptions thereof will be omitted to avoid redundancy. Also, other features and aspects of the third and fourth conductors 150f and 150h are substantially the same as, or similar to, those of the first conductor 150b, and thus, detailed descriptions thereof will be omitted to avoid redundancy.

The third pressure sensor PS3 may include a fifth strain gauge 150i, a fifth conductor 150j, a sixth strain gauge 150k, and a sixth conductor 150l, which are disposed in the third sensing area SA3.

The fifth and sixth strain gauges 150i and 150k may be disposed in one of the rows formed by the second touch electrodes 131. For example, as illustrated in FIGS. 10, 11, and 16, the fifth strain gauge 150i may be disposed in the first row RO1, and the sixth strain gauge 150k may be disposed in the second row RO2.

In a plan view, the fifth strain gauge 150i, the fifth conductor 150j, the sixth strain gauge 150k, and the sixth conductor 150l may extend from the second side to the first side of the touch sensor layer along the opposite direction of the first direction x and then from the first side to the second side of the touch sensor layer TSL along the first direction x. Accordingly, both ends of each of the fifth strain gauge 150i, the fifth conductor 150j, the sixth strain gauge 150k, and the sixth conductor 150l may be disposed on the other side of the sensing area SA, e.g., on the right side of the third sensing area SA3, as illustrated in FIGS. 10 and 11.

In some embodiments, the fifth and sixth strain gauges 150i and 150k may have the same structure as the first strain gauge 150a, and thus, detailed descriptions thereof will be omitted to avoid redundancy.

As illustrated in FIG. 16, the fifth strain gauge 150i may include seventeenth resistance lines 151i, eighteenth resistance lines 153i, a seventeenth connecting line 155i, an eighteenth connecting line 157i, and a ninth connecting pattern 159i.

As illustrated in FIG. 16, the sixth strain gauge 150k may include twenty-first resistance lines 151k, twenty-second resistance lines 153k, a twenty-first connecting line 155k, a twenty-second connecting line 157k, and an eleventh connecting pattern 159k.

The fifth and sixth conductors 150j and 150l may be disposed in the electrode rows formed by the first touch electrode members 120. For example, as illustrated in FIGS. 10, 11, and 16, the fifth conductor 150j may be disposed in the first electrode row RE1, and the sixth conductor 150l may be disposed in the second electrode row RE2.

In some embodiments, the fifth and sixth conductors 150j and 150l may have the same structure as the first conductor 150b, and thus, detailed descriptions thereof will be omitted to avoid redundancy.

The fifth conductor 150j may include a ninth conductive pattern 152j, a tenth conductive pattern 154j, a nineteenth connecting line 155j, a twentieth connecting line 157j, and a tenth connecting pattern 159j and may further include a nineteenth resistance line 151j and a twentieth resistance line 153j.

The sixth conductor 150l may include an eleventh conductive pattern 152l, a twelfth conductive pattern 154l, a twenty-third connecting line 155l, a twenty-fourth connecting line 157l, and a tenth connecting pattern 159l and may further include a twenty-third resistance line 151l and a twenty-fourth resistance line 153l.

Other features and aspects of the fifth and sixth strain gauges 150i and 150k are substantially the same as, or similar to, those of the first strain gauge 150a, and thus, detailed descriptions thereof will be omitted to avoid redundancy. Also, other features and aspects of the fifth and sixth conductors 150j and 150l are substantially the same as, or similar to, the first conductor 150b, and thus, detailed descriptions thereof will be omitted.

The noise sensing electrode members 170 may be disposed in the first sensing area SA1, particularly, in the electrode rows formed by the first touch electrode members 120, as depicted in FIGS. 10 and 11. In some embodiments, the noise sensing electrode members 170 may be disposed in different electrode rows from the elements of each of the first, second, and third pressure sensors PS1, PS2, and PS3.

As illustrated in FIGS. 10, 11, and 24, each of the noise sensing electrode members 170 may include noise sensing electrodes 171 and third connectors 173.

The noise sensing electrodes 171 may be disposed in the first openings OP1 of the first touch electrodes 121 and may be spaced apart from the first touch electrodes 121. In some embodiments, as illustrated in FIG. 25, the noise sensing electrodes 171, like the first touch electrodes 121, may be disposed on the insulating layer IL. The noise sensing electrodes 171 may be formed of the second conductive layer ML2 of FIG. 4 and may include the same material as the first touch electrodes 121.

In some embodiments, in a case where the first touch electrodes 121 have a mesh structure, the noise sensing electrodes 171 may also have a mesh structure, as illustrated in FIG. 27.

The third connectors 173 may electrically connect pairs of adjacent noise sensing electrodes 171 in the first direction x in the same electrode row. In some embodiments, the third connectors 173, like the first connectors 123, may be formed of the first conductive layer ML1 of FIG. 4 and may include the same material as the first connectors 123.

In some embodiments, the noise sensing electrodes 171 and the third connectors 173 may be connected via eighth contact holes CN8 which are formed in the insulating layer IL.

As illustrated in FIGS. 10, 11, and 24, the first patterns 180 may be disposed in first openings OP1 of the first touch electrodes 121 where the noise sensing electrodes 171, the first pressure sensor PS1, the second pressure sensor PS2, and the third pressure sensor PS3 are not disposed. Also, the second patterns 190 may be disposed in second openings OP2 of the second touch electrodes 131 where the first pressure sensor PS1, the second pressure sensor PS2, and the third pressure sensor PS3 are not disposed.

Since the first openings OP1 are formed in the first touch electrodes 121 and the second openings OP2 are formed in the second touch electrodes 131, differences may arise in the reflectance of external light, and as a result, pattern smudges may become visible from the outside of the display device 1. The first patterns 180 and the second patterns 190 can reduce such external reflectance differences and can thus lower the possibility of pattern smudges becoming visible from the outside of the display device 1.

In some embodiments, the first patterns 180 may have substantially the same shape as the first openings OP1, and the second patterns 190 may have substantially the same shape as the second openings OP2. For example, in a case where the first openings OP1 and the second openings OP2 have a generally rhombus shape in a plan view, the first patterns 180 and the second patterns 190 may also have a generally rhombus shape in a plan view.

The first patterns 180 may be disposed in the first openings OP1 and may be spaced apart from the first touch electrodes 121. Also, the second patterns 190 may be disposed in the second openings OP2 and may be spaced apart from the second touch electrodes 131. That is, the first patterns 180 and the second patterns 190 may be a substantial lump- or island-shape conductive patterns. In some embodiments, the first patterns 180 and the second patterns 190 may all be floated.

As illustrated in FIG. 26, the first patterns 180 and the second patterns 190 may be formed of the same layer, and may include the same material as, the first touch electrodes 121 and the second touch electrodes 131. That is, the first patterns 180 and the second patterns 190 may be disposed on the insulating layer IL. In some embodiments, the first patterns 180 and the second patterns 190 may be formed of the second conductive layer ML2 of FIG. 4.

In some embodiments, in a case where the first touch electrodes 121 and the second touch electrodes 131 have a mesh structure, the first patterns 180 and the second patterns 190 may also have a mesh structure.

The non-sensing area NSA will hereinafter be described.

As illustrated in FIG. 10, the touch sensor layer TSL may include touch wires which are located in the non-sensing area NSA and are disposed on the base layer TFE. Also, as illustrated in FIG. 11, the touch sensor layer TSL may further include a noise wire 907 and pressure wires which are located in the non-sensing area NSA and are disposed on the base layer TFE.

As illustrated in FIG. 10, the touch wires may include first touch wires 901 which are connected to second touch electrode members 130 in the first sensing area SA1, second touch wires 903 which are connected to second touch electrode members 130 in the second and third sensing areas SA2 and SA3, and third touch wires 905 which are connected to the first touch electrode members 120.

The first touch wires 901, the second touch wires 903, and the third touch wires 905 may be connected to the touch pad portion (TPD1 and TPD2).

In some embodiments, the first touch wires 901 and the second touch wires 903 may be connected to a first touch pad portion TPD1, and the third touch wires 905 may be connected to a second touch pad portion TPD2. However, the example embodiments are not limited to this.

As illustrated in FIG. 11, the noise wire 907 may connect the noise sensing electrode members 170 and the touch pad portion (TPD1 and TPD2). The noise wire 907 is illustrated as being connected to the first touch pad portion TPD1, but the example embodiments are not limited thereto. Alternatively, the noise wire 907 may be connected to the second touch pad portion TPD2.

The pressure wires include first, second, third, fourth, and fifth pressure wires 911, 913, 915, 917, and 919 which are connected to the first pressure sensor PS1. The pressure wires further include sixth, seventh, eighth, ninth, and tenth pressure wires 921, 923, 925, 927, and 929 which are connected to the second pressure sensor PS2 and eleventh, twelfth, thirteenth, fourteenth, and fifteenth pressure wires 931, 933, 935, 937, and 939 which are connected to the third pressure sensor PS3.

In some embodiments, the first, second, third, fourth, fifth, sixth, seventh, eighth, ninth, and tenth pressure wires 911, 913, 915, 917, 919, 921, 923, 925, 927, and 929 may be disposed in part of the non-sensing area NSA adjacent to the second sensing area SA2. For example, the first, second, third, fourth, fifth, sixth, seventh, eighth, ninth, and tenth pressure wires 911, 913, 915, 917, 919, 921, 923, 925, 927, and 929 may be disposed on the opposite side, in the first direction x, of the second sensing area SA2 from the first sensing area SA1.

The eleventh, twelfth, thirteenth, fourteenth, and fifteenth pressure wires 931, 933, 935, 937, and 939 may be disposed in part of the non-sensing area NSA adjacent to the third sensing area SA3. For example, the eleventh, twelfth, thirteenth, fourteenth, and fifteenth pressure wires 931, 933, 935, 937, and 939 may be disposed on the opposite side, in the first direction x, of the third sensing area SA3 from the first sensing area SA1.

The first pressure wire 911 may be connected to a first end of the first strain gauge 150a. The second pressure wire 913 may be connected to a second end of the first strain gauge 150a and a first end of the first conductor 150b. The third pressure wire 915 may be connected to a second end of the first conductor 150b and a first end of the second strain gauge 150c. The fourth pressure wire 917 may be connected to a second end of the second strain gauge 150c and a first end of the second conductor 150d. The fifth pressure wire 919 may be connected to a second end of the second conductor 150d.

The sixth pressure wire 921 may be connected to a first end of the third strain gauge 150e. The seventh pressure wire 923 may be connected to a second end of the third strain gauge 150e and a first end of the third conductor 150f. The eighth pressure wire 925 may be connected to a second end of the third conductor 150f and a first end of the fourth strain gauge 150g. The ninth pressure wire 927 may be connected to a second end of the fourth strain gauge 150g and a first end of the fourth conductor 150h. The tenth pressure wire 929 may be connected to a second end of the fourth conductor 150h.

The first, second, third, fourth, fifth, sixth, seventh, eighth, ninth, and tenth pressure wires 911, 913, 915, 917, 919, 921, 923, 925, 927, and 929 may be connected to the first touch pad portion TPD1.

The eleventh pressure wire 931 may be connected to a first end of the fifth strain gauge 150i. The twelfth pressure wire 933 may be connected to a second end of the fifth strain gauge 150i and a first end of the fifth conductor 150j. The thirteenth pressure wire 935 may be connected to a second end of the fifth conductor 150j and a first end of the sixth strain gauge 150k. The fourteenth pressure wire 937 may be connected to a second end of the sixth strain gauge 150k and a first end of the sixth conductor 150l. The fifteenth pressure wire 939 may be connected to a second end of the sixth conductor 150l.

In some embodiments, the eleventh, twelfth, thirteenth, fourteenth, and fifteenth pressure wires 931, 933, 935, 937, and 939 may be connected to the second touch pad portion TPD2.

In the non-sensing area NSA, the touch pad portion (TPD1 and TPD2) may be disposed. In some embodiments, the touch pad portion (TPD1 and TPD2) may be disposed on the base substrate 110 of the display panel DP, but the example embodiments are not limited thereto. In other embodiments, the touch pad portion (TPD1 and TPD2) may be disposed on the base layer TFE.

In some embodiments, the touch pad portion (TPD1 and TPD2) may include the first and second touch pad portions TPD1 and TPD2. In some embodiments, the first and second touch pad portions TPD1 and TPD2 may be spaced apart from each other in the first direction x. The first and second touch pad portions TPD1 and TPD2 may be connected to the touch controller TSC.

In the touch sensor TSM, touch electrode members and pressure sensors are realized using two conductive layers. Thus, the fabrication of the touch sensor TSM can be simplified, and the touch sensor TSM can be equipped with a pressure sensing function and can be thinned down.

Also, since the touch sensor TSM includes the noise sensing electrode members 170, the malfunction of the touch sensor TSM can be minimized, and the sensing sensitivity of the touch sensor TSM can be improved.

Also, since in the touch sensor TSM, some pressure wires are connected to both strain gauges and conductors, the size of part of the non-sensing area NSA occupied by the pressure wires can be reduced.

A touch location detection operation of the touch controller TSC will hereinafter be described with reference to FIG. 28.

Figure 28:
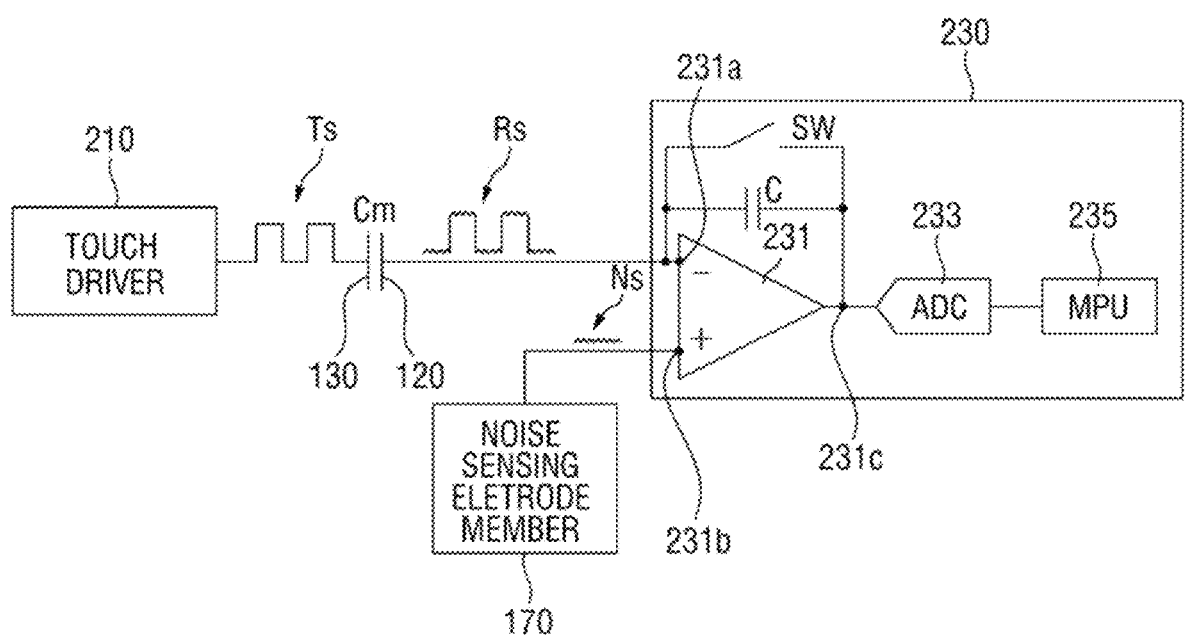
FIG. 28 is a block diagram illustrates an example touch location detection operation of the touch sensor of FIG. 9.

FIG. 28 illustrates an example touch location detection operation of the touch sensor of FIG. 9.

Referring to FIG. 28, the touch driver 210 may provide the driving signals Ts to the second touch electrode members 130 via the first touch wires 901 and the second touch wires 903 of FIG. 10. In some embodiments, the driving signals Ts may be sequentially provided to the second touch electrode members 130.

The touch detector 230 may receive the sensing signals Rs from the first touch electrode members 120 via the third touch wires 905 of FIG. 10. In some embodiments, as already described above, the sensing signals Rs may include information regarding variations in the mutual capacitances between the first touch electrode members 120 and the second touch electrode members 130. In response to the driving signals Ts being provided to the second touch electrode members 130, mutual capacitances Cm may be generated between the first touch electrode members 120 and the second touch electrode members 130. In response to touch input being generated, variations may occur in the mutual capacitances Cm, and the sensing signals Rs may include the variations in the mutual capacitances Cm.

In some embodiments, the touch detector 230 may include at least one amplifier 231 such as an operational (OP) amplifier, an analog-to-digital converter (ADC) 233, and a processor 235.

The amplifier 231 may include a first input terminal 231a, a second input terminal 231b, and an output terminal 231c. The first input terminal 231a of the amplifier 231, e.g., the inverting input terminal of an OP amplifier, may be electrically connected to the first touch electrode members 120 via the first touch wires 901, and the sensing signals Rs may be input to the first input terminal 231a.

In some embodiments, the second input terminal 231b of the amplifier 231, e.g., the non-inverting input terminal of an OP amplifier, may be electrically connected to the noise sensing electrode members 170 via the noise wire 907, and the noise sensing signals Ns may be provided to the second input terminal 231b of the amplifier 231. As a result, the reference voltage of the amplifier 231 may vary in accordance with voltage variations in the noise sensing electrode members 170. That is, the reference voltage of the amplifier 231 may vary in accordance with the electric potential (or voltage level) of the noise sensing electrode members 170.

The electric potential of the noise sensing electrode members 170 may vary in accordance with noise signals introduced into the touch sensor layer TSL from the display panel DP or the like. For example, the electric potential of the noise sensing electrode members 170 may vary in accordance with common mode noise introduced into the touch sensor layer TSL from the display panel DP or the like.

Thus, by further disposing the noise sensing electrode members 170 in the sensing area SA and changing the reference voltage of the amplifier 231 with the noise sensing signals Ns, which are detected by the noise sensing electrode members 170, the common mode noise introduced into the touch sensor layer TSL can be offset or removed. Specifically, the first touch electrode members 120, which are sensing electrode members, and the noise sensing electrode members 170 may have ripples corresponding to the common mode noise. Since in the sensing area SA, the first touch electrode members 120 extend in the same direction as the noise sensing electrode members 170 and are disposed at locations corresponding to the noise sensing electrode members 170, the first touch electrode members 120 and the noise sensing electrode members 170 receive the same or very similar noise signals (in terms of pattern and/or magnitude). Also, the first touch electrode members 120 are electrically connected to the first input terminal 231a of the amplifier 231 via the third touch wires 905, and the noise sensing electrode members 170 are electrically connected to the second input terminal 231b of the amplifier 231 via the noise wire 907, which is different from the third touch wires 905. Thus, noise components (or ripples) included in the sensing signals Rs received from the first touch electrode members 120 can be effectively offset. Accordingly, the output terminal 231c of the amplifier 231 can output sensing signals with noise removed therefrom.

In some embodiments, a capacitor C and a reset switch SW may be connected in parallel between the first input terminal 231a and the output terminal 231c of the amplifier 231.

The amplifier 231 may be implemented as a non-inverting amplifier, but the example embodiments are not limited thereto. Alternatively, the amplifier 231 may be implemented as an inverting amplifier.

The output terminal 231c of the amplifier 231 may be electrically connected to the ADC 233.

The ADC 233 may convert analog signals into digital signals. As many ADCs 233 as there are first touch electrode members 120 may be provided to correspond one-to-one to the first touch electrode members 120. Alternatively, the first touch electrode members 120 may be configured to share only one ADC 233, in which case, a switching circuit for channel selection may be additionally provided in the touch detector 230.

The processor 235 processes digital signals provided by the ADC 233 and detects touch input based on the processed digital signals. For example, the processor 235 may detect the presence and location of touch input by analyzing first sensing signals amplified by the amplifier 231 and then converted by the ADC 233. The processor 235 may be implemented as a micro-processing unit (MPU), in which case, a memory for driving the processor 235 may be additionally provided in the touch detector 230. The configuration of the processor 235 is not particularly limited. Alternatively, the processor 235 may be implemented as a microcontroller unit (MCU).

The touch sensor TSM can effectively offset noise signals introduced thereinto from the display panel DP or the like and can improve signal-to-noise ratio (SNR). Accordingly, the malfunction of the touch sensor TSM that may be caused by noise signals can be minimized, and the sensing sensitivity of the touch sensor TSM can be improved.

A touch pressure detection operation of the touch controller TSC will hereinafter be described with reference to FIGS. 29, 30, 31, and 32.

Figure 29:
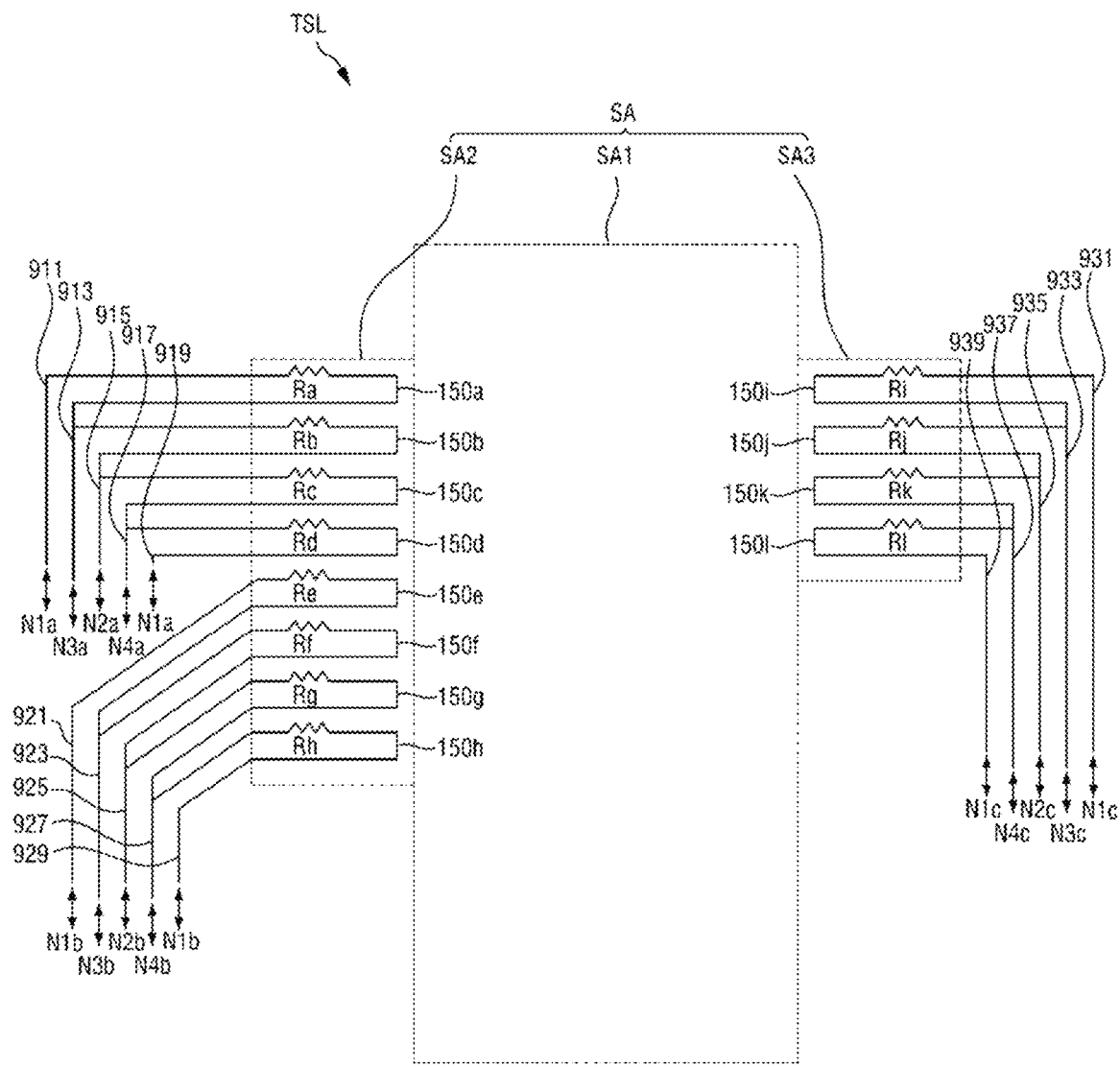
FIG. 29 is a plan view illustrating the arrangement of first, second, and third pressure sensors and pressure wires of FIGS. 10 and 11 and how the pressure wires and Wheatstone bridge circuit are connected.
Figure 30:
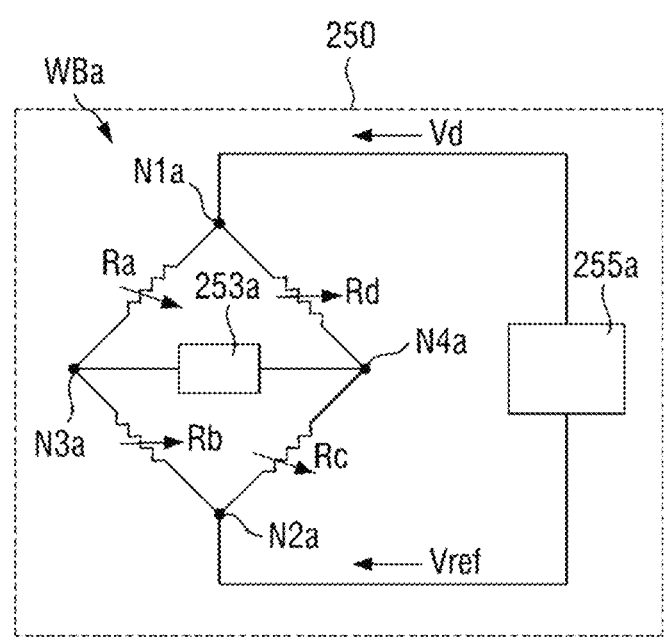
FIGS. 30, 31, and 32 are example embodiments of circuit diagrams illustrating a touch pressure detection operation of the touch sensor of FIG. 9, particularly, a Wheatstone bridge circuit connected to the first pressure sensor of FIG. 29, a Wheatstone bridge circuit connected to the second pressure sensor of FIG. 29, and a Wheatstone bridge circuit connected to the third pressure sensor of FIG. 29, respectively.
Figure 31:
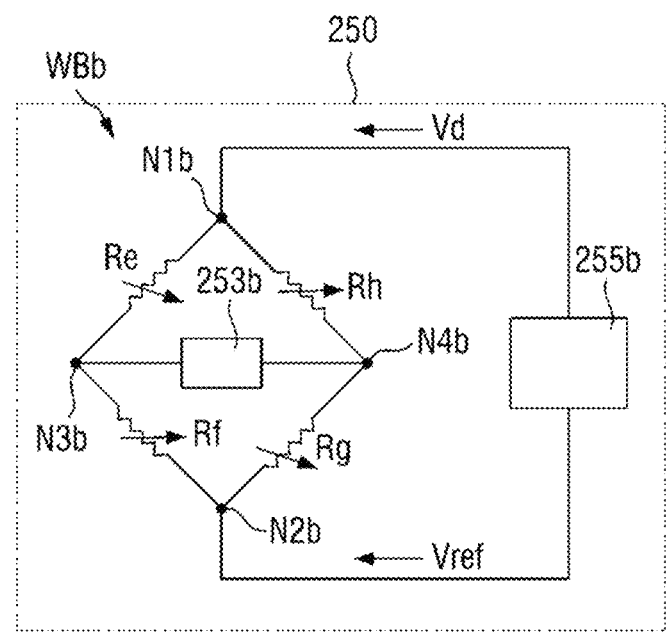
Figure 32:
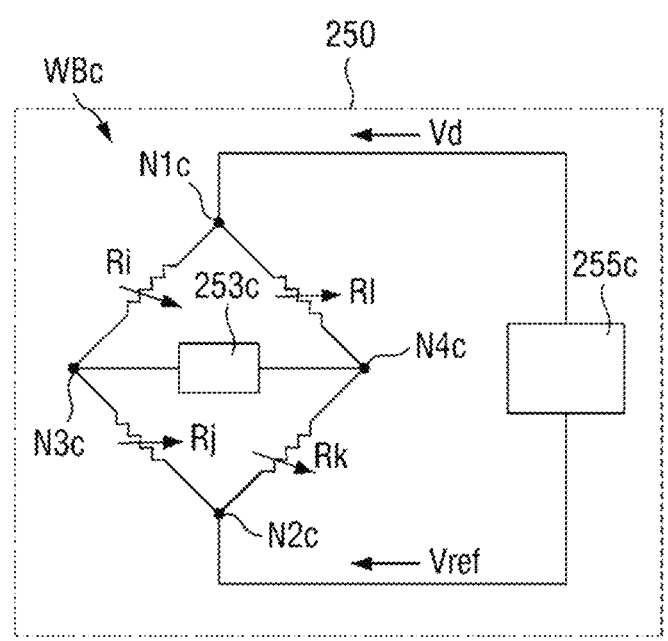

FIG. 29 is a plan view illustrating the arrangement of the first, second, and third pressure sensors and the pressure wires of FIGS. 10 and 11 and how the pressure wires and Wheatstone bridge circuits are connected, and FIGS. 30, 31, and 32 are example embodiments of circuit diagrams illustrating the touch pressure detection operation of the touch sensor of FIG. 9, particularly, a Wheatstone bridge circuit connected to the first pressure sensor of FIG. 29, a Wheatstone bridge circuit connected to the second pressure sensor of FIG. 29, and a Wheatstone bridge circuit connected to the third pressure sensor of FIG. 29, respectively.

Referring to FIGS. 29 through 32, in the absence of touch input, the first strain gauge 150a may have a first resistance Ra, the first conductor 150b may have a second resistance Rb, the second strain gauge 150c may have a third resistance Rc, the second conductor 150d may have a fourth resistance Rd, the third strain gauge 150e may have a fifth resistance Re, the third conductor 150f may have a sixth resistance Rf, the fourth strain gauge 150g may have a seventh resistance Rg, and the fourth conductor 150h may have an eighth resistance Rh. Also, in the absence of touch input, the fifth strain gauge 150i may have a ninth resistance Ri, the fifth conductor 150j may have a tenth resistance Rj, the sixth strain gauge 150k may have an eleventh resistance Rk, and the sixth conductor 150l may have a twelfth resistance Rl.

The pressure detector 250 may include first, second, and third Wheatstone bridge circuits WBa, WBb, and WBc.

The first Wheatstone bridge circuit WBa may include a first node N1a, a second node N2a, a first output node N3a, and a second output node N4a and may further include a first element 253a which is connected to the first and second output nodes N3a and N4a and a second element 255a which is connected to the first and second nodes N1a and N2a.

In some embodiments, a driving voltage Vd may be provided to the first node N1a, and a reference voltage Vref may be provided to the second node N2a. For example, the reference voltage Vref may be a ground voltage.

The first element 253a may detect an electrical flow between the first and second output nodes N3a and N4a. For example, the first element 253a may be a galvanic element or a voltage measuring device.

The second element 255a may be a voltage supplying element supplying voltages to the first and second nodes N1a and N2a. In some embodiments, the second element 255a may provide the driving voltage Vd to the first node N1a and may provide the reference voltage Vref to the second node N2a.

The second Wheatstone bridge circuit WBb may include a first node Nib, a second node N2b, a first output node N3b, and a second output node N4b and may further include a first element 253b which is connected to the first and second output nodes N3b and N4b and a second element 255b which is connected to the first and second nodes Nib and N2b. Similarly, the third Wheatstone bridge circuit WBc may include a first node Nic, a second node N2c, a first output node N3c, and a second output node N4c and may further include a first element 253c which is connected to the first and second output nodes N3c and N4c and a second element 255c which is connected to the first and second nodes N1c and N2c. The first and second elements 253b and 255b of the second Wheatstone bridge circuit WBb are substantially the same as the first and second elements 253a and 255a, respectively, of the first Wheatstone bridge circuit WBa, and thus, detailed descriptions thereof will be omitted to prevent redundancy. Also, the first and second elements 253c and 255c of the third Wheatstone bridge circuit WBc are substantially the same as the first and second elements 253a and 255a, respectively, of the first Wheatstone bridge circuit WBa, and thus, detailed descriptions thereof will be omitted to prevent redundancy.

The first pressure sensor PS1 may be electrically connected to the first Wheatstone bridge circuit WBa, the second pressure sensor PS2 may be electrically connected to the second Wheatstone bridge circuit WBb, and the third pressure sensor PS3 may be electrically connected to the third Wheatstone bridge circuit WBc.

Specifically, in some embodiments, the first end of the first strain gauge 150a may be connected to the first node N1a of the first Wheatstone bridge circuit WBa via the first pressure wire 911, and the second end of the first strain gauge 150a and the first end of the first conductor 150b may be connected to the first output node N3a of the first Wheatstone bridge circuit WBa via the second pressure wire 913. Also, the second end of the first conductor 150b and the first end of the second strain gauge 150c may be connected to the second node N2a of the first Wheatstone bridge circuit WBa via the third pressure wire 915, the second end of the second strain gauge 150c and the first end of the second conductor 150d may be connected to the second output node N4a of the first Wheatstone bridge circuit WBa via the fourth pressure wire 917, and the second end of the second conductor 150d may be connected to the first node N1a of the first Wheatstone bridge circuit WBa via the fifth pressure wire 919.

That is, the first strain gauge 150a, the second strain gauge 150c, the first conductor 150b, and the second conductor 150d may be electrically connected to one another and may thus form a Wheatstone bridge.

In some illustrated embodiments, in the absence of touch input or an external force, the first resistance Ra of the first strain gauge 150a, the second resistance Rb of the first conductor 150b, the third resistance Rc of the second strain gauge 150c, and the fourth resistance Rd of the second conductor 150d may be substantially the same.

When touch input is yet to be applied to the touch sensor layer TSL, the first resistance Ra of the first strain gauge 150a, the second resistance Rb of the first conductor 150b, the third resistance Rc of the second strain gauge 150c, and the fourth resistance Rd of the second conductor 150d can maintain an equilibrium. For example, the product of the first resistance Ra of the first strain gauge 150a and the third resistance Rc of the third strain gauge 150c may be substantially the same as the product of the second resistance Rb of the first conductor 150b and the fourth resistance Rd of the second conductor 150d. That is, when touch input is yet to be applied to the touch sensor layer TSL, the voltage at the first output node N3a and the voltage at the second output node N4a may be the same.

In response to touch input being applied to the touch sensor layer TSL, at least one of the first and second strain gauges 150a and 150c may be deformed by pressure, and at least one of the first resistance Ra of the first strain gauge 150a and the third resistance Rc of the second strain gauge 150c may change. As a result, a voltage difference is generated between the first and second output nodes N3a and N4a. Then, the intensity or the pressure of the touch input may be detected by measuring the voltage difference or the amount of current generated by the voltage difference with the first element 253a.

When touch input is applied to the touch sensor layer TSL, not only the pressure, but also the temperature changes, and at least one of the first resistance Ra of the first strain gauge 150a and the third resistance Rc of the second strain gauge 150c changes in response to the temperature change. In this case, one of the second resistance Rb of the first conductor 150b and the fourth resistance Rd of the second conductor 150d also changes in response to the temperature change. Accordingly, resistance variations in the first and second strain gauges 150a and 150c caused by the temperature change can be compensated for.

The electrical connections between the first strain gauge 150a, the second strain gauge 150c, the first conductor 150b, the second conductor 150d, and the first Wheatstone bridge circuit WBa may vary.

The first end of the third strain gauge 150e may be connected to the first node Nib of the second Wheatstone bridge circuit WBb via the sixth pressure wire 921, and the second end of the third strain gauge 150e and the first end of the third conductor 150f may be connected to the first output node N3b of the second Wheatstone bridge circuit WBb via the seventh pressure wire 923. Also, the second end of the third conductor 150f and the first end of the fourth strain gauge 150g may be connected to the second node N2b of the second Wheatstone bridge circuit WBb via the eighth pressure wire 925, the second end of the fourth strain gauge 150g and the first end of the fourth conductor 150h may be connected to the second output node N4b of the second Wheatstone bridge circuit WBb via the ninth pressure wire 927, and the second end of the fourth conductor 150h may be connected to the first node Nib of the second Wheatstone bridge circuit WBb via the tenth pressure wire 929.

That is, the third strain gauge 150e, the fourth strain gauge 150g, the third conductor 150f, and the fourth conductor 150h may be electrically connected to one another and may thus form a Wheatstone bridge.

In some embodiments, in the absence of touch input or an external force, the fifth resistance Re of the third strain gauge 150e, the sixth resistance Rf of the third conductor 150f, the seventh resistance Rg of the fourth strain gauge 150g, and the eighth resistance Rh of the fourth conductor 150h may be substantially the same.

The first end of the fifth strain gauge 150i may be connected to the first node N1c of the third Wheatstone bridge circuit WBc via the eleventh pressure wire 931, and the second end of the fifth strain gauge 150i and the first end of the fifth conductor 150j may be connected to the first output node N3c of the third Wheatstone bridge circuit WBc via the twelfth pressure wire 933. Also, the second end of the fifth conductor 150j and the first end of the sixth strain gauge 150k may be connected to the second node N2c of the third Wheatstone bridge circuit WBc via the thirteenth pressure wire 935, the second end of the sixth strain gauge 150k and the first end of the sixth conductor 150l may be connected to the second output node N4c of the third Wheatstone bridge circuit WBc via the fourteenth pressure wire 937, and the second end of the sixth conductor 150l may be connected to the first node N1c of the third Wheatstone bridge circuit WBc via the fifteenth pressure wire 939.

That is, the fifth strain gauge 150i, the sixth strain gauge 150k, the fifth conductor 150j, and the sixth conductor 150l may be electrically connected to one another and may thus form a Wheatstone bridge.

In some embodiments, in the absence of touch input or an external force, the ninth resistance Ri of the fifth strain gauge 150i, the tenth resistance Rj of the fifth conductor 150j, the eleventh resistance Rk of the sixth strain gauge 150k, and the twelfth resistance R1 of the sixth conductor 150l may be substantially the same.

That is, the touch sensor TSM can detect the location of touch input by using the first touch electrode members 120, the second touch electrode members 130, and the touch driver 210 and can detect the intensity of pressure by using the first, second, and third pressure sensors PS1, PS2, and PS3.

The pressure sensors 150 of the touch sensor TSM can be used as input devices for various electronic devices including the display device 1. The pressure sensors 150 may replace, or may be used together with, physical input buttons. For example, the intensity of pressure can be detected using the pressure sensors 150 and the pressure detector 250, and a preprogrammed operation of the display device 1 can be output in accordance with the intensity of pressure. For example, a preprogrammed function such as volume control, power-on or off, screen lock, screen unlock, switching particular hardware (e.g., sensors such as fingerprint sensors) to a standby state or a wakeup state, switching screens, calling an application, executing an application, executing a predetermined function in an application, taking a photograph, receiving a call, or the like may be performed.

Figure 33:
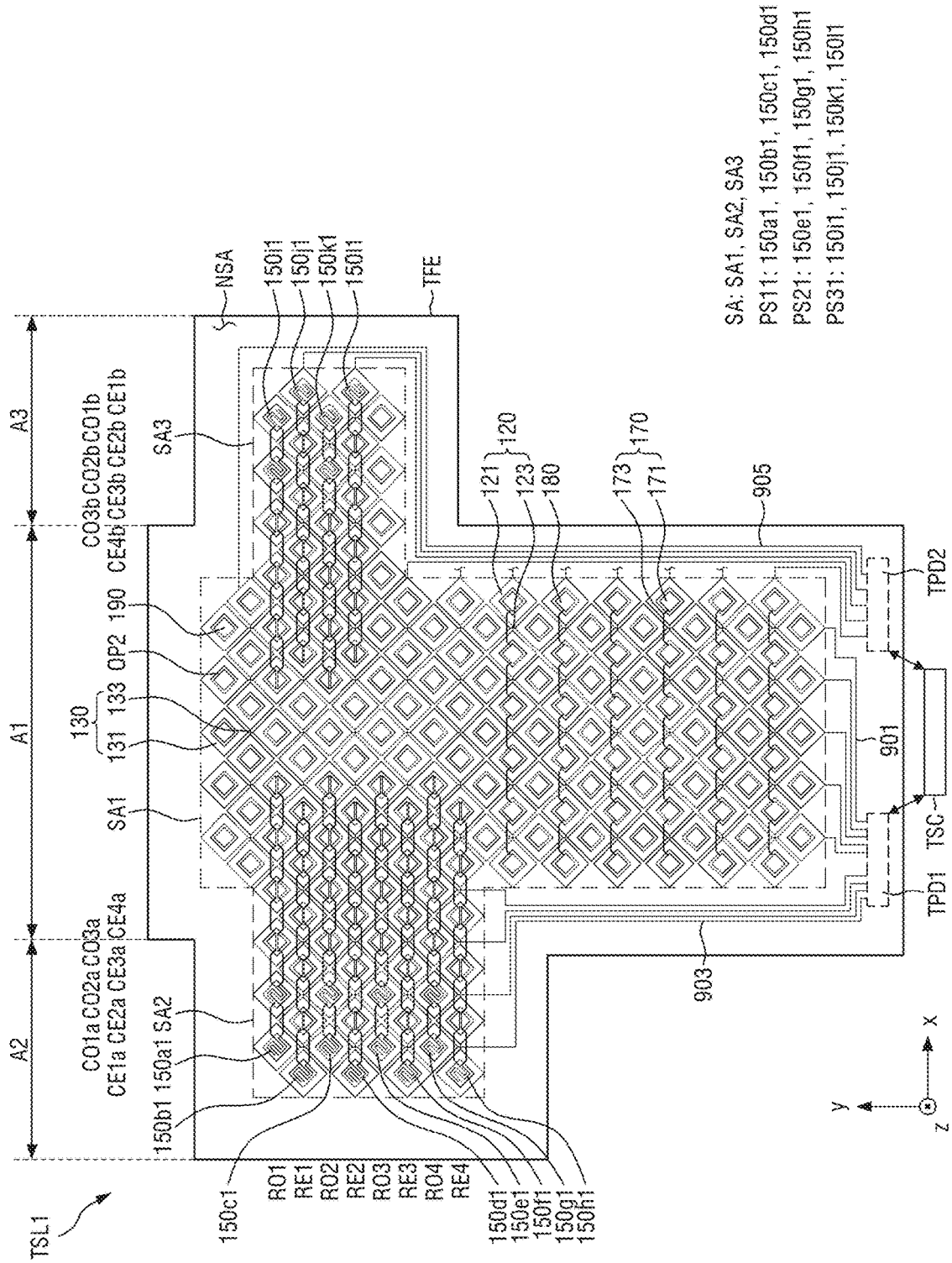
FIGS. 33 and 34 are plan views illustrating another example embodiment of a touch sensor constructed according to principles of the invention, particularly, the planar structure of a touch sensor layer of the touch sensor in its unfolded state and how the touch sensor layer and a touch controller of the touch sensor are connected.
Figure 34:
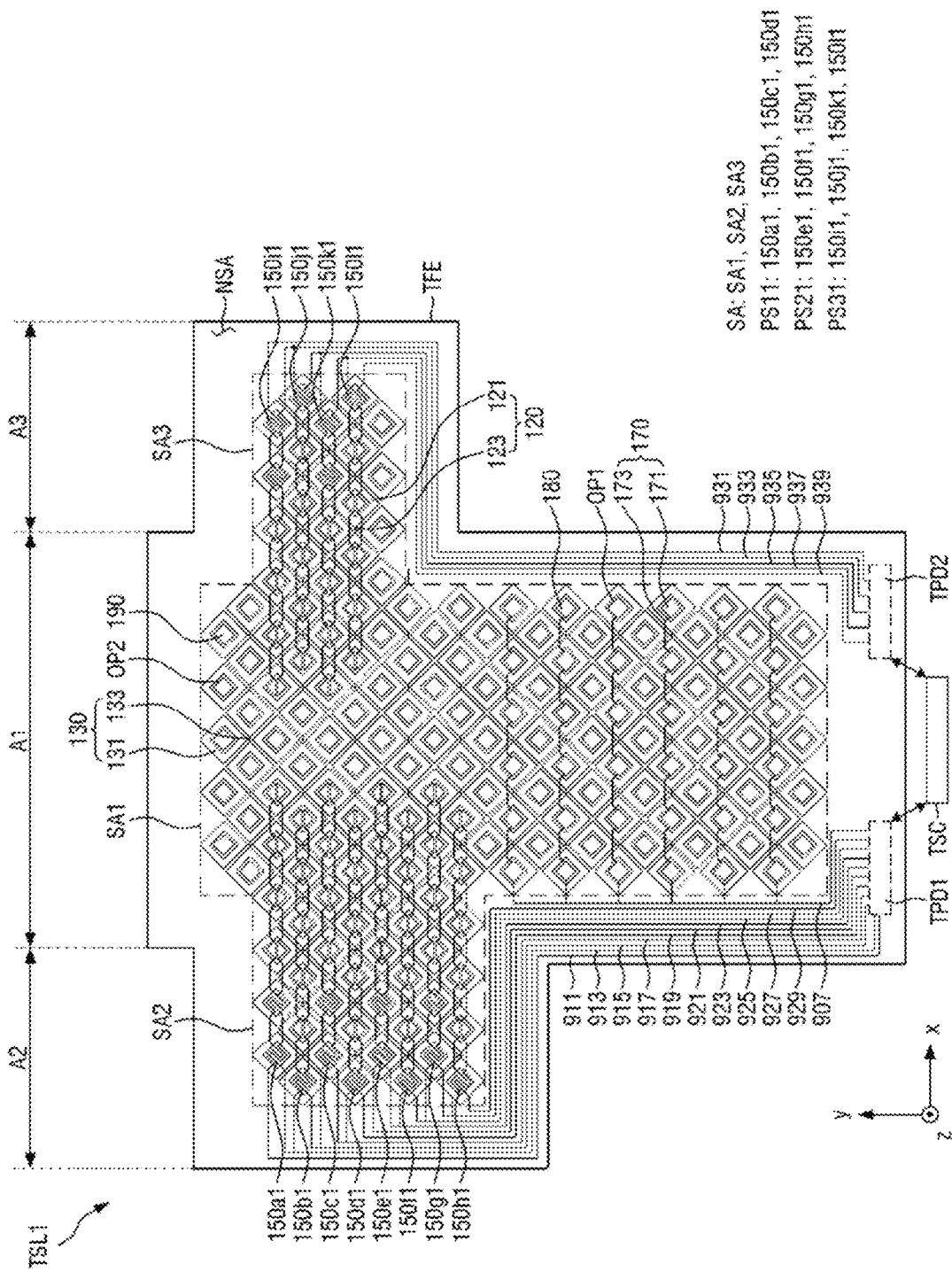
Figure 35:
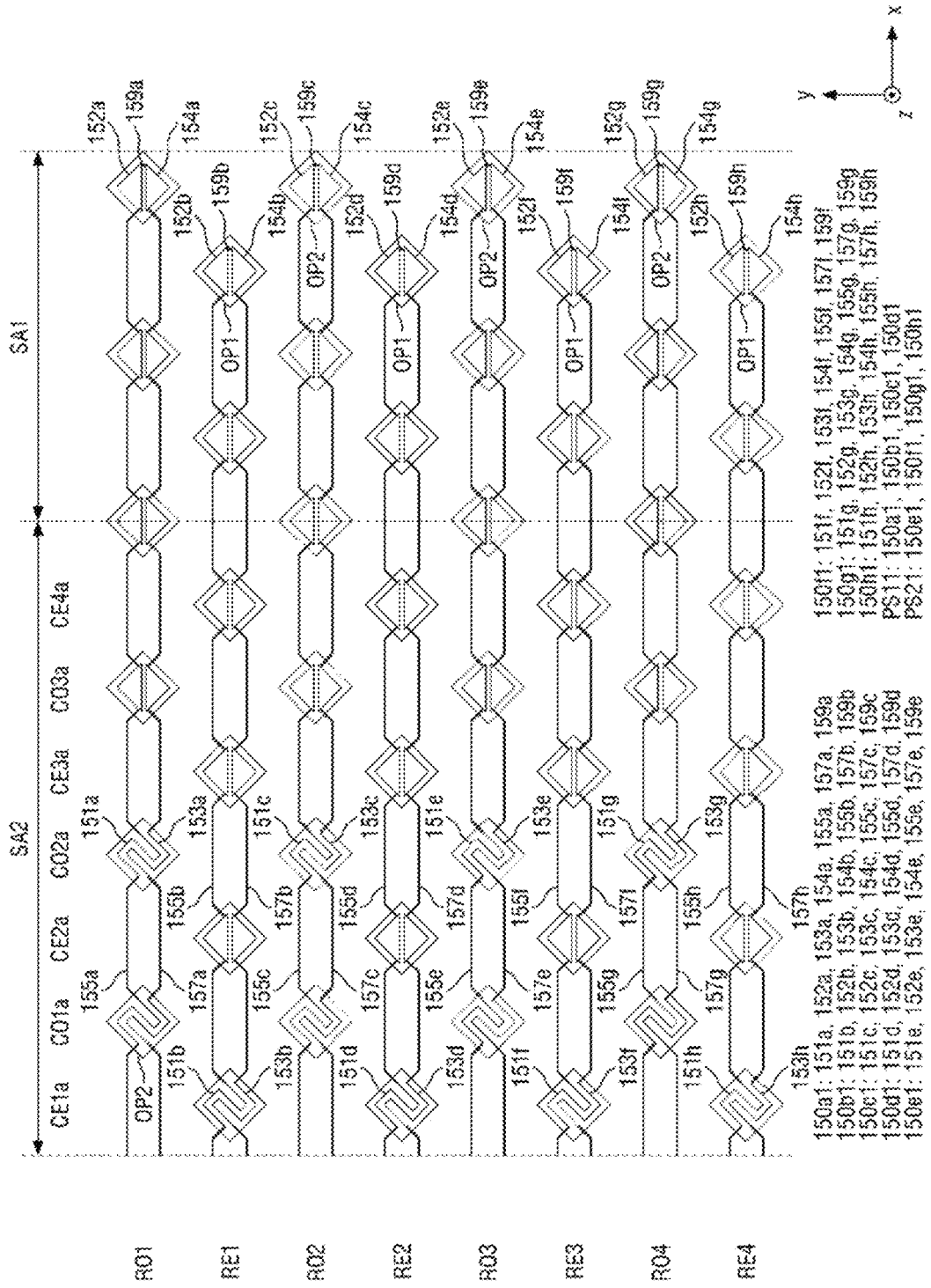
FIG. 35 is a plan view illustrating the planar structures of first and second pressure sensors of FIGS. 33 and 34.
Figure 36:
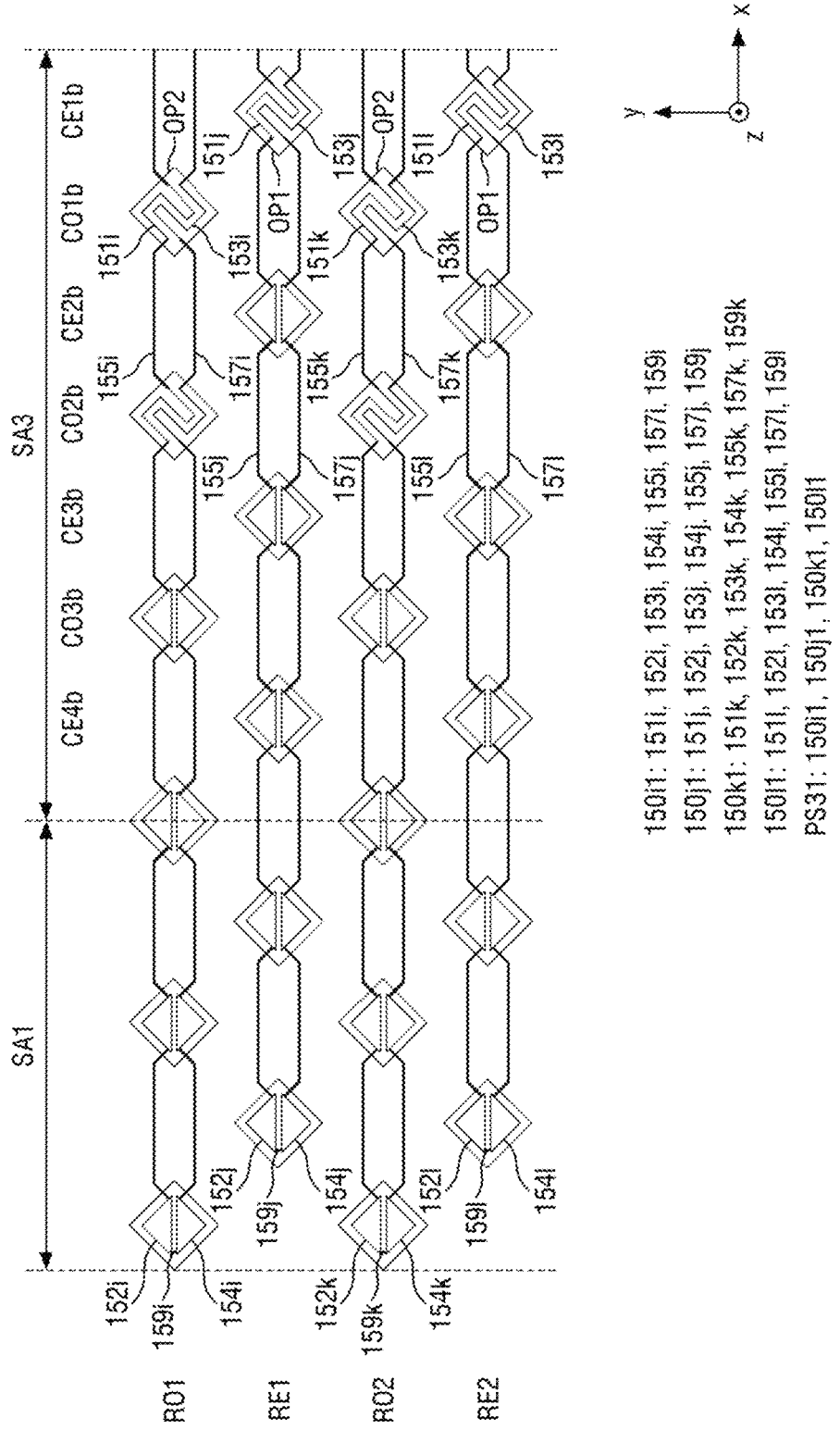
FIG. 36 is a plan view illustrating the planar structure of a third pressure sensor of FIGS. 33 and 34.

FIGS. 33 and 34 are plan views illustrating another example embodiment of a touch sensor constructed according to principles of the invention, particularly, the planar structure of a touch sensor layer of the touch sensor and how the touch sensor layer and a touch controller of the touch sensor are connected, FIG. 35 is a plan view illustrating the planar structures of first and second pressure sensors of FIGS. 33 and 34, and FIG. 36 is a plan view illustrating the planar structure of a third pressure sensor of FIGS. 33 and 34.

Referring to FIGS. 33 through 36, the touch sensor according to the illustrated embodiment includes a touch sensor layer TSL1 and a touch controller TSC.

Features or aspects of the touch sensor layer TSL1 are substantially the same as, or similar to, those of the touch sensor layer TSL of FIGS. 10 and 11 except that the touch sensor layer TSL1 includes first, second, and third pressure sensors PS11, PS21, and PS31. Thus, the touch sensor layer TSL1 will hereinafter be described, focusing mainly on the differences with the touch sensor layer TSL of FIGS. 10 and 11 to avoid redundancy.

The first pressure sensor PS11 includes a first strain gauge 150a1, a first conductor 150b1, a second strain gauge 150c1, and a second conductor 150d1.

The second pressure sensor PS21 includes a third strain gauge 150e1, a third conductor 150f1, a fourth strain gauge 150g1, and a fourth conductor 150h1.

The third pressure sensor PS31 includes a fifth strain gauge 150i1, a fifth conductor 150j1, a sixth strain gauge 150k1, and a sixth conductor 150l1.

The first strain gauge 150a1, unlike the first strain gauge 150a of FIGS. 10 through 12, further includes thirteenth conductive patterns 152a and fourteenth conductive patterns 154a. The thirteenth conductive patterns 152a and fourteenth conductive patterns 154a may be disposed in first openings OP1 of first touch electrodes 121 and may be located not only in a second sensing area SA2, but also in a first sensing area SAL. Among the thirteenth conductive patterns 152a and the fourteenth conductive patterns 154a in the first sensing area SAL, the furthest thirteenth and fourteenth conductive patterns 152a and 154a from a non-sensing area NSA in the first direction x may be connected via a first connecting pattern 159a.

In some embodiments, the thirteenth conductive patterns 152a and the fourteenth conductive patterns 154a may be formed of a second conductive layer (ML2 of FIG. 4) and may include the same material as the first touch electrodes 121 and second touch electrodes 131.

First conductive patterns 152b and second conductive patterns 154b of the first conductor 150b1 may be disposed not only in the second sensing area SA2, but also in the first sensing area SAL. Among the first conductive patterns 152b and the second conductive patterns 154b in the first sensing area SA1, the furthest first and second conductive patterns 152b and 154b from the non-sensing area NSA in the first direction x may be connected via a second connecting pattern 159b.

Other features and aspects of the second, third, fourth, fifth, and sixth conductors 150d1, 150f1, 150h1, 150j1, and 150l1 are substantially the same as, or similar to, those of the first conductor 150b1, and thus, detailed descriptions thereof will be omitted to avoid redundancy.

The second strain gauge 150c, unlike the second strain gauge 150c of FIGS. 10 through 12, further includes fifteenth conductive patterns 152c and sixteenth conductive patterns 154c, and the furthest fifteenth and sixteenth conductive patterns 152c and 154c from the second sensing area SA2 in the first direction x may be connected via a third connecting pattern 159c.

The third strain gauge 150e1, unlike the third strain gauge 150e of FIGS. 10 through 12, further includes seventeenth conductive patterns 152e and eighteenth conductive patterns 154e, and the furthest seventeenth and eighteenth conductive patterns 152e and 154e from the second sensing area SA2 in the first direction x may be connected via a fifth connecting pattern 159e.

The fourth strain gauge 150g1, unlike the fourth strain gauge 150g of FIGS. 10 through 12, further includes nineteenth conductive patterns 152g and twentieth conductive patterns 154g, and the furthest nineteenth and twentieth conductive patterns 152g and 154e from the second sensing area SA2 in the first direction x may be connected via a seventh connecting pattern 159g.

The fifth strain gauge 150i1, unlike the fifth strain gauge 150i of FIGS. 10 through 12, further includes twenty-first conductive patterns 152i and twenty-second conductive patterns 154i, and the furthest twenty-first and twenty-second conductive patterns 152i and 154i from the second sensing area SA2 in the first direction x may be connected via a ninth connecting pattern 159i.

The sixth strain gauge 150k1, unlike the sixth strain gauge 150k of FIGS. 10 through 12, further includes twenty-third conductive patterns 152k and twenty-fourth conductive patterns 154k, and the furthest twenty-third and twenty-fourth conductive patterns 152k and 154k from the second sensing area SA2 in the first direction x may be connected via an eleventh connecting pattern 159k.

The conductive patterns of each of the second, third, fourth, fifth, and sixth strain gauges 150c1, 150e1, 150g1, 150i1, and 150k1 may be formed of the second conductive layer (ML2 of FIG. 4) and may include the same material as the first touch electrodes 121 and the second touch electrodes 131.

Figure 37:
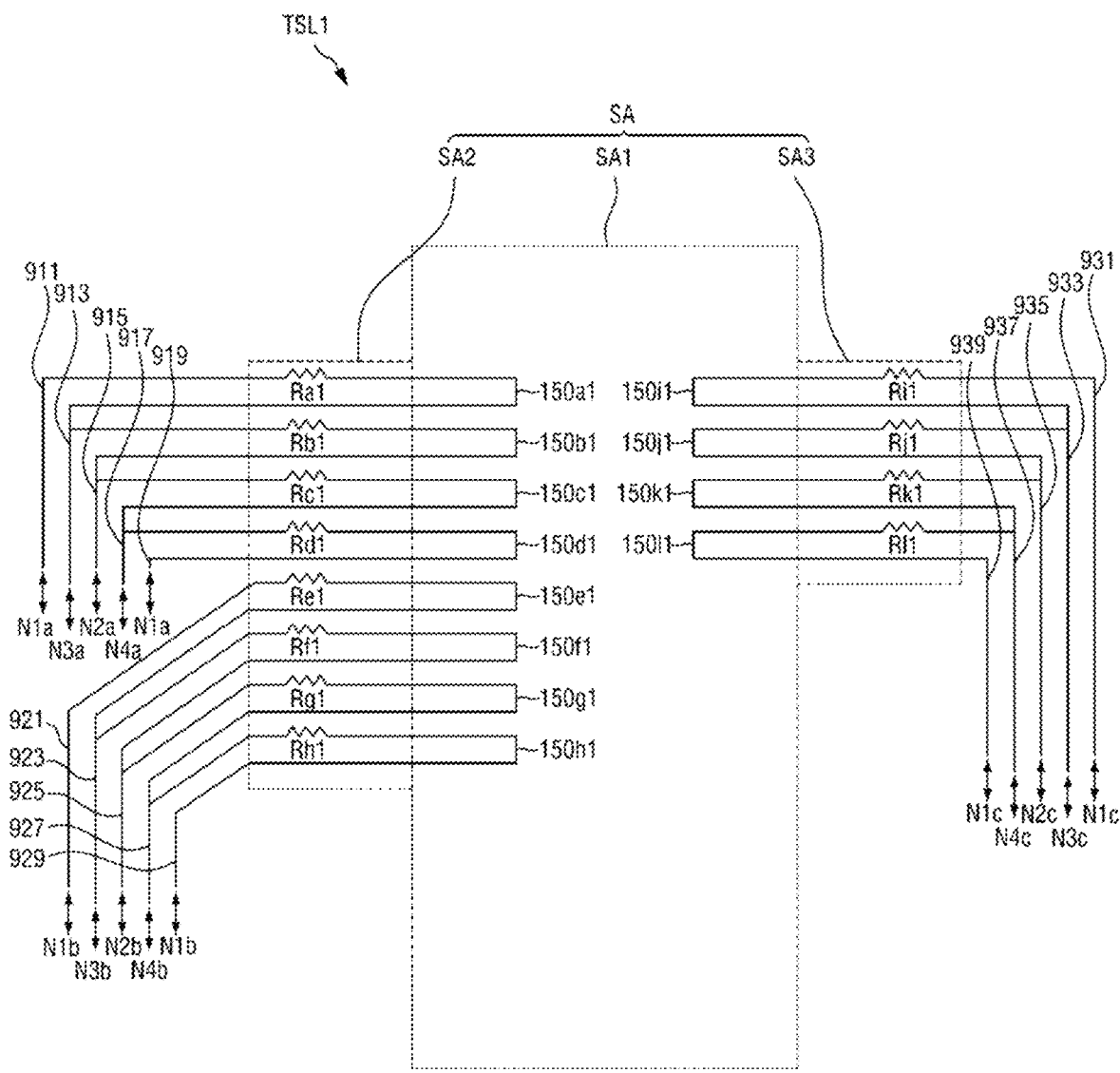
FIG. 37 is a plan view illustrating the arrangement of the first, second, and third pressure sensors of FIGS. 33 and 34 and how pressure wires and Wheatstone bridge circuit are connected.
Figure 38:
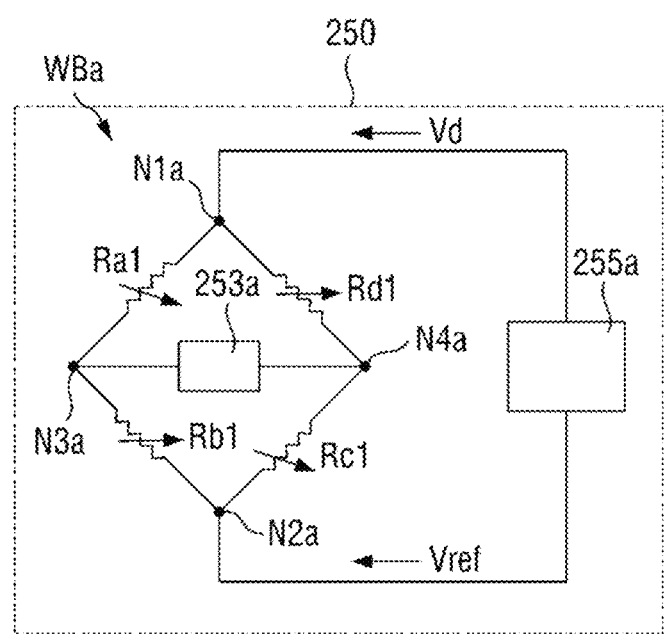
FIGS. 38, 39, and 40 are example embodiments of circuit diagrams illustrating a touch pressure detection operation of the touch sensor of FIGS. 33 and 34, particularly, a Wheatstone bridge circuit connected to the first pressure sensor of FIG. 37, a Wheatstone bridge circuit connected to the second pressure sensor of FIG. 37, and a Wheatstone bridge circuit connected to the third pressure sensor of FIG. 37, respectively.
Figure 39:
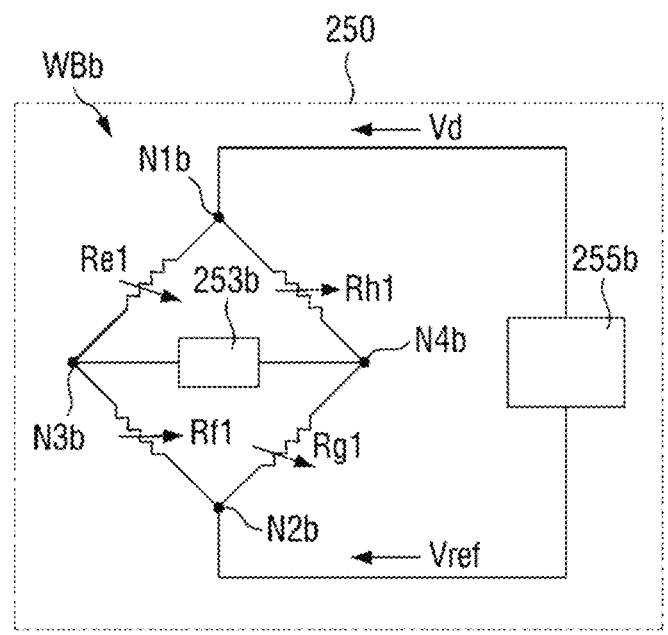
Figure 40:
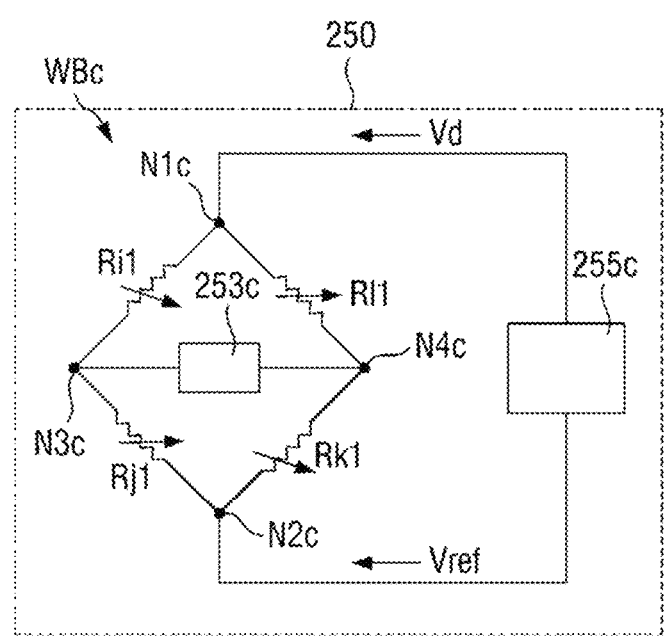

FIG. 37 is a plan view illustrating the arrangement of the first, second, and third pressure sensors of FIGS. 33 and 34 and how pressure wires and Wheatstone bridge circuits are connected, and FIGS. 38, 39, and 40 are example embodiments of circuit diagrams illustrating a touch pressure detection operation of the touch sensor of FIGS. 33 and 34, particularly, a Wheatstone bridge circuit connected to the first pressure sensor of FIG. 37, a Wheatstone bridge circuit connected to the second pressure sensor of FIG. 37, and a Wheatstone bridge circuit connected to the third pressure sensor of FIG. 37, respectively.

Referring to FIGS. 37 through 40, the first pressure sensor PS11 may be electrically connected to a first Wheatstone bridge circuit WBa, the second pressure sensor PS21 may be electrically connected to a second Wheatstone bridge circuit WBb, and the third pressure sensor PS31 may be electrically connected to a third Wheatstone bridge circuit WBc.

In the absence of touch input, the first strain gauge 150a1 may have a first resistance Ra1, the first conductor 150b1 may have a second resistance Rb1, the second strain gauge 150c1 may have a third resistance Rc1, the second conductor 150d1 may have a fourth resistance Rd1, the third strain gauge 150e1 may have a fifth resistance Re1, the third conductor 150f1 may have a sixth resistance Rf1, the fourth strain gauge 150g1 may have a seventh resistance Rg1, and the fourth conductor 150h1 may have an eighth resistance Rh1. Also, in the absence of touch input, the fifth strain gauge 150i1 may have a ninth resistance Ri1, the fifth conductor 150j1 may have a tenth resistance Rj1, the sixth strain gauge 150k1 may have an eleventh resistance Rk1, and the sixth conductor 150l1 may have a twelfth resistance Rl1.

The first pressure sensor PS11 may be electrically connected to the first Wheatstone bridge circuit WBa, the second pressure sensor PS21 may be electrically connected to the second Wheatstone bridge circuit WBb, and the third pressure sensor PS31 may be electrically connected to the third Wheatstone bridge circuit WBc.

In some illustrated embodiments, in the absence of touch input or an external force, the first resistance Ra1 of the first strain gauge 150a1, the second resistance Rb1 of the first conductor 150b1, the third resistance Rc1 of the second strain gauge 150c1, and the fourth resistance Rd1 of the second conductor 150d1 may be substantially the same.

Also, in some illustrated embodiments, in the absence of touch input or an external force, the fifth resistance Re1 of the third strain gauge 150e1, the sixth resistance Rf1 of the third conductor 150f1, the seventh resistance Rg1 of the fourth strain gauge 150g1, and the eighth resistance Rh1 of the fourth conductor 150h1 may be substantially the same.

Also, in some illustrated embodiments, in the absence of touch input or an external force, the ninth resistance Ri1 of the fifth strain gauge 150i1, the tenth resistance Rj1 of the fifth conductor 150j1, the eleventh resistance Rk1 of the sixth strain gauge 150k1, and the twelfth resistance Rl1 of the sixth conductor 150l1 may be substantially the same.

The connections between the elements of a pressure detector 250 of the touch sensor according to the illustrated embodiment and operations of the pressure detector 250 are substantially the same as, or similar to, those described above with reference to FIGS. 29 through 32, and thus, detailed descriptions thereof will be omitted to avoid redundancy.

Figure 41:
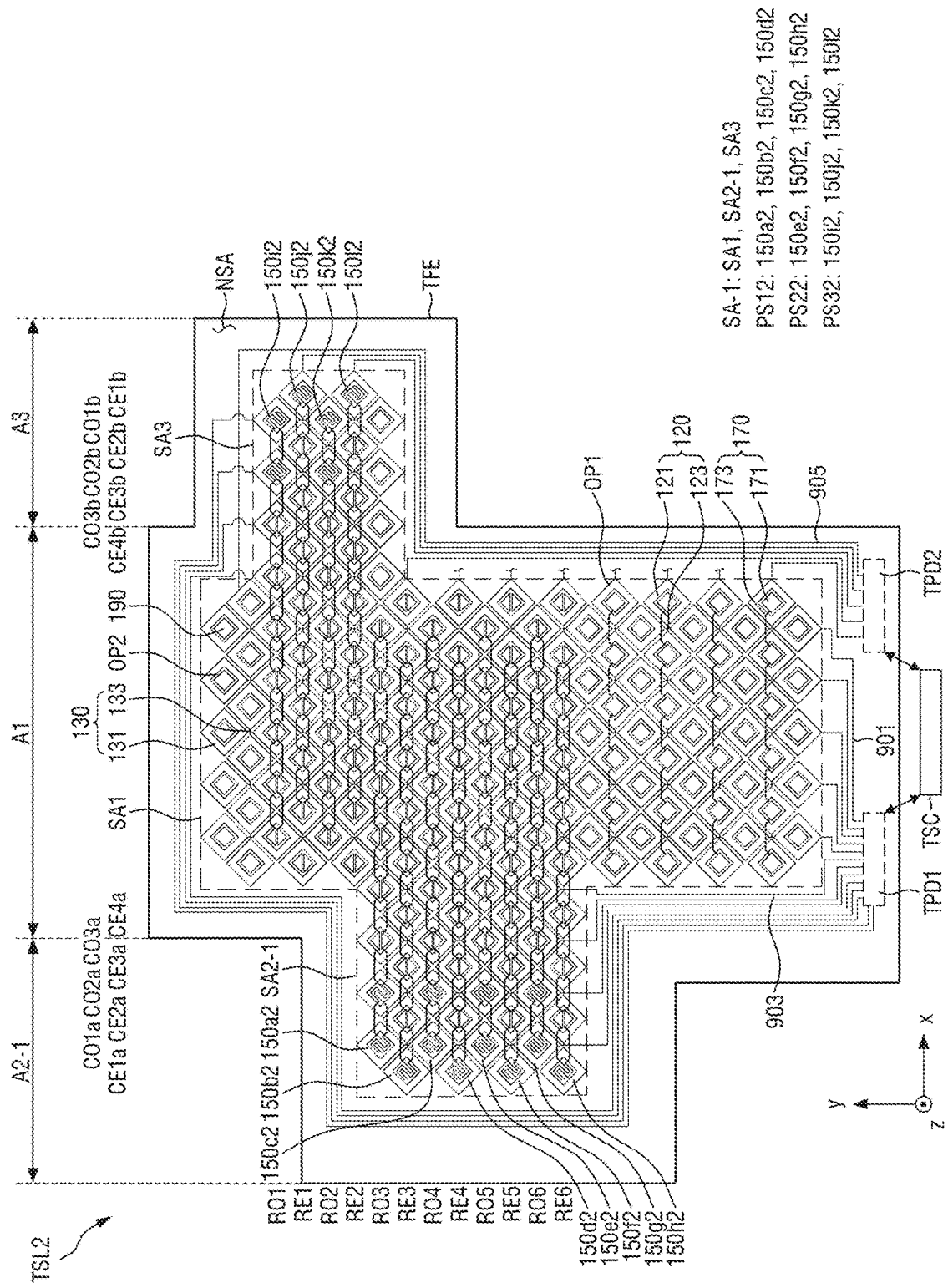
FIGS. 41 and 42 are plan views illustrating another example embodiment of a touch sensor constructed according to the principles of the invention, particularly, the planar structure of a touch sensor layer of the touch sensor in its unfolded state and how the touch sensor layer and a touch controller of the touch sensor are connected.
Figure 42:
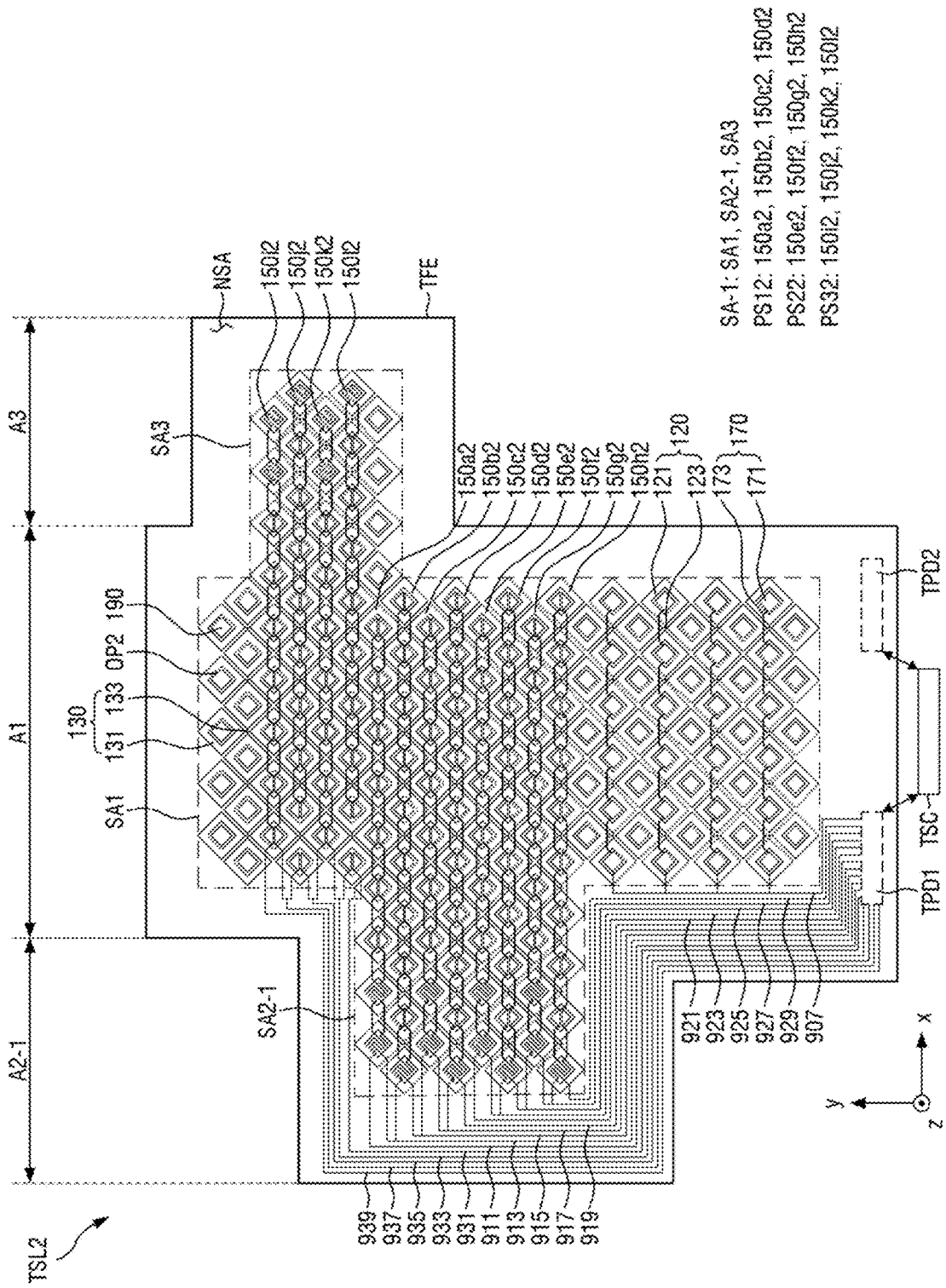
Figure 43:
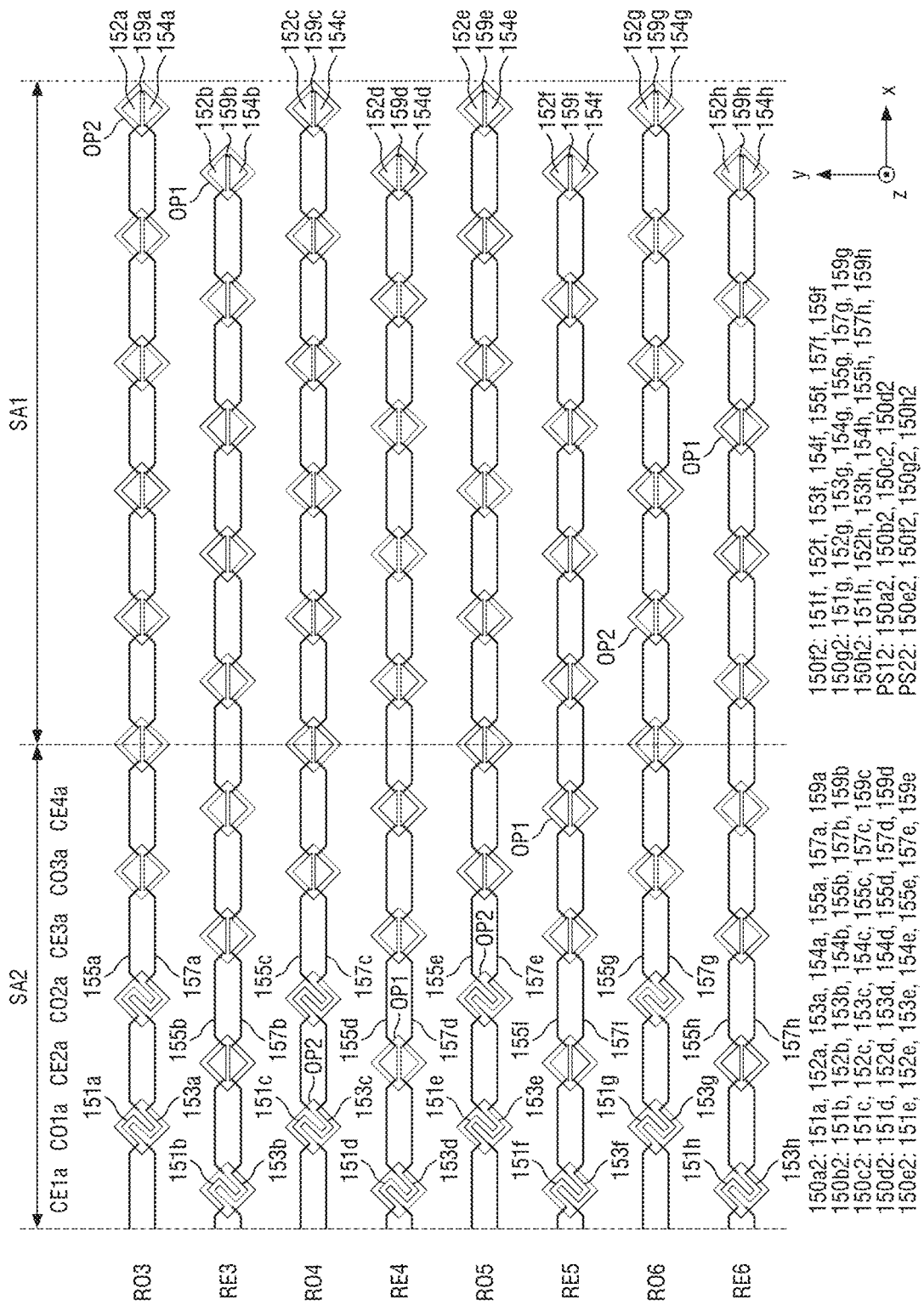
FIG. 43 is a plan view illustrating the planar structures of first and second pressure sensors of FIGS. 41 and 42.
Figure 44:
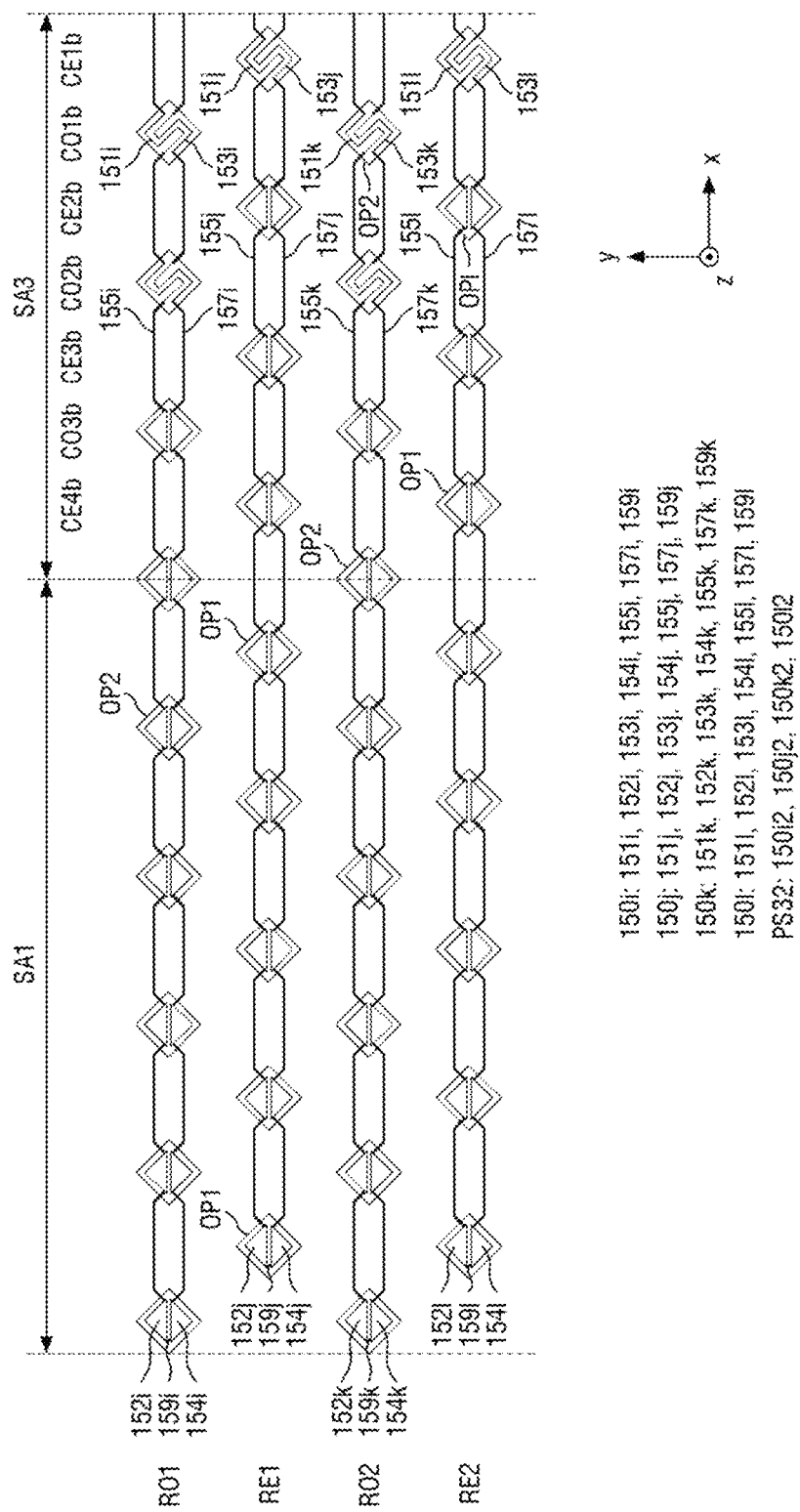
FIG. 44 is a plan view illustrating the planar structure of a third pressure sensor of FIGS. 41 and 42.

FIGS. 41 and 42 are plan views illustrating another example embodiment a touch sensor constructed according to the principles of the invention, particularly, the planar structure of a touch sensor layer of the touch sensor and how the touch sensor layer and a touch controller of the touch sensor are connected, FIG. 43 is a plan view illustrating the planar structures of first and second pressure sensors of FIGS. 41 and 42, and FIG. 44 is a plan view illustrating the planar structure of a third pressure sensor of FIGS. 41 and 42.

Referring to FIGS. 41 through 44, the touch sensor according to the illustrated embodiment includes a touch sensor layer TSL2 and a touch controller TSC.

In the touch sensor layer TSL2, a sensing area SA2-1 is defined, and the sensing area SA-1 includes a first sensing area SA1, a second sensing area SA2-1, and a third sensing area SA3. The first sensing area SA1 is disposed in a first area A1 of a display device, the second sensing area SA2-1 is disposed in a second area A2-1 of the display device, and the third sensing area SA3 is disposed in a third area A3 of the display device 1. In some embodiments, the second and third sensing areas SA2-1 and SA3 may also be disposed in the first area A1. The first and third areas A1 and A3 may be substantially the same as the first and third areas A1 and A3, respectively, of FIGS. 10 and 11. The second area A2-1 is the same as the second area A2 of FIG. 1 except that it is shifted in the opposite direction of the second direction y as compared to the second area A2 of FIGS. 10 and 11.

In some embodiments, unlike in the embodiment of FIGS. 10 and 11, at least part of the first sensing area SA1 may not overlap with the second sensing area SA2-1 in the first direction x. In some embodiments, the second sensing area SA2-1 may be shifted in the opposite direction of the second direction y as compared to the second sensing area SA2 of FIGS. 10 and 11.

The touch sensor layer TSL1 includes first, second, and third pressure sensors PS12, PS22, and PS32.

The first pressure sensor PS12 includes a first strain gauge 150a2, a first conductor 150b2, a second strain gauge 150c2, and a second conductor 150d2.

The second pressure sensor PS22 includes a third strain gauge 150e2, a third conductor 150f2, a fourth strain gauge 150g2, and a fourth conductor 150h2.

The third pressure sensor PS32 includes a fifth strain gauge 150i2, a fifth conductor 150j2, a sixth strain gauge 150k2, and a sixth conductor 150l2.

In some embodiments, the first strain gauge 150a2, the first conductor 150b2, the second strain gauge 150c2, and the second conductor 150*d*2 may all be disposed in different rows from the fifth strain gauge 150*i*2, the fifth conductor 150*j*2, the sixth strain gauge 150*k*2, and the sixth conductor 150*l*2 of the third pressure sensor PS32. In some embodiments, the first strain gauge 150*a*2 may be disposed in a third row RO3, the first conductor 150*b*2 may be disposed in a third electrode row RE3, the second strain gauge 150*c*2 may be disposed in a fourth row RO4, and the second conductor 150*d*2 may be disposed in a fourth electrode row RE4.

In some embodiments, thirteenth conductive patterns 152*a* and fourteenth conductive patterns 154*a* of the first strain gauge 150*a*2 may be disposed in the first sensing area SA1, but unlike their respective counterparts of FIGS. 33 and 34, may be disposed even in part of the first sensing area SA1 near the boundary between the first and third sensing areas SA1 and SA3 along the first direction x.

Similarly, fifteenth conductive patterns 152*c* and sixteenth conductive patterns 154*c* of the second strain gauge 150*c*2, seventeenth conductive patterns 152*e* and eighteenth conductive patterns 154*e* of the third strain gauge 150*e*2, and nineteenth conductive patterns 152*g* and twentieth conductive patterns 154*g* of the fourth strain gauge 150*g*2 may be disposed in the first sensing area SA1, but unlike their respective counterparts of FIGS. 33 and 34, may be disposed even in part of the first sensing area SA1 near the boundary between the first and third sensing areas SA1 and SA3 along the first direction x.

First conductive patterns 152*b* and second conductive patterns 154*b* of the first conductor 150*b*2 may be disposed not only in the second sensing area SA2-1, but also in the first sensing area SA1 and may be disposed even in part of the first sensing area SA1 near the boundary between the first and third sensing areas SA1 and SA3 along the first direction x.

Other features and aspects of the second conductor 150*d*2, the third conductor 150*f*2, and the fourth conductor 150*h*2 are substantially the same as, or similar to, those of the first conductor 150*b*2, and thus, detailed descriptions thereof will be omitted to avoid redundancy.

Twenty-first conductive patterns 152*i* and twenty-second conductive patterns 154*i* of the fifth strain gauge 150*i*2 may be disposed in the first sensing area SA1, but unlike their respective counterparts of FIGS. 33 and 34, may be disposed even in part of the first sensing area SA1 near the boundary between the first and second sensing areas SA1 and SA2-1 along the opposite direction of the first direction x. Seventeenth and eighteenth resistance lines 151*i* and 153*i* which are disposed in a fourth column CO1*b* may be connected via a ninth connecting pattern 159*i*.

Twenty-third conductive patterns 152*k* and twenty-fourth conductive patterns 154*k* of the sixth strain gauge 150*k*2 may be disposed in the first sensing area SA1, but unlike their respective counterparts of FIGS. 33 and 34, may be disposed even in part of the first sensing area SA1 near the boundary between the first and second sensing areas SA1 and SA2-1 along the opposite direction of the first direction x. Twenty-first and twenty-second resistance lines 151*k* and 153*k* which are disposed in the fourth column CO1*b* may be connected via an eleventh connecting pattern 159*k*.

Ninth conductive patterns 152*j* and tenth conductive patterns 154*j* of the fifth conductor 150*j*2 may be disposed not only in the second sensing area SA2-1, but also in the first sensing area SA1 and may be disposed even in part of the first sensing area SA1 near the boundary between the first and third sensing areas SA1 and SA3 along the first direction x. Nineteenth and twentieth resistance lines 151*j* and 153*j* which are disposed in a fifth electrode column CE1*b* may be connected via a tenth connecting pattern 159*j*.

Eleventh conductive patterns 152*l* and twelfth conductive patterns 154*l* of the sixth conductor 150*l*2 may be disposed not only in the second sensing area SA2-1, but also in the first sensing area SA1 and may be disposed even in part of the first sensing area SA1 near the boundary between the first and third sensing areas SA1 and SA3 along the first direction x. Twenty-third and twenty-fourth resistance lines 151*l* and 153*l* which are disposed in the fifth electrode column CE1*b* may be connected via a twelfth connecting pattern 159*l*.

In some embodiments, both ends of the fifth strain gauge 150*i*1, both ends of the fifth conductor 150*j*2, both ends of the sixth strain gauge 150*k*2, and both ends of the sixth conductor 150*l*2 may be disposed on the left side of the second sensing area SA-1. Eleventh, twelfth, thirteenth, fourteenth, and fifteenth pressure wires 931, 933, 935, 937, and 939 may be disposed in a non-sensing area NSA, particularly, on the left side of the second sensing area SA2-1. That is, in some embodiments, first, second, third, fourth, fifth, sixth, seventh, eighth, ninth, and tenth pressure wires 911, 913, 915, 917, 919, 921, 923, 925, 927, and 929 and the eleventh, twelfth, thirteenth, fourteenth, and fifteenth pressure wires 931, 933, 935, 937, and 939 may all be disposed on the left side of the second sensing area SA2-1.

In some embodiments, the eleventh, twelfth, thirteenth, fourteenth, and fifteenth pressure wires 931, 933, 935, 937, and 939 may be connected to a first touch pad portion TPD1.

Other features and aspects of the touch sensor layer TSL2 are substantially the same as, or similar to, those of the touch sensor layer TSL of FIGS. 10 through 12, and thus, detailed descriptions thereof will be omitted to prevent redundancy.

Figure 45:
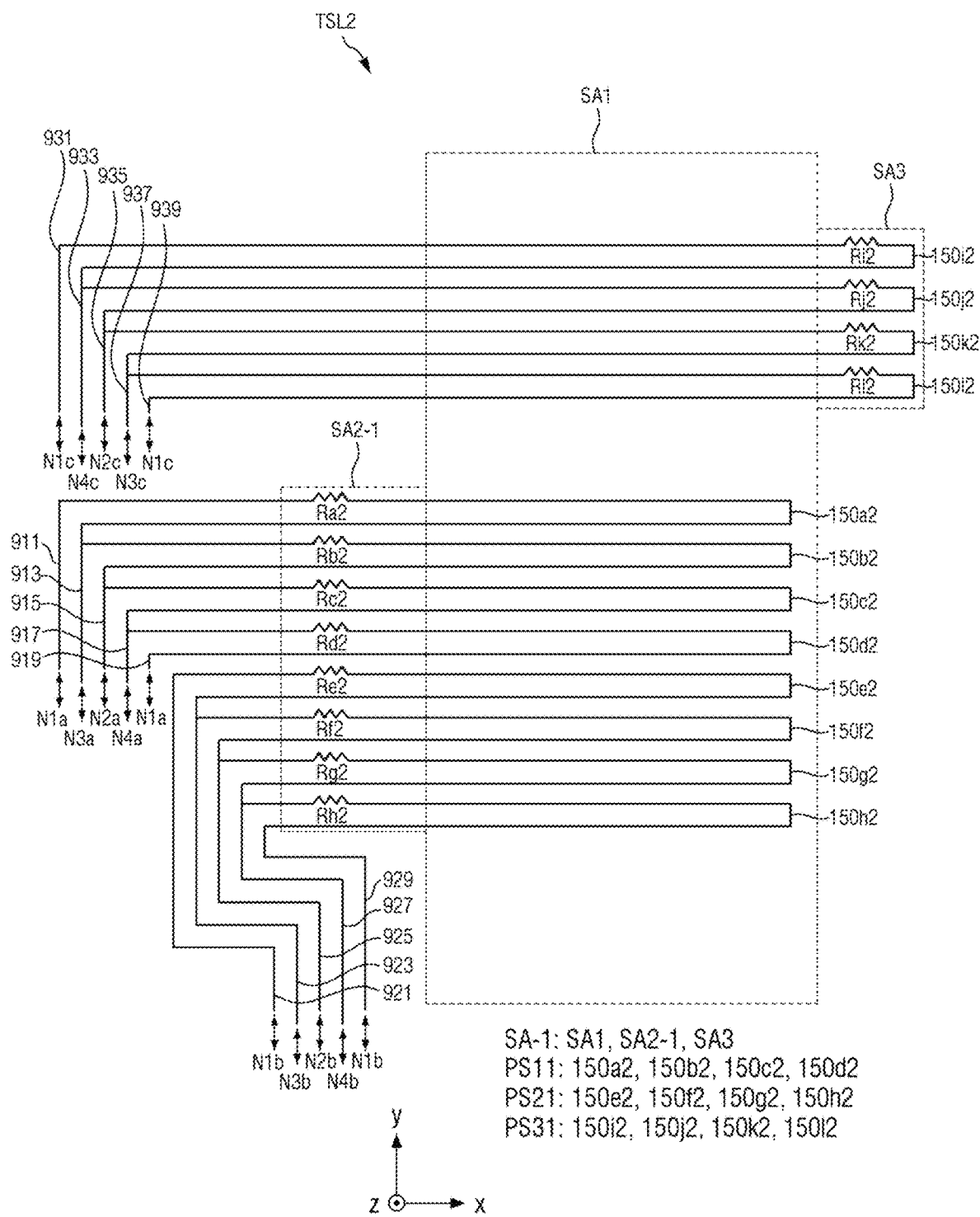
FIG. 45 is a plan view illustrating the arrangement of the first, second, and third pressure sensors of FIGS. 43 and 44 and how pressure wires and Wheatstone bridge circuit are connected n.

FIG. 45 is a plan view illustrating the arrangement of the first, second, and third pressure sensors of FIGS. 43 and 44 and how pressure wires and Wheatstone bridge circuits are connected.

Referring to FIG. 45, in the absence of touch input or an external force, a first resistance Ra2 of the first strain gauge 150*a*2, a second resistance Rb2 of the first conductor 150*b*2, a third resistance Rc2 of the second strain gauge 150*c*2, and a fourth resistance Rd2 of the second conductor 150*d*2 may be substantially the same, and thus, detailed descriptions thereof will be omitted to avoid redundancy.

Also, in some embodiments, in the absence of touch input or an external force, a fifth resistance Re2 of the third strain gauge 150*e*2, a sixth resistance Rf2 of the third conductor 150*f*2, a seventh resistance Rg2 of the fourth strain gauge 150*g*2, and an eighth resistance Rh2 of the fourth conductor 150*h*2 may be substantially the same, and thus, detailed descriptions thereof will be omitted to avoid redundancy.

Also, in some embodiments, in the absence of touch input or an external force, a ninth resistance Ri2 of the fifth strain gauge 150*i*2, a tenth resistance Rj2 of the fifth conductor 150*j*2, an eleventh resistance Rk2 of the sixth strain gauge 150*k*2, and a twelfth resistance R12 of the sixth conductor 150*l*2 may be substantially the same, and thus, detailed descriptions thereof will be omitted to avoid redundancy.

The first pressure sensor PS12 may be connected to a first Wheatstone bridge part (WBa of FIG. 30) of a pressure detector (250 of FIGS. 30 through 32), the second pressure sensor PS22 may be connected to a second Wheatstone bridge circuit (WBb of FIG. 31) of the pressure detector, and the third pressure sensor PS32 may be connected to a third Wheatstone bridge circuit (WBc of FIG. 32) of the pressure detector.

The connections between the elements of the pressure detector and operations of the pressure detector are substantially the same as, or similar to, those described above with reference to FIGS. 29 through 32, and thus, detailed descriptions thereof will be omitted to avoid redundancy.

Figure 46:
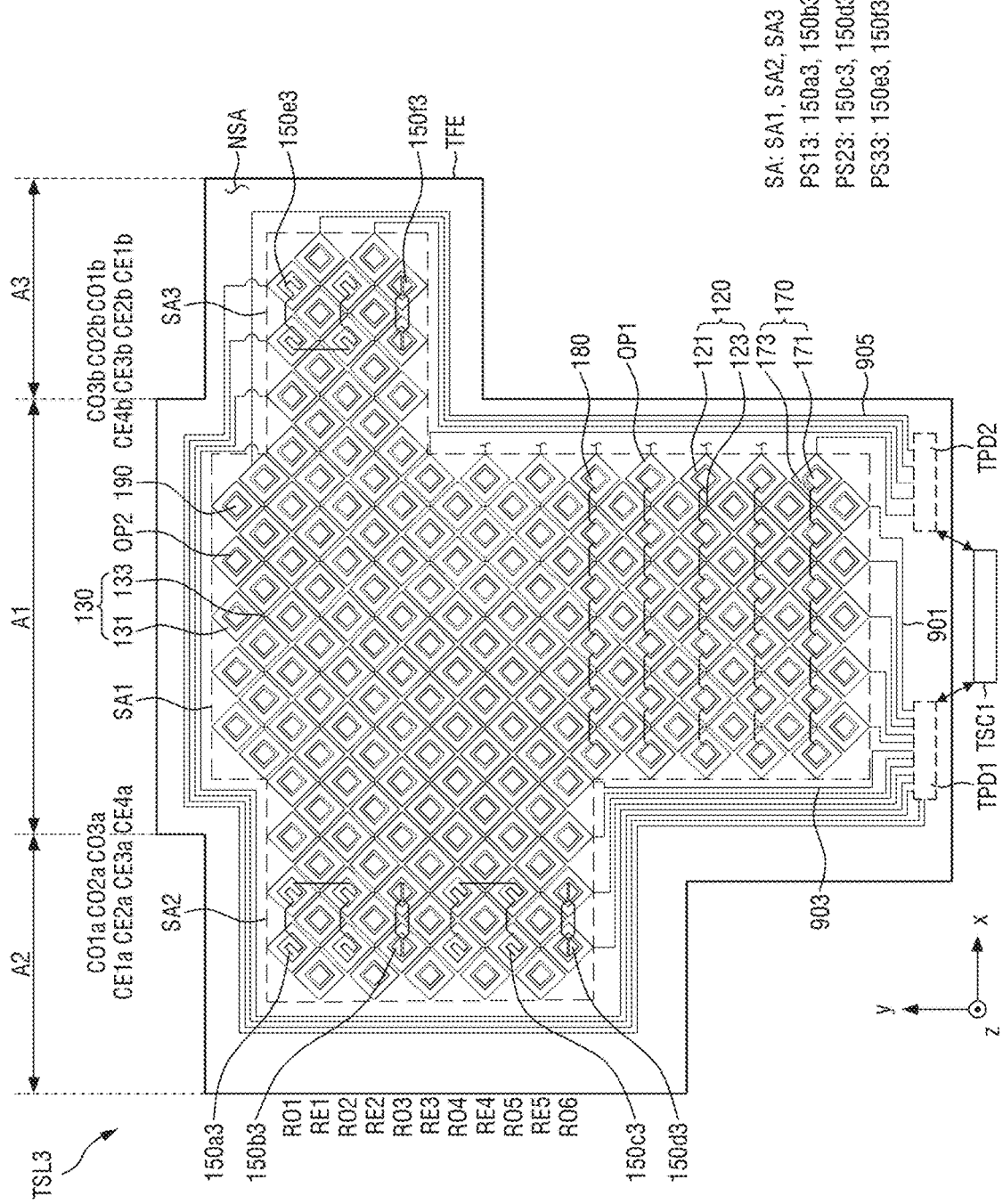
FIGS. 46 and 47 are plan views according to an example embodiment illustrating another example embodiment of a touch sensor constructed according to the principles of the invention, particularly the planar structure of a touch sensor layer of the touch sensor in its unfolded state and how the touch sensor layer and a touch controller of the touch sensor are connected.
Figure 47:
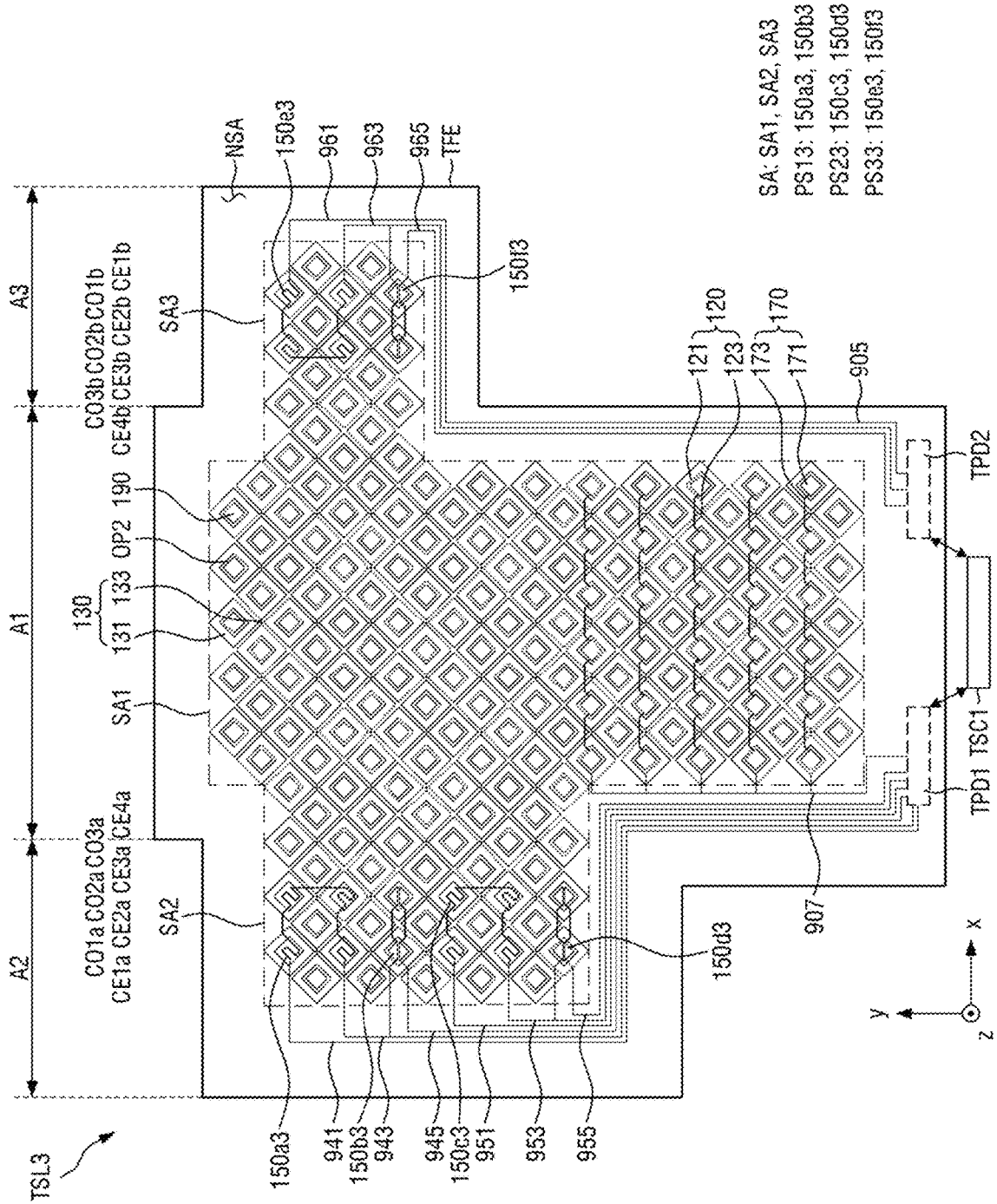
Figure 48:
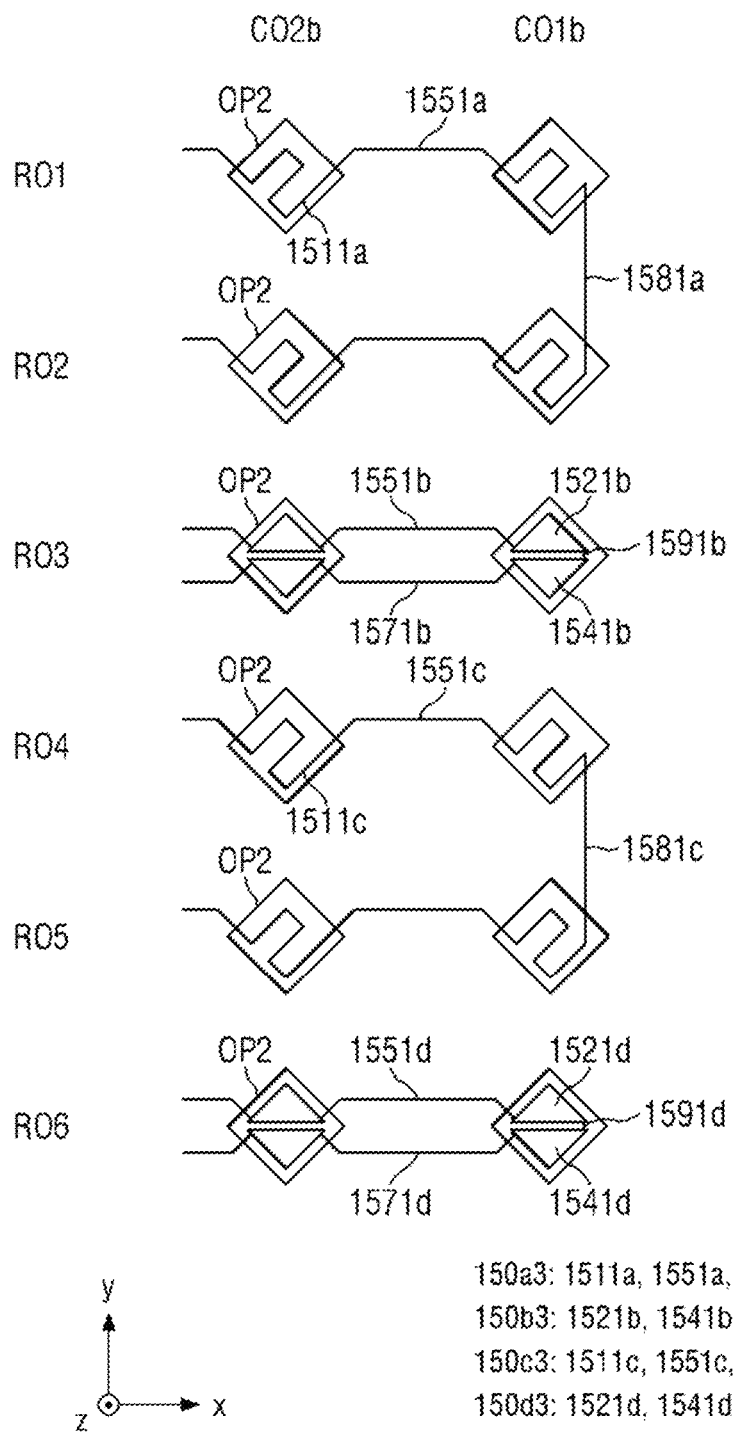
FIG. 48 is a plan view illustrating the planar structures of first and second pressure sensors of FIGS. 46 and 47.
Figure 49:
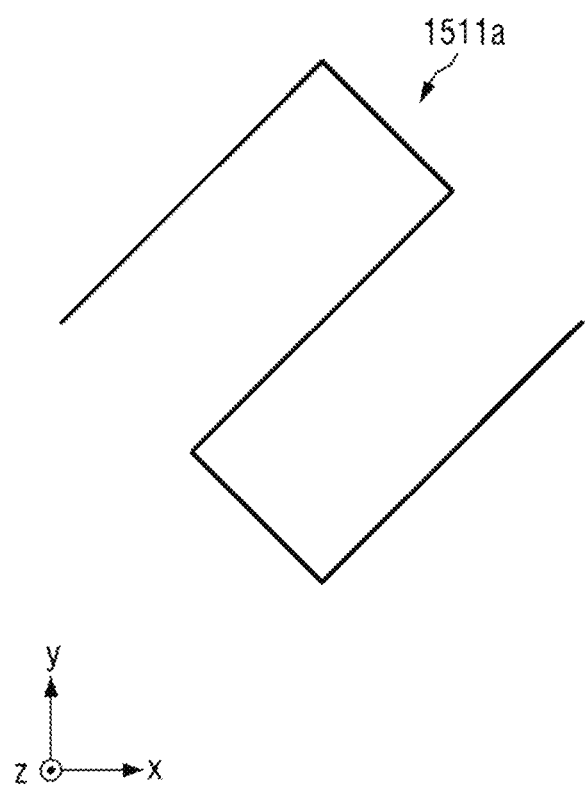
FIG. 49 is an enlarged plan view illustrating a first resistance line of the first pressure sensor of FIG. 48.
Figure 51:
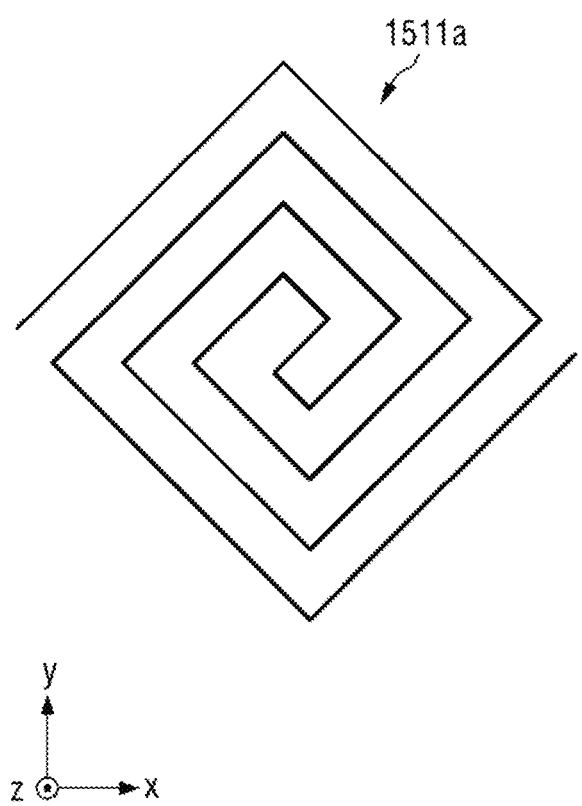
Figure 52:
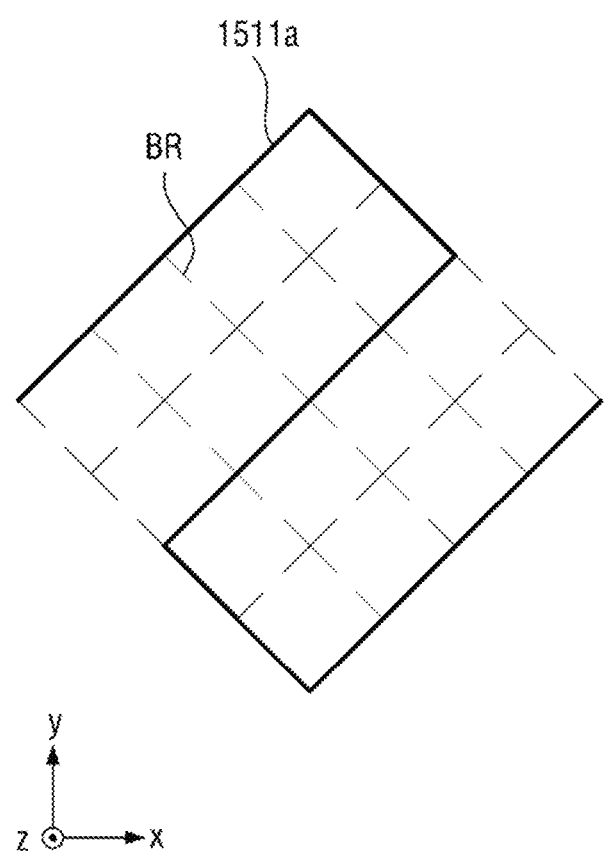
Figure 53:
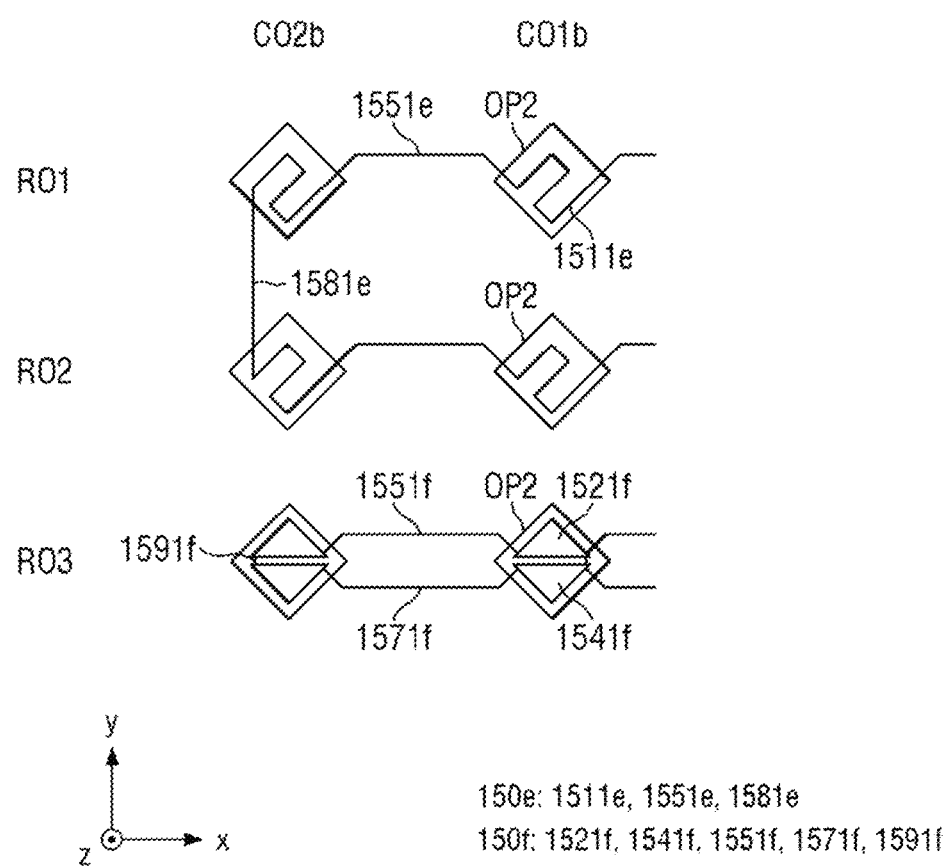
FIG. 53 is a plan view illustrating the planar structure of a third pressure sensor of FIG. 47.
Figure 55:
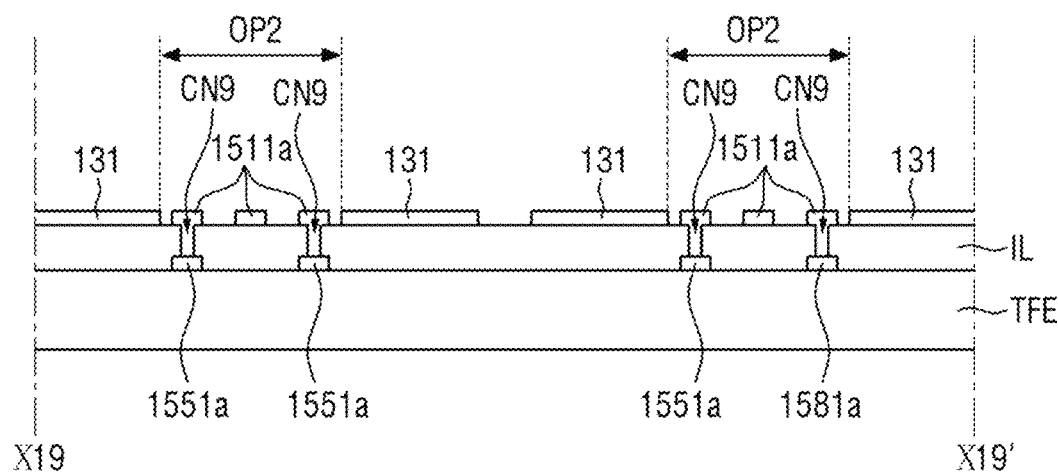
FIG. 55 is a cross-sectional view taken along line X19-X19' of FIG. 54.
Figure 56:
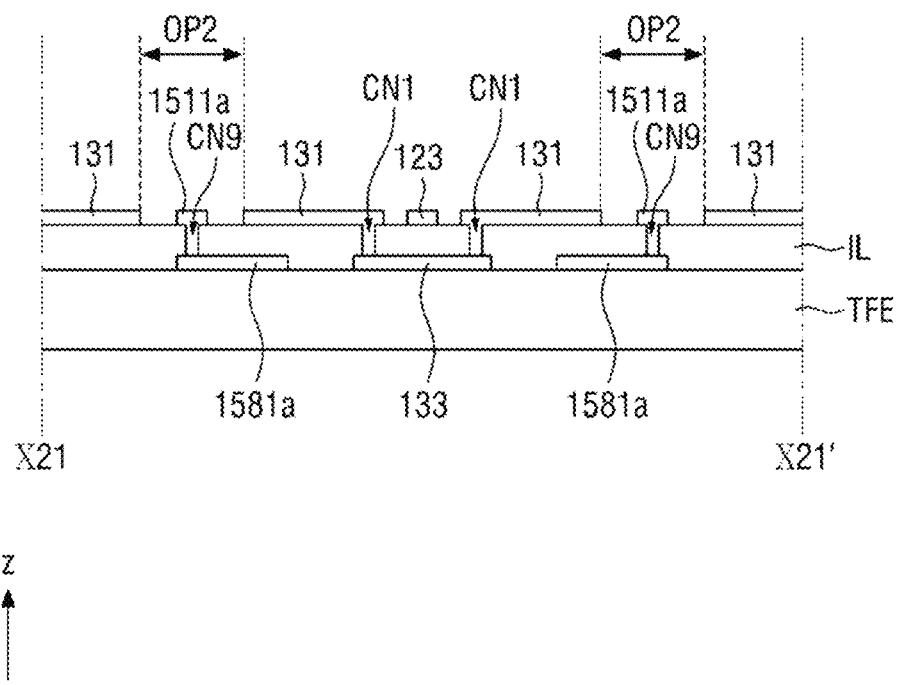
FIG. 56 is a cross-sectional view taken along line X21-X21' of FIG. 54.
Figure 57:
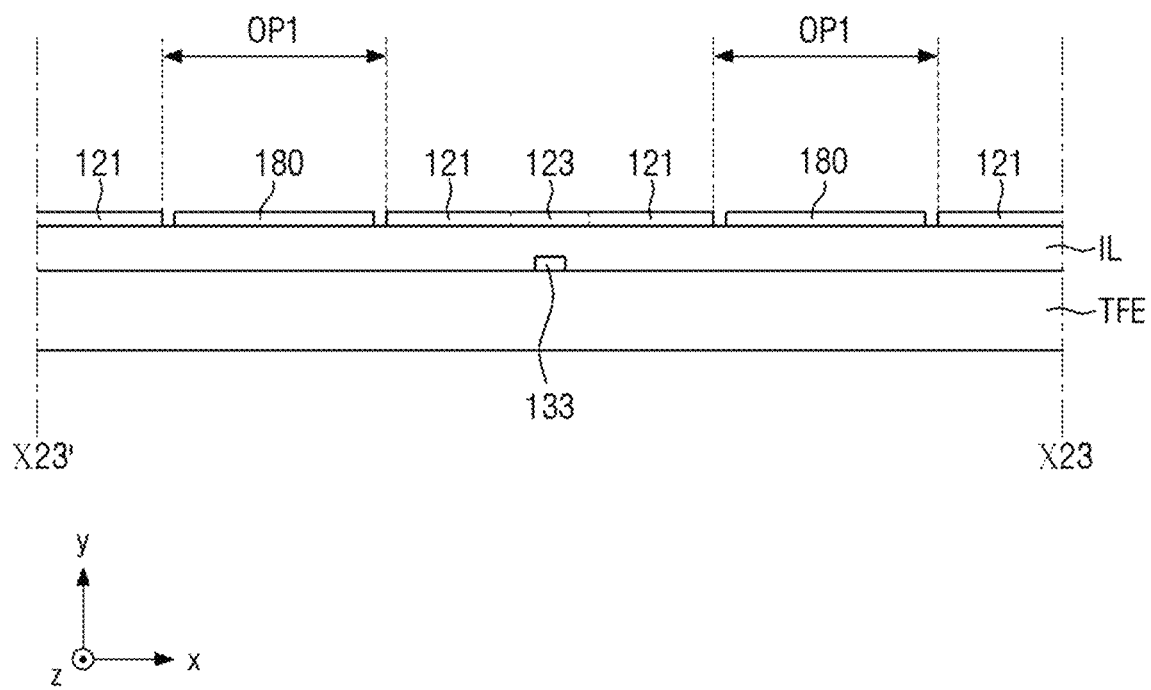
FIG. 57 is a cross-sectional view taken along line X23-X23' of FIG. 54.
Figure 58:
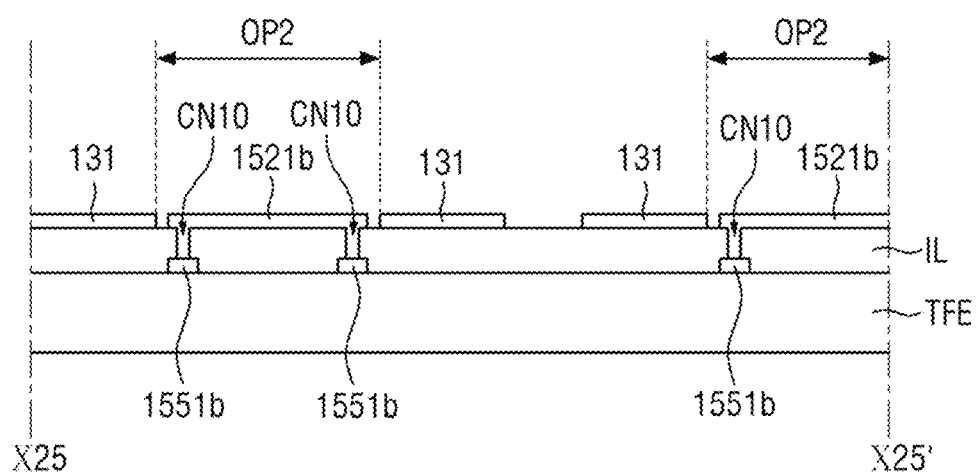
FIG. 58 is a cross-sectional view taken along line X25-X25' of FIG. 54.
Figure 59:
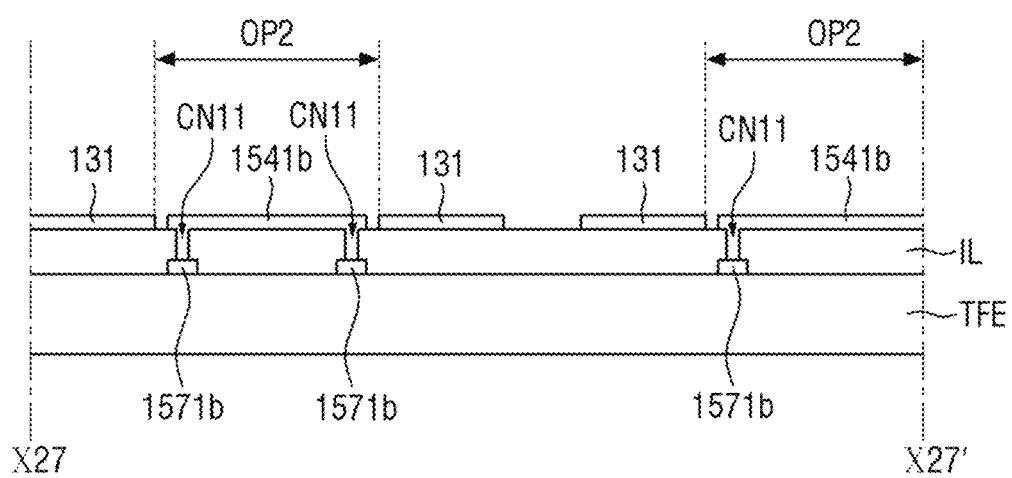
FIG. 59 is a cross-sectional view taken along line X27-X27' of FIG. 54.

FIGS. 46 and 47 are plan views illustrating another example embodiment of a touch sensor constructed according to the principles of the invention, particularly, the planar structure of a touch sensor layer of the touch sensor in its unfolded state and how the touch sensor layer and a touch controller of the touch sensor are connected, FIG. 48 is a plan view illustrating the planar structures of first and second pressure sensors of FIGS. 46 and 47, FIG. 49 is an enlarged plan view illustrating a first resistance line of the first pressure sensor of FIG. 48, FIGS. 50, 51, and 52 are plan views illustrating additional example embodiments of the first resistance line of FIG. 49, FIG. 53 is a plan view illustrating the planar structure of a third pressure sensor of FIG. 47, FIG. 54 is an enlarged plan view illustrating the first pressure sensor of FIGS. 46 and 47 and the surroundings of the first pressure sensor, FIG. 55 is a cross-sectional view taken along line X19-X19' of FIG. 54, FIG. 56 is a cross-sectional view taken along line X21-X21' of FIG. 54, FIG. 57 is a cross-sectional view taken along line X23-X23' of FIG. 54, FIG. 58 is a cross-sectional view taken along line X25-X25' of FIG. 54, and FIG. 59 is a cross-sectional view taken along line X27-X27' of FIG. 54.

Referring to FIGS. 46 through 59, the touch sensor according to the illustrated embodiment includes a touch sensor layer TSL3 and a touch controller TSC1.

Features or aspects of the touch sensor layer TSL3 are substantially the same as, or similar to, those of the touch sensor layer TSL of FIGS. 10 and 11 except that the touch sensor layer TSL3 includes first, second, and third pressure sensors PS13, PS23, and PS33. Thus, the touch sensor layer TSL3 will hereinafter be described, focusing mainly on the differences with the touch sensor layer TSL of FIGS. 10 and 11 to avoid redundancy.

The first pressure sensor PS13 includes a first strain gauge 150a3 and a first conductor 150b3.

The first strain gauge 150a3 may include first resistance lines 1511a, first connecting lines 1551a, and a second connecting line 1581a.

The first resistance lines 1511a may be disposed in second openings of second touch electrodes 131 and may be located in a second sensing area SA2. In some embodiments, the first resistance lines 1511a may be disposed in two or more rows. For example, the first resistance lines 1511a may be disposed in second openings OP2 that are located in a first row RO1 and in first and second columns CO1a and CO2a and in second openings OP2 that are located in a second row RO2 and in the first and second columns CO1a and CO2a.

In some embodiments, as illustrated in FIG. 49, each of the first resistance lines 1511a may include two or more bent portions and extension portions extending in directions that intersect the first and second directions x and y.

Figure 50:
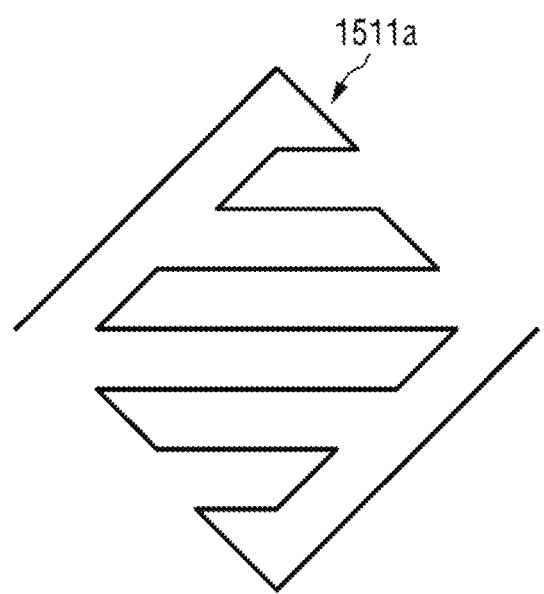
FIGS. 50, 51, and 52 are plan views illustrating additional example embodiments of the first resistance line of FIG. 49.

The shape of the first resistance lines 1511a may vary. Alternatively, as illustrated in FIG. 50, each of the first resistance lines 1511a may include multiple bent portions and extension portions extending in the first direction x. Still alternatively, as illustrated in FIG. 51, each of the first resistance lines 1511a may be formed in a generally angular spiral shape. Yet still alternatively, each of the first resistance lines 1511a may be formed in a generally spiral shape.

In some embodiments, in a case where first touch electrodes 121 and the second touch electrodes 131 have a mesh structure, the first resistance lines 1511a may be formed by partially removing the mesh structure. In this case, in some embodiments, a plurality of branch portions BR which are spaced apart from one another may be further disposed in each of the second openings OP2 to be connected to a corresponding first resistance line 1511a, as illustrated in FIG. 52.

The branch portions BR may be portions of the mesh structure that remain unremoved. The branch portions BR may be spaced apart from the second touch electrodes 131 and may be disposed in the same layer as, and may include the same material as, the first resistance lines 1511a.

The first connecting lines 1551a may connect pairs of adjacent first resistance lines 1511a in the first direction x.

The second connecting line 1581a may connect a pair of adjacent first resistance lines 1511a in the second direction y. In some embodiments, the second connecting line 1581a may connect the first resistance line 1511a in the first row RO1 and the second column CO2a and the first resistance line 1511a in the second row RO2 and the second column CO2a.

In some embodiments, the first resistance lines 1511a may be formed of a second conductive layer (ML2 of FIG. 4) and may include the same material as the first touch electrodes 121 and the second touch electrodes 131. Also, the first connecting lines 1551a and the second connecting line 1581a may be formed of a first conductive layer (ML1 of FIG. 4) and may include the same material as second connectors 133.

In some embodiments, as illustrated in FIGS. 55 and 56, ninth contact holes CN9 which penetrate an insulating layer IL may be formed at both ends of each of the first resistance lines 1511a. The first connecting lines 1551a and the first resistance lines 1511a may be connected via the ninth contact holes CN9, and the second connecting line 1581a and the first resistance lines 1511a may also be connected via the ninth contact holes CN9.

The first conductor 150b3 may include first conductive patterns 1521b, second conductive patterns 1541b, third connecting lines 1551b, fourth connecting lines 1571b, and a first connecting pattern 1591b.

The first conductive patterns 1521b and the second conductive patterns 1541b may be paired and may be disposed in the second openings OP2 of the second touch electrodes 131. In some embodiments, a plurality of pairs of first and second conductive patterns 1521b and 1541b may be disposed in second openings OP2 in a third row RO3 along the first direction X.

The first conductive patterns 1521b and the second conductive patterns 1541b are illustrated as being disposed in the second openings OP2, but the embodiments are not limited thereto. Alternatively, the first conductive patterns 1521b and the second conductive patterns 1541b may be disposed in first openings OP1 of first touch electrodes 121. In this case, the first conductive patterns 1521b and the second conductive patterns 1541b may be disposed in, for example, a first or second electrode row RE1 or RE2, and first patterns 180 which are disposed in the second sensing area SA2 may not be provided.

The third connecting lines 1551b may electrically connect pairs of adjacent first conductive patterns 1521b in the first direction x, and the fourth connecting lines 1571b may connect pairs of adjacent fourth conductive patterns 1541b in the first direction x.

In some embodiments, as illustrated in FIGS. 46, 47, and 49, the second connecting pattern 1591b may be disposed in a second opening OP2 in the third row RO3 and the second column CO1b. The second connecting pattern 1591b may connect the first and second conductive patterns 1521*b* and 1541*b* in the second opening OP2 in the third row RO3 and the second column CO1*b*.

In some embodiments, the first conductive patterns 1521*b*, the second conductive patterns 1541*b*, and the second connecting pattern 1591*b* may be formed of the second conductive layer ML2 of FIG. 4 and may include the same material as the first touch electrodes 121 and the second touch electrodes 131. Also, the third connecting lines 1551*b* and the fourth connecting lines 1571*b* may be formed of the first conductive layer (ML1 of FIG. 4) and may include the same material as the second connectors 133.

In some embodiments, as illustrated in FIGS. 58 and 59, the first conductive patterns 1521*b* and the third connecting lines 1551*b* may be connected via tenth contact holes CN10 which are formed in the insulating layer IL. Also, the second conductive patterns 1541 and the fourth connecting lines 1571*b* may be connected via eleventh contact holes CN11 which are formed in the insulating layer IL.

In some embodiments, both ends of the first strain gauge 150*a*3 and both ends of the first conductor 150*b*3 may be disposed on the same side of the second sensing area SA2. For example, both ends of the first strain gauge 150*a*3 and both ends of the first conductor 150*b*3 may be disposed on the left side of the second sensing area SA2.

The second pressure sensor PS23 includes a second strain gauge 150*c*3 and a second conductor 150*d*3.

The second strain gauge 150*c*3 may have substantially the same structure as the first strain gauge 150*a*3, and thus, detailed descriptions thereof will be omitted to avoid redundancy.

The second strain gauge 150*c*3 may include second resistance lines 1511*c*, fifth connecting lines 1551*c*, and a sixth connecting line 1581*c*. In some embodiments, the second strain gauge 150*c*3 may be located in the second sensing area SA2 and may be disposed in fourth and fifth rows RO4 and RO5. The elements of the second strain gauge 150*c*3 are substantially the same as the elements of the first strain gauge 150*a*3, and thus, detailed descriptions thereof will be omitted to avoid redundancy.

The second conductor 150*d*3 may have substantially the same structure as the first conductor 150*b*3, and thus, detailed descriptions thereof will be omitted to avoid redundancy.

The second conductor 150*d*3 may include third conductive patterns 1521*d*, fourth conductive patterns 1541*d*, seventh connecting lines 1551*d*, eighth connecting lines 1571*d*, and a second connecting pattern 1591*d*. In some embodiments, the third conductive patterns 1521*d* and the fourth conductive patterns 1541*d* may be located in the second sensing area SA2 and may be disposed in a sixth row RO6. The elements of the second conductor 150*d*3 are substantially the same as the elements of the first conductor 150*b*3, and thus, detailed descriptions thereof will be omitted.

The pressure sensor PS33 may include a third strain gauge 150*e*3 and a third conductor 150*f*3.

The third strain gauge 150*e*3 may include a third strain gauge 150*e*3 and a third conductor 150*f*3.

The third strain gauge 150*e*3 may have substantially the same structure as, or a similar structure to, the first strain gauge 150*a*3, and thus, detailed descriptions thereof will be omitted to avoid redundancy.

The third strain gauge 150*e*3 may include third resistance lines 1511*e*, ninth connecting lines 1551*e*, and a tenth connecting line 1581*e*. In some embodiments, the third resistance lines 1511*e* may be located in a third sensing area SA3 and may be disposed in the first and second rows RO1 and RO2. Other features and aspects of the third strain gauge 150*e*3 are substantially the same as, or similar to, those of the first strain gauge 150*a*3, and thus, detailed descriptions thereof will be omitted to prevent redundancy.

The fourth conductor 150*f*3 may have substantially the same structure as, or a similar structure to, the first conductor 150*b*3, and thus, detailed descriptions thereof will be omitted to avoid redundancy.

The fourth conductor 150*f*3 may include fifth conductive patterns 1521*f*, sixth conductive patterns 1541*f*, eleventh connecting lines 1551*f*, twelfth connecting lines 1557*f*, and a third connecting pattern 1591*f*. In some embodiments, the fifth conductive patterns 1521*f* and the sixth conductive patterns 1541*f* may be located in the third sensing area SA3 and may be disposed in the third row RO3. Other features and aspects of the fourth conductor 150*f*3 are substantially the same as, or similar to, those of the first conductor 150*b*3, and thus, detailed descriptions thereof will be omitted to prevent redundancy.

Pressure wires may be disposed in a non-sensing area NSA.

The pressure wires include first, second, and third pressure wires 941, 943, and 945 which are connected to the first pressure sensor PS13. The pressure wires may further include fourth, fifth, and sixth pressure wires 951, 953, and 955 which are connected to the second pressure sensor PS23 and seventh, eighth, and ninth pressure wires 961, 963, and 965 which are connected to the third pressure sensor PS33.

In some embodiments, the first, second, third, fourth, fifth, and sixth pressure wires 941, 943, 945, 951, 953, and 955 may be disposed in the non-sensing area NSA, particularly, on the opposite side, in the first direction x, of the second sensing area SA2 from the first sensing area SA1.

The seventh, eighth, and ninth pressure wires 961, 963, and 965 may be disposed in the non-sensing area NSA, particularly, on the opposite side, in the first direction x, of the third sensing area SA3 from the first sensing area SA1.

The first pressure wire 941 may be connected to a first end of the first strain gauge 150*a*3. The second pressure wire 943 may be connected to a second end of the first strain gauge 150*a*3 and a first end of the first conductor 150*b*3. The third pressure wire 945 may be connected to a second end of the first conductor 150*b*3.

The fourth pressure wire 951 may be connected to a first end of the second strain gauge 150*c*3, the fifth pressure wire 953 may be connected to a second end of the second conductor 150*c*3 and a first end of the second conductor 150*d*3, and the sixth pressure wire 955 may be connected to a second end of the second conductor 150*d*3.

The seventh pressure wire 961 may be connected to a first end of the third strain gauge 150*e*3, the eighth pressure wire 963 may be connected to a second end of the third strain gauge 150*e*3 and a first end of the third conductor 150*f*3, and the ninth pressure wire 965 may be connected to a second end of the third conductor 150*f*3.

In some embodiments, the first, second, third, fourth, fifth, and sixth pressure wires 941, 943, 945, 951, 953, and 955 may be connected to a first touch pad portion TPD1, and the seventh, eighth, and ninth pressure wires 961, 963, and 965 may be connected to a second touch pad portion TPD2.

Figure 60:
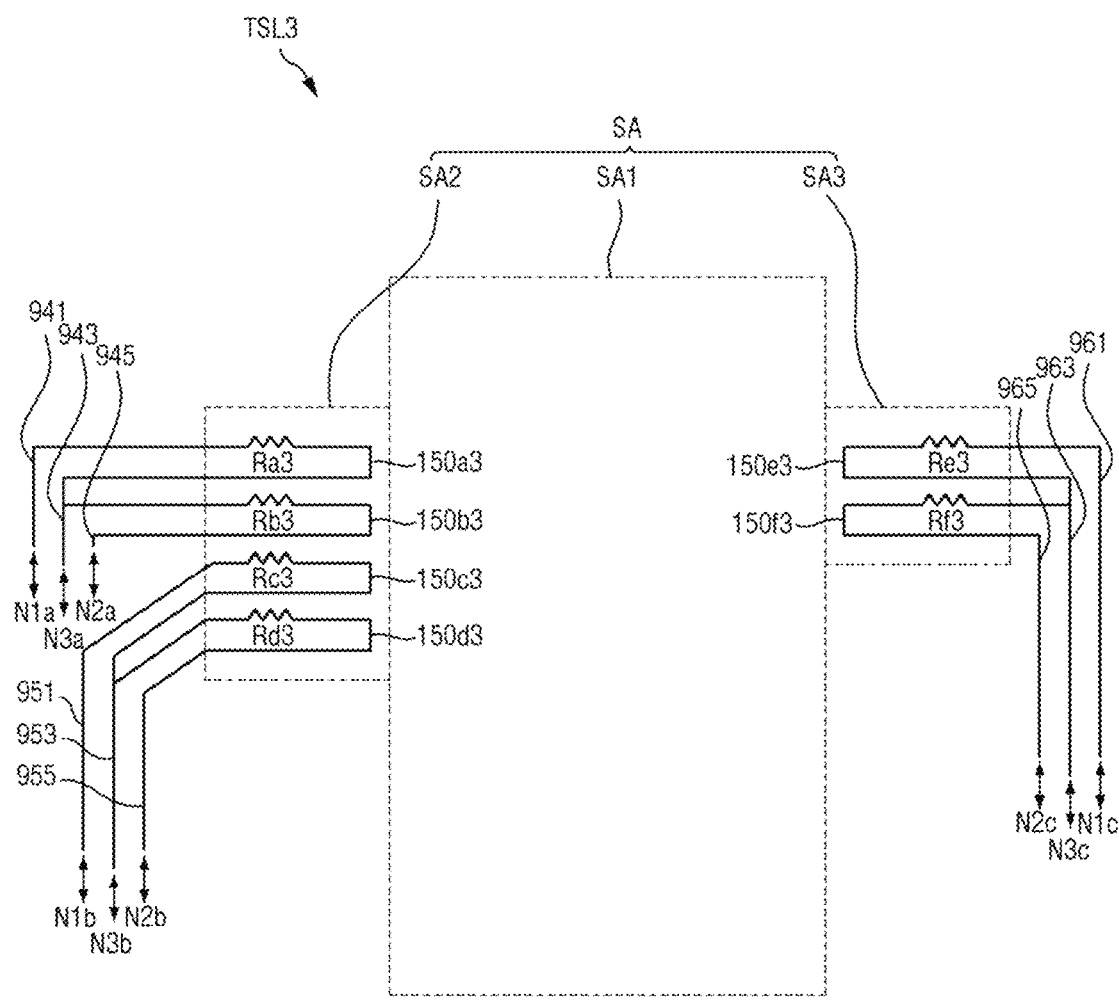
FIG. 60 is a plan view illustrating the arrangement of the first, second, and third pressure sensors of FIGS. 46 and 47 and how pressure wires and Wheatstone bridge circuit are connected.
Figure 61:
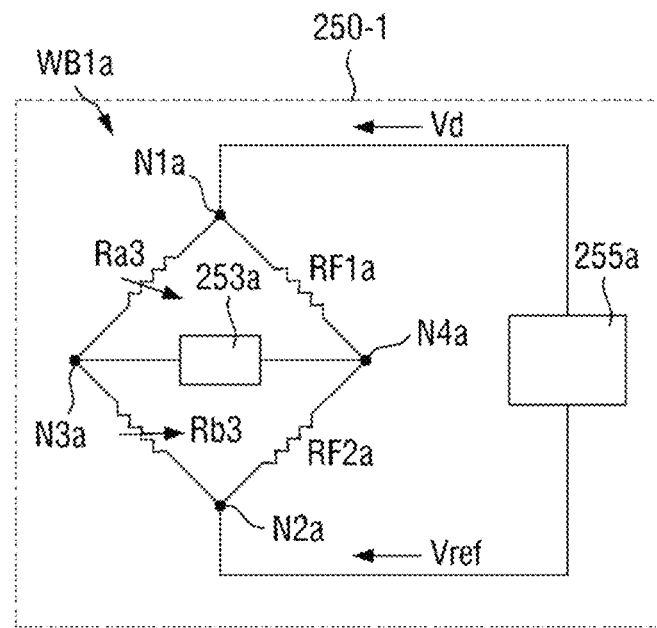
FIGS. 61, 62, and 63 are example embodiments of circuit diagrams illustrating a touch pressure detection operation of the touch sensor of FIGS. 46 and 47. Particularly.
Figure 62:
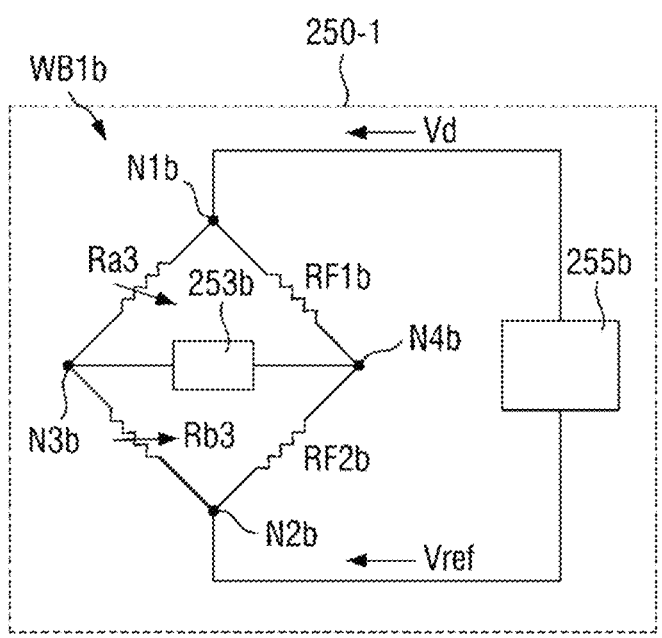
Figure 63:
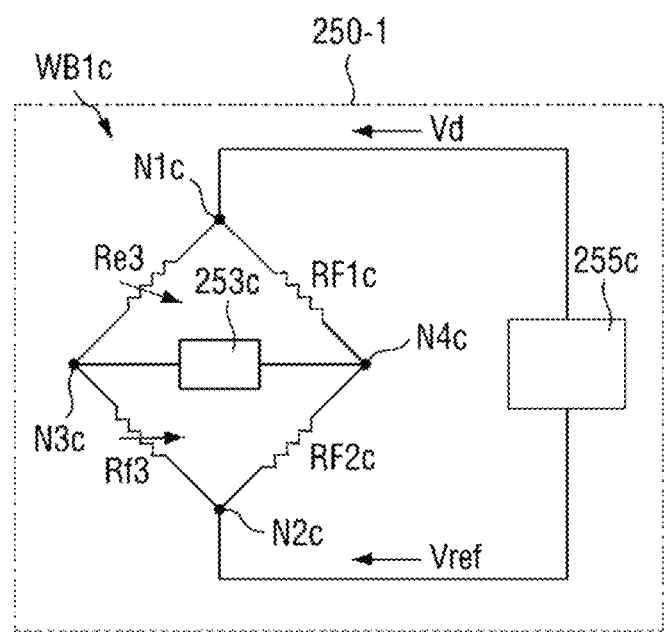

FIG. 60 is a plan view illustrating the arrangement of the first, second, and third pressure sensors of FIGS. 46 and 47 and how pressure wires and Wheatstone bridge circuits are connected, and FIGS. 61, 62, and 63 are example embodiments of circuit diagrams illustrating a touch pressure detection operation of the touch sensor of FIGS. 46 and 47, particularly, a Wheatstone bridge circuit connected to the first pressure sensor of FIG. 60, a Wheatstone bridge circuit connected to the second pressure sensor of FIG. 60, and a Wheatstone bridge circuit connected to the third pressure sensor of FIG. 60, respectively.

Referring to FIGS. 60 through 63, in the absence of touch input, the first strain gauge 150a3 may have a first resistance Ra3, the first conductor 150b3 may have a second resistance Rb3, the second strain gauge 150c3 may have a third resistance Rc3, the second conductor 150d3 may have a fourth resistance Rd3, the third strain gauge 150e3 may have a fifth resistance Re3, and the third conductor 150f3 may have a sixth resistance Rf3.

A pressure detector 250-1 of the touch controller TSC1 may include first, second, and third Wheatstone bridge circuits WB1a, WB1b, and WB1c.

The first Wheatstone bridge circuit WB1a is substantially the same as, or similar to, the first Wheatstone bridge circuit WBa of FIG. 30 except that it further includes a first fixed resistor RF1a and a second fixed resistor RF2a. In some embodiments, the first fixed resistor RF1a may be connected to a first node N1a and a second output node N4a, and the second fixed resistor RF2a may be connected between a second node N2a and a second output node N4a.

The second Wheatstone bridge circuit WB1b is substantially the same as, or similar to, the second Wheatstone bridge circuit WBb of FIG. 31 except that it further includes a first fixed resistor RF1b and a second fixed resistor RF2b. In some embodiments, the first fixed resistor RF1b may be connected to a first node Nib and a second output node N4b, and the second fixed resistor RF2b may be connected between a second node N2b and a second output node N4b.

The third Wheatstone bridge circuit WB1c is substantially the same as, or similar to, the third Wheatstone bridge circuit WBc of FIG. 32 except that it further includes a first fixed resistor RF1c and a second fixed resistor RF2c. In some embodiments, the first fixed resistor RF1c may be connected to a first node N1c and a second output node N4c, and the second fixed resistor RF2c may be connected between a second node N2c and a second output node N4c.

The first pressure sensor PS13 may be electrically connected to the first Wheatstone bridge circuit WB1a, the second pressure sensor PS23 may be electrically connected to the second Wheatstone bridge circuit WB1b, and the third pressure sensor PS33 may be electrically connected to the third Wheatstone bridge circuit WB1c.

Specifically, in some embodiments, the first end of the first strain gauge 150a3 may be connected to the first node N1a of the first Wheatstone bridge circuit WB1a via the first pressure wire 941, and the second end of the first strain gauge 150a3 and the first end of the first conductor 150b3 may be connected to the first output node N3a of the first Wheatstone bridge circuit WB1a via the second pressure wire 943. Also, the second end of the first conductor 150b3 may be connected to the second node N2a of the first Wheatstone bridge circuit WB1a via the third pressure wire 945.

When touch input is yet to be applied to the touch sensor layer TSL3, the first resistance Ra3 of the first strain gauge 150a3 and the resistance of the second fixed resistor RF2a of the first Wheatstone bridge circuit WB1a may be substantially the same as the product of the second resistance Rb3 of the first conductor 150b3 and the resistance of the first fixed resistor RF1a of the first Wheatstone bridge circuit WB1a.

In some embodiments, in the absence of touch input or an external force, the first resistance Ra3 of the first strain gauge 150a3, the second resistance Rb3 of the first conductor 150b3, the resistance of the first fixed resistor RF1a, and the resistance of the second fixed resistor RF2a may be substantially the same.

As touch input is applied to the touch sensor layer TSL3, the resistance of the first strain gauge 150a3 varies, and the resistance variation in the first strain gauge 150a3 includes both a pressure resistance component and a temperature resistance component. Also, as touch input is applied to the touch sensor layer TSL3, the resistance of the first conductor 150b3 does not substantially varies in accordance with pressure, but varies in accordance with temperature.

Thus, in response to touch input being applied to the touch sensor layer TSL3, the equilibrium of a Wheatstone bridge is broken, and the resistance variation in the first conductor 150b3 can compensate for the temperature resistance component of the first strain gauge 150a3. Accordingly, touch pressure can be detected based on the pressure resistance component of the first strain gauge 150a3, and as a result, the precision of pressure detection can be improved.

The first end of the second strain gauge 150c3 may be connected to the first node N1a of the second Wheatstone bridge circuit WB1b via the fourth pressure wire 951, and the second end of the second strain gauge 150c3 and the first end of the second conductor 150d3 may be connected to the first output node N3b of the second Wheatstone bridge circuit WB1b via the fifth pressure wire 953. Also, the second end of the second conductor 150d3 may be connected to the second node N2b of the second Wheatstone bridge circuit WB1b via the sixth pressure wire 955.

In some embodiments, in the absence of touch input or an external force, the third resistance Rc3 of the second strain gauge 150c3, the fourth resistance Rd3 of the second conductor 150d3, the resistance of the first fixed resistor RF1b, and the resistance of the second fixed resistor RF2b may be substantially the same.

The first end of the third strain gauge 150e3 may be connected to the first node N1c of the third Wheatstone bridge circuit WB1c via the seventh pressure wire 961, and the second end of the third strain gauge 150e3 and the first end of the third conductor 150f3 may be connected to the first output node N3c of the third Wheatstone bridge circuit WB1c via the eighth pressure wire 963. Also, the second end of the third conductor 150f3 may be connected to the second node N2c of the third Wheatstone bridge circuit WB1c via the ninth pressure wire 965.

In some embodiments, in the absence of touch input or an external force, the fifth resistance Re3 of the third strain gauge 150e3, the sixth resistance Rf3 of the third conductor 150f3, the resistance of the first fixed resistor RF1c, and the resistance of the second fixed resistor RF2c may be substantially the same.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device including a first display area and a second display area which extends and is angled from one side of the first display area, the display device comprising:
    a base substrate;
    a self-luminous element disposed on the base substrate;
    an inorganic layer disposed on the self-luminous element;
    a first touch electrode disposed in the second display area and including a first opening;

a second touch electrode disposed in the second display area and including a second opening;

a first conductive member including a first conductive line and a second resistance line which are disposed in the first opening of the first touch electrode; and a first conductor which is disposed in the second display area and has a different shape from the first conductive member, wherein the first conductor includes a first conductive pattern and a second conductive pattern which are disposed in the second opening of the second touch electrode.

2. The display device of claim 1, wherein
the first conductive member further comprises a first connecting line connected to the first conductive line and a second conductive line connected to the first conductive line, and
the first connecting line and a second connecting line are insulated from the first touch electrode.

3. The display device of claim 2, wherein
the first touch electrode overlaps the first connecting line and the second connecting line in plan view.

4. The display device of claim 2, wherein
the first connecting line is connected to the first conductive pattern, and
the second connecting line is connected to the second conductive pattern.

5. The display device of claim 4, wherein
the second touch electrode overlaps the first connecting line and the second connecting line in plan view.

6. The display device of claim 2, wherein the display device further comprises an insulating layer including a first surface facing the inorganic layer and a second surface opposite to the first surface,
wherein the first connecting line and the second connecting line are disposed between the inorganic layer and the insulating layer, and
wherein the first touch electrode, the second touch electrode, the first conductive line, the second conductive line, the first conductive pattern and the second conductive pattern are disposed on the second surface of the insulating layer.

7. The display device of claim 1, wherein
the first touch electrode and the second touch electrode have a mesh structure.

8. The display device of claim 1, wherein
each of the first conductive pattern and the second conductive pattern has a mesh structure.

9. The display device of claim 1, wherein the display device further comprises a second conductive member which is disposed in the second display area; and a second conductor which is disposed in the second display area and has a different shape from the second conductive member, wherein the display device further includes a third touch electrode disposed in the second display area and including a third opening and a fourth touch electrode disposed in the second display area and including a fourth opening, wherein the second conductive member includes a third conductive line and a fourth conductive line which are disposed in the third opening of the third touch electrode, and wherein the second conductor includes a third conductive pattern and a fourth conductive pattern which is disposed in the fourth opening of the fourth touch electrode.

10. The display device of claim 9, wherein the first conductive member, the second conductive member, the first conductor, and the second conductor form a Wheatstone bridge.

11. The display device of claim 1, wherein the display device further comprises a third touch electrode disposed in the first display area and including a third opening, and a noise sensing electrode disposed in the first display area,
wherein the noise sensing electrode is disposed in the third opening and spaced apart from the third touch electrode.

12. The display device of claim 11, wherein
the first conductive line, a second conductive line, and the noise sensing electrode are disposed directly on a same layer.

13. The display device of claim 12, wherein
each of the third touch electrode and the noise sensing electrode has a mesh structure.

14. The display device of claim 1, further comprising
a capping layer disposed between the self-luminous element and the inorganic layer;
wherein a refractive index of the capping layer is greater than a refractive index of the inorganic layer.

15. The display device of claim 1, wherein the display device further comprises a second conductive member and a third conductive member,
wherein the display device further includes a third display area which extends from the other side of the first display area and is angled from the first display area,
wherein the second conductive member is disposed in the second display area, and
wherein the third conductive member is disposed in the third display area.

16. The display device of claim 15, wherein each of the second conductive member and the third conductive member includes conductive lines.

* * * * *